United States Patent
Wang et al.

(10) Patent No.: US 12,156,184 B2
(45) Date of Patent: Nov. 26, 2024

(54) TIME DOMAIN RESOURCE CONFIGURATION METHOD

(71) Applicant: HUAWEI TECHNOLOGIES CO., LTD., Guangdong (CN)

(72) Inventors: Ting Wang, Shanghai (CN); Yi Wang, Shanghai (CN); Zukang Shen, Beijing (CN); Zhenfei Tang, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 784 days.

(21) Appl. No.: 17/172,216

(22) Filed: Feb. 10, 2021

(65) Prior Publication Data

US 2021/0185672 A1  Jun. 17, 2021

Related U.S. Application Data

(63) Continuation of application No. PCT/CN2019/099401, filed on Aug. 6, 2019.

(30) Foreign Application Priority Data

Aug. 10, 2018  (CN) .......................... 201810908394.9

(51) Int. Cl.
*H04W 4/00* (2018.01)
*H04W 72/0446* (2023.01)
*H04W 72/23* (2023.01)

(52) U.S. Cl.
CPC ....... *H04W 72/0446* (2013.01); *H04W 72/23* (2023.01)

(58) Field of Classification Search
None
See application file for complete search history.

(56) References Cited

U.S. PATENT DOCUMENTS

2018/0049203 A1\* 2/2018 Xue ................ H04L 5/0053
2020/0107321 A1\* 4/2020 Yang ................ H04W 72/23

FOREIGN PATENT DOCUMENTS

| CN | 104053239 A | 9/2014 |
|---|---|---|
| CN | 105515747 A | 4/2016 |
| CN | 107182130 A | 9/2017 |
| WO | 2018126777 A1 | 7/2018 |
| WO | 2018130725 A1 | 7/2018 |

OTHER PUBLICATIONS

Extended European Search Report issued in European Application No. 19848762.1 on Jul. 15, 2021, 9 pages.

(Continued)

*Primary Examiner* — Zewdu A Beyen
(74) *Attorney, Agent, or Firm* — Fish & Richardson P.C.

(57) ABSTRACT

A time domain resource configuration method, an apparatus, and a system are provided, to send, by a network device, time domain resource allocation indication information to a terminal device. The time domain resource allocation indication information is used to indicate N1 time domain resource allocations, where N1 is an integer greater than or equal to 1. The N1 time domain resource allocations may be used to determine N2 candidate time domain resources, where N2 is an integer greater than N1.

18 Claims, 5 Drawing Sheets

(56) References Cited

OTHER PUBLICATIONS

Huawei, HiSilicon, "General Discussion on Flexible Duplex," 3GPP TSG RAN WG1 Meeting #87, R1-1611224, Reno, USA, Nov. 14-18, 2016, 5 pages.
3GPP TS 38.211 V15.2.0 (Jun. 2018), "3rd Generation Partnership Project; Technical Specification Group Radio Access Network;NR;Physical channels and modulation(Release 15)," Jun. 2018, 96 pages.
3GPP TS 38.213 V15.2.0 (Jun. 2018), "3rd Generation Partnership Project; Technical Specification Group Radio Access Network;NR;Physical layer procedures for control(Release 15)," Jun. 2018, 99 pages.
Fujitsu, "Discussion on time domain resource allocation," 3GPP TSG RAN WG1 NR Ad-Hoc#2, R1-1710238, Qingdao, P.R. China, Jun. 27-30, 2017, 3 pages.
MCC Support, "Draft Report of 3GPP TSG RAN WG1 #93 v0.2.0",3GPP TSG RAN WG1 Meeting #94 R1-180xxxx, Gothenburg, Sweden, Aug. 20-24, 2018, total 200 pages.
PCT International Search Report and Written Opinion on International Application No. PCT/CN2019/099401 on Oct. 10, 2019, 15 pages (with English translation).
Office Action issued in Chinese Application No. 201810908394.9 on Aug. 3, 2022, 7 pages.

\* cited by examiner

TIME DOMAIN RESOURCE CONFIGURATION METHOD

CROSS-REFERENCE TO RELATED APPLICATIONS

This application is a continuation of International Application No. PCT/CN2019/099401, filed on Aug. 6, 2019, which claims priority to Chinese Patent Application No. 201810908394.9, filed on Aug. 10, 2018. The disclosures of the aforementioned applications are hereby incorporated by reference in their entireties.

TECHNICAL FIELD

This application relates to the field of communications technologies, and in particular, to a time domain resource configuration method, an apparatus, and a system.

BACKGROUND

In a communications system, a network device and a terminal device may perform signal transmission on an air interface resource, where the air interface resource includes a time domain resource. During signal transmission, the network device configures a time domain resource such as a slot or a symbol for the terminal device, and performs signal transmission with the terminal device on the configured time domain resource. To support efficient data transmission, how the network device configures the time domain resource for the terminal device is an important research project.

SUMMARY

Embodiments of this application provide a time domain resource configuration method, an apparatus, and a system, to support more candidate time domain resources with relatively low signaling overheads.

According to a first aspect, a time domain resource configuration method is provided, and includes: receiving time domain resource allocation indication information, where the time domain resource allocation indication information is used to indicate N1 time domain resource allocations, where N1 is an integer greater than or equal to 1; and determining N2 candidate time domain resources based on the N1 time domain resource allocations, where N2 is an integer greater than N1. According to the method, overheads of the time domain resource allocation indication information can be prevented from being excessively large when more candidate time domain resources are configured. Therefore, flexible time domain resource allocation can be implemented with relatively low signaling overheads.

In a possible design, the determining N2 candidate time domain resources based on the N1 time domain resource allocations includes: for one of the N1 time domain resource allocations, determining N3 candidate time domain resources in the N2 candidate time domain resources based on the time domain resource allocation, where N3 is an integer greater than or equal to 1. According to the method, one or more candidate time domain resources may be determined based on one time domain resource allocation, to prevent the overheads of the time domain resource allocation indication information from being relatively large, and more candidate time domain resources may be determined, to implement the flexible time domain resource allocation.

In a possible design, the determining N3 candidate time domain resources in the N2 candidate time domain resources based on the time domain resource allocation includes: determining the N3 candidate time domain resources according to a preconfigured rule and based on the time domain resource allocation. According to the method, the candidate time domain resources may be determined according to the preconfigured rule, to avoid increasing the signaling overheads.

In a possible design, the time domain resource allocation is used to indicate a start symbol position S and a length L of one candidate time domain resource, where S is an integer greater than or equal to 0 and less than or equal to $N_{slot}^{symb}-1$, L is an integer greater than or equal to 1 and less than $N_{slot}^{symb}$, and $N_{slot}^{symb}$ is a quantity of symbols included in one slot; and when the N3 candidate time domain resources are determined based on the time domain resource allocation, for one of the N3 candidate time domain resources:

a length of the candidate time domain resource is L, and a start symbol position S' of the candidate time domain resource is determined based on S;

a length L' of the candidate time domain resource is determined based on L, and a start symbol position of the candidate time domain resource is S; or a start symbol position S' of the candidate time domain resource is determined based on S, and a length L' of the candidate time domain resource is determined based on L. According to the method, a start symbol position and a length of one or more candidate time domain resources may be determined based on the start symbol position and the length that are indicated by one time domain resource allocation, to prevent the overheads of the time domain resource allocation indication information from being relatively large, and implement the flexible time domain resource allocation.

In a possible design, that a start symbol position S' of the candidate time domain resource is determined based on S includes: S' is S, S−D1, S+D1, S×scale1, ⌊S/scale1⌋, S−step1×i1, or S+step1×i1, where S' is an integer greater than or equal to 0 and less than or equal to $N_{slot}^{symb}-1$, and i1, scale1, and step1 are positive integers. According to the method, the overheads of the time domain resource allocation indication information can be prevented from being relatively large.

In a possible design, that a length L' of the candidate time domain resource is determined based on L includes: L' is L, L−D2, L+D2, L×scale2, ⌊L/scale2⌋, L−step2×i2, or L+step2×i2, where L' is an integer greater than or equal to 1 and less than $N_{slot}^{symb}$, and i2, scale2, and step2 are positive integers. According to the method, the overheads of the time domain resource allocation indication information can be prevented from being relatively large.

According to a second aspect, a time domain resource configuration method is provided, and includes: sending time domain resource allocation indication information, where the time domain resource allocation indication information is used to indicate N1 time domain resource allocations, where N1 is an integer greater than or equal to 1; and the N1 time domain resource allocations are used to configure N2 candidate time domain resources for a terminal device, where N2 is an integer greater than N1.

In a possible design, that the N1 time domain resource allocations are used to configure N2 candidate time domain resources for a terminal device includes: for one of the N1 time domain resource allocations, the time domain resource allocation is used to configure N3 candidate time domain resources in the N2 candidate time domain resources for the terminal device, where N3 is an integer greater than or equal to 1.

In a possible design, for a method in which the time domain resource allocation is used to configure the N3 candidate time domain resources in the N2 candidate time domain resources, refer to corresponding descriptions in the first aspect, and details are not described herein again.

According to a third aspect, an apparatus is provided, includes a communications module and a processing module, and is configured to implement any method according to the first aspect. The communications module is configured to receive time domain resource allocation indication information, where the time domain resource allocation indication information is used to indicate N1 time domain resource allocations, where N1 is an integer greater than or equal to 1; and the processing module is configured to determine N2 candidate time domain resources based on the N1 time domain resource allocations, where N2 is an integer greater than N1.

In a possible design, that the processing module is configured to determine N2 candidate time domain resources based on the N1 time domain resource allocations includes: for one of the N1 time domain resource allocations, the processing module is configured to determine N3 candidate time domain resources in the N2 candidate time domain resources based on the time domain resource allocation, where N3 is an integer greater than or equal to 1.

In a possible design, for a method for determining the N3 candidate time domain resources in the N2 candidate time domain resources based on the time domain resource allocation, refer to corresponding descriptions in the first aspect, and details are not described herein again.

According to a fourth aspect, an apparatus is provided, includes a communications module and a processing module, and is configured to implement any method according to the second aspect. The processing module is configured to generate time domain resource allocation indication information; and the communications module is configured to send the time domain resource allocation indication information, where the time domain resource allocation indication information is used to indicate N1 time domain resource allocations, where N1 is an integer greater than or equal to 1; and the N1 time domain resource allocations are used to configure N2 candidate time domain resources for a terminal device, where N2 is an integer greater than N1.

In a possible design, that the N1 time domain resource allocations are used to configure N2 candidate time domain resources for a terminal device includes: for one of the N1 time domain resource allocations, the time domain resource allocation is used to configure N3 candidate time domain resources in the N2 candidate time domain resources for the terminal device, where N3 is an integer greater than or equal to 1.

In a possible design, for a method in which the time domain resource allocation is used to configure the N3 candidate time domain resources in the N2 candidate time domain resources for the terminal device, refer to corresponding descriptions in the second aspect, and details are not described herein again.

According to a fifth aspect, an apparatus is provided. The apparatus can implement any method according to the first aspect. The apparatus may be implemented by using hardware, software, or a combination of hardware and software. The hardware or the software includes one or more modules corresponding to the foregoing method. In an example, the apparatus includes a processor, a memory, and a communications interface. The memory is coupled to the processor, and the processor executes an instruction stored in the memory. The processor is coupled to the communications interface, and the processor sends and/or receives a signal through the communications interface. In another example, the apparatus includes a processor and a memory. The memory is coupled to the processor, and the processor executes an instruction stored in the memory. The processor generates and sends a signal, and/or receives and processes a signal.

In a possible design, the apparatus includes a processor and a communications interface. The communications interface is configured to receive time domain resource allocation indication information, where the time domain resource allocation indication information is used to indicate N1 time domain resource allocations, where N1 is an integer greater than or equal to 1; and the processor is configured to determine N2 candidate time domain resources based on the N1 time domain resource allocations, where N2 is an integer greater than N1.

In a possible design, that the processor is configured to determine N2 candidate time domain resources based on the N1 time domain resource allocations includes: for one of the N1 time domain resource allocations, the processor is configured to determine N3 candidate time domain resources in the N2 candidate time domain resources based on the time domain resource allocation, where N3 is an integer greater than or equal to 1.

In a possible design, for a method for determining the N3 candidate time domain resources in the N2 candidate time domain resources based on the time domain resource allocation, refer to corresponding descriptions in the first aspect, and details are not described herein again.

According to a sixth aspect, an apparatus is provided. The apparatus can implement any method according to the second aspect. The apparatus may be implemented by using hardware, software, or a combination of hardware and software. The hardware or the software includes one or more modules corresponding to the foregoing method. In an example, the apparatus includes a processor, a memory, and a communications interface. The memory is coupled to the processor, and the processor executes an instruction stored in the memory. The processor is coupled to the communications interface, and the processor sends and/or receives a signal through the communications interface. In another example, the apparatus includes a processor and a memory. The memory is coupled to the processor, and the processor executes an instruction stored in the memory. The processor generates and sends a signal, and/or receives and processes a signal.

In a possible design, the apparatus includes a processor and a communications interface. The processor is configured to generate time domain resource allocation indication information. The communications interface is configured to send the time domain resource allocation indication information, where the time domain resource allocation indication information is used to indicate N1 time domain resource allocations, where N1 is an integer greater than or equal to 1; and the N1 time domain resource allocations are used to configure N2 candidate time domain resources for a terminal device, where N2 is an integer greater than N1.

In a possible design, that the N1 time domain resource allocations are used to configure N2 candidate time domain resources for a terminal device includes: for one of the N1 time domain resource allocations, the time domain resource allocation is used to configure N3 candidate time domain resources in the N2 candidate time domain resources for the terminal device, where N3 is an integer greater than or equal to 1.

In a possible design, for a method in which the time domain resource allocation is used to configure the N3 candidate time domain resources in the N2 candidate time domain resources for the terminal device, refer to corresponding descriptions in the second aspect, and details are not described herein again.

According to a seventh aspect, a time domain resource configuration method is provided, and includes: receiving downlink control information DCI, where the DCI includes a time domain resource allocation field and a first field, the time domain resource allocation field and B bits in the first field are jointly used to indicate, from N4 candidate time domain resources, a time domain resource configured for a terminal device, B is an integer greater than or equal to 1, a quantity of bits in the time domain resource allocation field is a maximum quantity of bits that is supported by the time domain resource allocation field, and the maximum quantity of bits that is supported by the time domain resource allocation field is less than a quantity of bits required for configuring the time domain resource from the N4 candidate time domain resources for the terminal device, where N4 is an integer greater than or equal to 1; and performing data transmission with the terminal device on the configured time domain resource. According to the method, overheads of the downlink control information can be prevented from being relatively large, and the time domain resource may be configured for the terminal device from more candidate time domain resources, to implement flexible time domain resource allocation.

In a possible design, the method further includes any method according to the first aspect. In this case, the N4 candidate time domain resources are the N2 candidate time domain resources in the method according to the first aspect. According to the method, signaling overheads can be prevented from being excessively large when the time domain resource is configured for the terminal device from more candidate time domain resources.

In a possible design, the first field includes one or more of the following fields: an RV version indicator field, an RV sequence indicator field, and a precoding and quantity-of-layers indicator field. According to the method, the time domain resource may be configured for the terminal device by using the RV version indicator field, the RV sequence indicator field, and the precoding and quantity-of-layers indicator field in the DCI, to prevent the overheads of the downlink control information from being relatively high, and implement the flexible time domain resource allocation.

In a possible design, when the first field includes the RV version indicator field, an RV version corresponding to the data transmission is a predefined RV version; when the first field includes the RV sequence indicator field, an RV sequence corresponding to the data transmission is a predefined RV sequence; and/or when the first field includes the precoding and quantity-of-layers indicator field, a quantity of layers and a codebook that are used for the data transmission are determined in any one of the following manners:

a bit other than B1 bits in the precoding and quantity-of-layers indicator field is used to indicate a codebook configured for the terminal device, the quantity of layers is preconfigured, and the configured codebook and the preconfigured quantity of layers are used for the data transmission;

a bit other than B bits in the precoding and quantity-of-layers indicator field is used to indicate a quantity of layers that is configured for the terminal device, the codebook is preconfigured, and the preconfigured codebook and the configured quantity of layers are used for the data transmission; or a bit other than B1 bits in the precoding and quantity-of-layers indicator field is used to indicate a quantity of layers and a codebook that are configured for the terminal device, and the configured codebook and the configured quantity of layers are used for the data transmission, where the B bits include the B1 bits. According to the method, when the time domain resource is configured for the terminal device by using the RV version indicator field, the RV sequence indicator field, and/or the precoding and quantity-of-layers indicator field in the DCI, the RV version, the RV sequence, and/or the precoding and the quantity of layers that correspond/corresponds to the data transmission may be determined, to normally implement the data transmission between a network device and the terminal device.

According to an eighth aspect, a time domain resource configuration method is provided, and includes: sending downlink control information DCI, where the DCI includes a time domain resource allocation field and a first field, the time domain resource allocation field and B bits in the first field are jointly used to indicate, from N4 candidate time domain resources, a time domain resource configured for a terminal device, B is an integer greater than or equal to 1, a quantity of bits in the time domain resource allocation field is a maximum quantity of bits that is supported by the time domain resource allocation field, and the maximum quantity of bits that is supported by the time domain resource allocation field is less than a quantity of bits required for configuring the time domain resource from the N4 candidate time domain resources for the terminal device, where N4 is an integer greater than or equal to 1; and performing data transmission on the configured time domain resource.

In a possible design, the method further includes any method according to the second aspect. In this case, the N4 candidate time domain resources are the N2 candidate time domain resources in the method according to the second aspect.

In a possible design, the first field includes one or more of the following fields: an RV version indicator field, an RV sequence indicator field, and a precoding and quantity-of-layers indicator field.

In a possible design, when the first field includes the RV version indicator field, an RV version corresponding to the data transmission is a predefined RV version; when the first field includes the RV sequence indicator field, an RV sequence corresponding to the data transmission is a predefined RV sequence; and/or when the first field includes the precoding and quantity-of-layers indicator field, a quantity of layers and a codebook that are used for the data transmission can be any one of the following:

a bit other than B bits in the precoding and quantity-of-layers indicator field is used to indicate a codebook configured for the terminal device, the quantity of layers is preconfigured, and the configured codebook and the preconfigured quantity of layers are used for the data transmission;

a bit other than B1 bits in the precoding and quantity-of-layers indicator field is used to indicate a quantity of layers that is configured for the terminal device, the codebook is preconfigured, and the preconfigured codebook and the configured quantity of layers are used for the data transmission; or a bit other than B bits in the precoding and quantity-of-layers indicator field is used to indicate a quantity of layers and a codebook that are configured for the terminal device, and the configured codebook and the configured quantity of layers are used for the data transmission, where the B bits include the B1 bits.

According to a ninth aspect, an apparatus is provided, includes a communications module and a processing module, and is configured to implement any method according to the seventh aspect. The communications module is configured to receive downlink control information DCI, where the DCI includes a time domain resource allocation field and a first field, the time domain resource allocation field and B bits in the first field are jointly used to indicate, from N4 candidate time domain resources, a time domain resource configured for a terminal device, B is an integer greater than or equal to 1, a quantity of bits in the time domain resource allocation field is a maximum quantity of bits that is supported by the time domain resource allocation field, and the maximum quantity of bits that is supported by the time domain resource allocation field is less than a quantity of bits required for configuring the time domain resource from the N4 candidate time domain resources for the terminal device, where N4 is an integer greater than or equal to 1. The communications module is configured to perform data transmission on the configured time domain resource. The processing module is configured to determine, in the N4 candidate time domain resources based on the time domain resource allocation field and the B bits in the first field, the time domain resource configured for the terminal device.

In a possible design, the communications module in the apparatus may further have a function of the communications module in the apparatus according to the third aspect, and the processing module in the apparatus may further have a function of the processing module in the apparatus according to the third aspect. In this case, the N4 candidate time domain resources are the N2 candidate time domain resources according to the third aspect.

In a possible design, for the first field, refer to corresponding descriptions in the seventh aspect, and details are not described herein again.

According to a tenth aspect, an apparatus is provided, includes a communications module and a processing module, and is configured to implement any method according to the eighth aspect. The processing module is configured to generate downlink control information DCI. The communications module is configured to send the DCI, where the DCI includes a time domain resource allocation field and a first field, the time domain resource allocation field and B bits in the first field are jointly used to indicate, from N4 candidate time domain resources, a time domain resource configured for a terminal device, B is an integer greater than or equal to 1, a quantity of bits in the time domain resource allocation field is a maximum quantity of bits that is supported by the time domain resource allocation field, and the maximum quantity of bits that is supported by the time domain resource allocation field is less than a quantity of bits required for configuring the time domain resource from the N4 candidate time domain resources for the terminal device, where N4 is an integer greater than or equal to 1. The communications module is configured to perform data transmission with the terminal device on the configured time domain resource.

In a possible design, the communications module in the apparatus may further have a function of the communications module in the apparatus according to the fourth aspect, and the processing module in the apparatus may further have a function of the processing module in the apparatus according to the fourth aspect. In this case, the N4 candidate time domain resources are the N2 candidate time domain resources according to the fourth aspect.

In a possible design, for the first field, refer to corresponding descriptions in the eighth aspect, and details are not described herein again.

According to an eleventh aspect, an apparatus is provided. The apparatus can implement any method according to the seventh aspect. The apparatus may be implemented by using hardware, software, or a combination of hardware and software. The hardware or the software includes one or more modules corresponding to the foregoing method. In an example, the apparatus includes a processor, a memory, and a communications interface. The memory is coupled to the processor, and the processor executes an instruction stored in the memory. The processor is coupled to the communications interface, and the processor sends and/or receives a signal through the communications interface. In another example, the apparatus includes a processor and a memory. The memory is coupled to the processor, and the processor executes an instruction stored in the memory. The processor generates and sends a signal, and/or receives and processes a signal.

In a possible design, the apparatus includes a processor and a communications interface. The communications interface is configured to receive downlink control information DCI, where the DCI includes a time domain resource allocation field and a first field, the time domain resource allocation field and B bits in the first field are jointly used to indicate, from N4 candidate time domain resources, a time domain resource configured for a terminal device, B is an integer greater than or equal to 1, a quantity of bits in the time domain resource allocation field is a maximum quantity of bits that is supported by the time domain resource allocation field, and the maximum quantity of bits that is supported by the time domain resource allocation field is less than a quantity of bits required for configuring the time domain resource from the N4 candidate time domain resources for the terminal device, where N4 is an integer greater than or equal to 1. The communications interface is configured to perform data transmission on the configured time domain resource. The processor is configured to determine, in the N4 candidate time domain resources based on the time domain resource allocation field and the B bits in the first field, the time domain resource configured for the terminal device.

In a possible design, the communications interface in the apparatus may further have a function of the communications interface in the apparatus according to the fifth aspect, and the processor in the apparatus may further have a function of the processor in the apparatus according to the fifth aspect. In this case, the N4 candidate time domain resources are the N2 candidate time domain resources according to the fifth aspect.

In a possible design, for the first field, refer to corresponding descriptions in the seventh aspect, and details are not described herein again.

According to a twelfth aspect, an apparatus is provided. The apparatus can implement any method according to the eighth aspect. The apparatus may be implemented by using hardware, software, or a combination of hardware and software. The hardware or the software includes one or more modules corresponding to the foregoing method. In an example, the apparatus includes a processor, a memory, and a communications interface. The memory is coupled to the processor, and the processor executes an instruction stored in the memory. The processor is coupled to the communications interface, and the processor sends and/or receives a signal through the communications interface. In another example, the apparatus includes a processor and a memory. The memory is coupled to the processor, and the processor executes an instruction stored in the memory. The processor generates and sends a signal, and/or receives and processes a signal.

In a possible design, the apparatus includes a processor and a communications interface. The processor is configured to generate downlink control information DCI. The communications interface is configured to send the DCI, where the DCI includes a time domain resource allocation field and a first field, the time domain resource allocation field and B bits in the first field are jointly used to indicate, from N4 candidate time domain resources, a time domain resource configured for a terminal device, B is an integer greater than or equal to 1, a quantity of bits in the time domain resource allocation field is a maximum quantity of bits that is supported by the time domain resource allocation field, and the maximum quantity of bits that is supported by the time domain resource allocation field is less than a quantity of bits required for configuring the time domain resource from the N4 candidate time domain resources for the terminal device, where N4 is an integer greater than or equal to 1. The communications interface is configured to perform data transmission with the terminal device on the configured time domain resource.

In a possible design, the communications interface in the apparatus may further have a function of the communications interface in the apparatus according to the sixth aspect, and the processor in the apparatus may further have a function of the processor in the apparatus according to the sixth aspect. In this case, the N4 candidate time domain resources are the N2 candidate time domain resources according to the sixth aspect.

In a possible design, for the first field, refer to corresponding descriptions in the eighth aspect, and details are not described herein again.

According to a thirteenth aspect, this application provides a computer program product including an instruction. When the computer program product is run on a computer, the computer is enabled to perform any method according to the first aspect, or the computer is enabled to perform any method according to the second aspect, or the computer is enabled to perform any method according to the seventh aspect, or the computer is enabled to perform any method according to the eighth aspect.

According to a fourteenth aspect, this application provides a computer-readable storage medium. The computer-readable storage medium includes an instruction, and when the instruction is run on a computer, the computer is enabled to perform any method according to the first aspect, or the computer is enabled to perform any method according to the second aspect, or the computer is enabled to perform any method according to the seventh aspect, or the computer is enabled to perform any method according to the eighth aspect.

According to a fifteenth aspect, an embodiment of this application provides a chip system. The chip system includes a processor, may further include a memory, and is configured to implement any method according to the first aspect, or is configured to implement any method according to the second aspect, or is configured to implement any method according to the seventh aspect, or is configured to implement any method according to the eighth aspect.

According to a sixteenth aspect, this application provides a communications system. The communications system includes any apparatus according to the third aspect and any apparatus according to the fourth aspect, or includes any apparatus according to the fifth aspect and any apparatus according to the sixth aspect, or includes any apparatus according to the ninth aspect and any apparatus according to the tenth aspect, or includes any apparatus according to the eleventh aspect and any apparatus according to the twelfth aspect.

DESCRIPTION OF EMBODIMENTS

Figure 1:
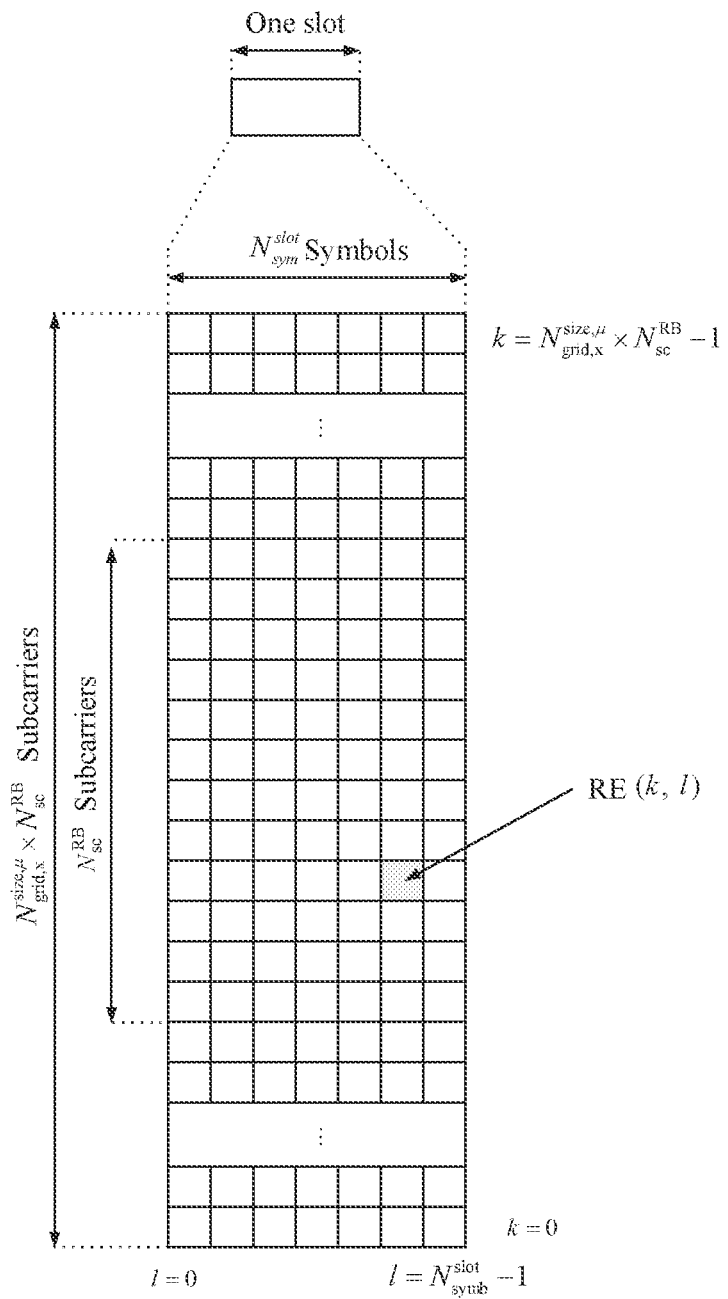
FIG. 1 is a diagram of an example of a resource grid according to an embodiment of this application.

Technical solutions provided in embodiments of this application may be used in various communications systems. For example, the technical solutions provided in the embodiments of this application may be used in a communications system, such as a fifth generation (5G) mobile communications system, a long-term evolution (LTE) system, or a future communications system, in which a time domain resource can be configured. 5G may also be referred to as new radio (NR).

In the communications system, the technical solutions provided in the embodiments of this application may be used in wireless communication between communications devices. The communications devices may include a network device and a terminal device. The wireless communication between the communications devices may include wireless communication between a network device and a terminal device, wireless communication between network devices, and wireless communication between terminal devices. In the embodiments of this application, the term "wireless communication" may also be referred to as "communication" for short, and the term "communication" may also be described as "data transmission", "signal transmission", "information transmission", "transmission", or the like. In the embodiments of this application, transmission may be uplink transmission, for example, signal sending from a terminal device to a network device. Alternatively, the transmission may be downlink transmission, for example, signal sending from a network device to a terminal device.

The terminal device in the embodiments of this application may also be referred to as a terminal, and may be a device having a wireless transceiver function. The terminal may be deployed on land, and includes an indoor device, an outdoor device, a handheld device, or a vehicle-mounted device. Alternatively, the terminal may be deployed on the water (for example, on a ship), or may be deployed in the air (for example, on an aircraft, a balloon, or a satellite). The terminal device may be user equipment (UE). The UE includes a handheld device having a wireless communication function, a vehicle-mounted device, a wearable device, or a computing device. For example, the UE may be a mobile phone, a tablet computer, or a computer having a wireless transceiver function. Alternatively, the terminal device may be a virtual reality (VR) terminal device, an augmented reality (AR) terminal device, a wireless terminal in industrial control, a wireless terminal in self driving, a wireless terminal in telemedicine, a wireless terminal in a smart grid, a wireless terminal in a smart city, a wireless terminal in a smart home, or the like. In the embodiments of this application, an apparatus for implementing a function of a terminal may be a terminal, or may be an apparatus, for example, a chip system, that can support a terminal in implementing the function. In the embodiments of this application, the chip system may include a chip, or may include a chip and another discrete component. The technical solutions provided in the embodiments of this application are described by using an example in which the apparatus for implementing the function of the terminal is a terminal and the terminal is UE.

The network device in the embodiments of this application includes a base station (BS), and may be a device that is deployed in a radio access network and that can perform wireless communication with the terminal. The base station may be in a plurality of forms, for example, a macro base station, a micro base station, a relay station, and an access point. For example, the base station in the embodiments of this application may be a base station in 5G or a base station in LTE, and the base station in 5G may also be referred to as a transmission reception point (TRP) or a gNB. In the embodiments of this application, an apparatus for implementing a function of a network device may be a network device, or may be an apparatus, for example, a chip system, that can support a network device in implementing the function. The technical solutions provided in the embodiments of this application are described by using an example in which the apparatus for implementing the function of the network device is a network device and the network device is a base station.

In a communications system, a base station and UE may communicate with each other on an air interface resource. In an orthogonal frequency division multiplexing (OFDM)-based communications system, the air interface resource includes a time domain resource and a frequency domain resource, and the time domain resource and the frequency domain resource may be referred to as a time-frequency resource. For example, the time-frequency resource may be described by using a resource grid shown in FIG. 1. Resource grids may be classified into an uplink resource grid and a downlink resource grid based on a signal transmission direction. As shown in FIG. 1, the resource grid includes a total of $N_{grid,x}^{size,\mu} \times N_{sc}^{RB}$ subcarriers in frequency domain, namely, a subcarrier 0 to a subcarrier $N_{grid,x}^{size,\mu} \times N_{sc}^{RB} - 1$, and includes a total of $N_{slot}^{symb}$ symbols in time domain, namely, a symbol 0 to a symbol $N_{slot}^{symb} - 1$.

Each grid in the resource grid corresponds to one RE, and one RE corresponds to one symbol in time domain and one subcarrier in frequency domain. A spacing between adjacent subcarriers in frequency domain is referred to as a subcarrier spacing (SC). The subcarrier spacing Δf may be described or configured by using μ shown in Table 1, where μ may also be referred to as a subcarrier spacing index or a subcarrier spacing identifier. Further, as shown in Table 1, a corresponding cyclic prefix (CP) type may further be configured for μ. It may be considered that the subcarrier spacing and the CP type are included in a frame structure numerology.

TABLE 1

| μ | Δf = $2^\mu \cdot 15$[kHz] | Cyclic prefix CP type |
|---|---|---|
| 0 | 15 | Normal |
| 1 | 30 | Normal |
| 2 | 60 | Normal and extended |
| 3 | 120 | Normal |
| 4 | 240 | Normal |

$N_{grid,x}^{size,\mu}$ is a size, of the resource grid, corresponding to the subcarrier spacing index μ in frequency domain, and for example, may be a quantity of resource blocks (RB) included in the resource grid. One RB includes $N_{sc}^{RB}$ subcarriers, for example, 12 subcarriers. x represents a signal transmission direction on the resource grid. For example, the signal transmission direction may be an uplink direction or a downlink direction.

The frame structure numerology may further include $N_{slot}^{symb}$, $N_{slot}^{frame,\mu}$, and $N_{slot}^{subframe,\mu}$. $N_{slot}^{symb}$ represents a quantity of OFDM symbols included in one slot, $N_{slot}^{frame,\mu}$ represents a quantity, of slots included in one radio frame, corresponding to the subcarrier spacing index μ, and $N_{slot}^{subframe,\mu}$ represents a quantity, of slots included in one subframe, corresponding to the subcarrier spacing index μ. In this embodiment of this application, the symbol in the resource grid may be an OFDM symbol or an SC-FDMA (single-carrier frequency-devision multiple access) symbol.

For the subcarrier spacing index μ, when the cyclic prefix is a normal CP, Table 2 shows an example of configurations of $N_{slot}^{symb}$, $N_{slot}^{frame,\mu}$, and $N_{slot}^{subframe,\mu}$; and when the cyclic prefix is an extended CP, Table 3 shows an example of configurations of $N_{slot}^{symb}$, $N_{slot}^{frame,\mu}$, and $N_{slot}^{subframe,\mu}$.

When a base station and UE perform signal transmission, in time domain, a positive integer quantity of symbols may be used as a transmission unit or a transmission time interval (TTI), or a positive integer quantity of slots may be used as a transmission unit or a TTI, or a positive integer quantity of other time units may be used as a transmission unit or a TTI. This is not limited in this application. In the embodiments of this application, the time unit may be an absolute time unit, for example, 0.5 millisecond (ms), 1 ms, 2 ms or 10 ms; or may be a time unit such as a symbol, a slot, a mini-slot, a subframe, or a frame. One radio frame may include a positive integer quantity of subframes or slots, one subframe may include a positive integer quantity of slots, and one slot may include a positive integer quantity of symbols. In the embodiments of this application, the positive integer may be one, two, three, or more, and this is not limited in this application. For example, when a subframe length is 1 ms, Table 2 and Table 3 each show a quantity of slots included in one subframe and a quantity of symbols included in one slot.

TABLE 2

| μ | Quantity $N_{symb}^{slot}$ of symbols included in one slot | Quantity $N_{slot}^{frame,\mu}$ of slots included in one radio frame | Quantity $N_{slot}^{subframe,\mu}$ of slots included in one subframe |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

TABLE 3

| μ | Quantity of symbols included in one slot | Quantity of slots included in one radio frame | Quantity of slots included in one subframe |
|---|---|---|---|
| 2 | 12 | 40 | 4 |

Figure 2:
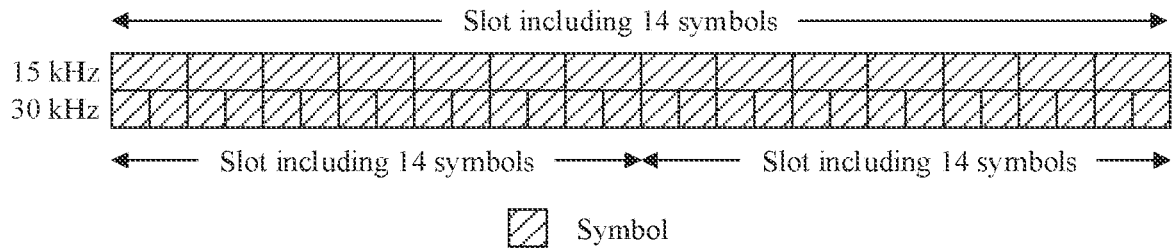
FIG. 2 is a diagram of an example of symbols and slots that correspond to different subcarrier spacing according to an embodiment of this application.

For one CP type, for example, the normal CP, if a subcarrier spacing $\Delta f_1$ is k times another subcarrier spacing $\Delta f_2$: $\Delta f_1 = k \times \Delta f_2$, a sum of lengths of k symbols corresponding to the subcarrier spacing $\Delta f_1$ is equal to a length of one symbol corresponding to the subcarrier spacing $\Delta f_2$, and a sum of lengths of k slots corresponding to the subcarrier spacing $\Delta f_1$ is equal to a length of one slot corresponding to the subcarrier spacing $\Delta f_2$. k is a positive integer. For example, k may be a multiple of 2. FIG. 2 is a diagram of an example of symbols and slots that correspond to different subcarrier spacings. As shown in FIG. 2, a sum of lengths of two symbols corresponding to 30 kHz is equal to a length of one symbol corresponding to 15 kHz, and a sum of lengths of two slots corresponding to 30 kHz is equal to a length of one slot corresponding to 15 kHz.

In a wireless communications system, a flexible time domain resource allocation method is proposed to adapt to various scenarios. In the flexible time domain resource allocation method, a time domain resource for a physical data channel may be preconfigured for UE or may be configured for UE by using signaling, such as semi-static signaling and/or dynamic signaling, sent by a base station to the UE. The base station and the UE may perform corresponding data transmission on the time domain resource configured for the UE.

In the embodiments of this application, the semi-static signaling may be radio resource control (RRC) signaling, a broadcast message, a system message, or a medium access control (MAC) control element (CE). The broadcast message may include remaining minimum system information (RMSI).

In the embodiments of this application, the dynamic signaling may be physical layer signaling. The physical layer signaling may be signaling carried on a physical control channel or signaling carried on the physical data channel. The physical control channel may be a physical downlink control channel (PDCCH), an enhanced physical downlink control channel (EPDCCH), a narrowband physical downlink control channel (NPDCCH), or a machine type communication (MTC) physical downlink control channel (MPDCCH). Signaling carried on the PDCCH or the EPDCCH may also be referred to as downlink control information (DCI). The physical control channel may alternatively be a physical sidelink control channel, and signaling carried on the physical sidelink control channel may also be referred to as sidelink control information (SCI).

In the embodiments of this application, the physical data channel may be a downlink channel, for example, a physical downlink shared channel (PDSCH). The physical data channel may alternatively be an uplink channel, for example, a physical uplink shared channel (PUSCH). The physical data channel may also be referred to as a data channel for short.

In the embodiments of this application, when the time domain resource for the physical data channel is configured for the UE, a method for configuring a time domain resource for the PDSCH may be the same as a method for configuring a time domain resource for the PUSCH. In the methods, a parameter related to the PDSCH may be the same as or different from a parameter related to the PUSCH. This is not limited in this application. For ease of description, in the embodiments of this application, the PDSCH may be used as an example for description.

In the Embodiments of this Application, when Configuring a Time Domain Resource for a Data Channel for UE, a Base Station May Use any One of the Following Method A1 to Method A3:

Method A1: First Signaling+Second Signaling

The base station configures one or more candidate time domain resource allocations for the UE by using the first signaling, and indicates, by using the second signaling, a time domain resource allocation configured for the UE. In the embodiments of this application, "a plurality of" may be two, three, four, or more. This is not limited in this application. A possible combination manner of the first signaling+ the second signaling includes: semi-static signaling (the first signaling)+dynamic signaling (the second signaling), or first semi-static signaling (the first signaling)+second semi-static signaling (the second signaling). In the embodiments of this application, descriptions may be provided by using an example in which the first signaling is semi-static signaling and the second signaling is dynamic signaling.

Method A2: Preconfiguration+Third Signaling

One or more candidate time domain resource allocations are preconfigured, and the base station indicates, by using the third signaling, a time domain resource allocation configured for the UE. The third signaling may be dynamic signaling or semi-static signaling. This is not limited in this application. In the embodiments of this application, descriptions may be provided by using an example in which the third signaling is dynamic signaling.

Method A3: Fourth Signaling+Preconfiguration

The base station configures one or more candidate time domain resource allocations for the UE by using semi-static signaling, and preconfigures a time domain resource allocation for the UE. The fourth signaling may be dynamic signaling or semi-static signaling. This is not limited in this application. In the embodiments of this application, descriptions may be provided by using an example in which the fourth signaling is semi-static signaling.

In the method A1 to the method A3, the time domain resource allocation configured for the UE is included in the candidate time domain resource allocations, and there are one or more candidate time domain resource allocations.

In the embodiments of this application, technical features may be distinguished by using terms such as first, second, third, A, B, and C. Unless otherwise specified, there is no chronological order or no size order between the distinguished technical features.

Optionally, when the time domain resource allocation is configured for the UE from the candidate time domain resource allocations by using signaling, for example, dynamic signaling, each of the candidate time domain resource allocations may correspond to a corresponding index, and the base station may indicate, by using the dynamic signaling, an index of the time domain resource allocation configured for the UE. After receiving the signaling, the UE may determine a time domain resource configured by the base station for the UE.

In the embodiments of this application, a time domain resource allocation for a PDSCH is used to indicate a time domain resource for the PDSCH, and may indicate $K_0$ of the PDSCH and a start symbol position S of the PDSCH and a length L of consecutive symbols in a slot used to transmit the PDSCH. $K_0$ is used to determine the slot used to transmit the PDSCH, and L indicates that a total of L symbols starting from the symbol S in the slot are used to transmit the PDSCH. An index of the slot used to transmit the PDSCH may be $$\left\lfloor n \times \frac{2^{\mu_{PDSCH}}}{2^{\mu_{PDCCH}}} \right\rfloor + K_0.$$

n represents an index of a slot used to transmit a PDCCH, and the PDCCH carries scheduling information or DCI that is used to schedule the PDSCH. $\mu_{PDSCH}$ represents a subcarrier spacing index of the PDSCH, and $\mu_{PDCCH}$ represents a subcarrier spacing index of the PDCCH.

For example, if $K_0$ is 1, a subcarrier spacing of the PDCCH is 15 kHz (where $\mu_{PDDCH}$ is 0), and a subcarrier spacing of the PDSCH is 30 kHz (where $\mu_{PDSCH}$ is 1), and if the base station sends the PDCCH in a slot whose index n is 1, and the PDCCH carries the scheduling information of the PDSCH, the base station sends the PDSCH in a slot whose index is $$\left\lfloor 1 \times \frac{2^1}{2^0} \right\rfloor + 1 = 3.$$

Correspondingly, if the UE receives the PDCCH in the slot whose index n is 1, and the PDCCH carries the scheduling information of the PDSCH, the UE receives the PDSCH in the slot whose index is $$\left\lfloor 1 \times \frac{2^1}{2^0} \right\rfloor + 1 = 3.$$

Optionally, the time domain resource allocation for the PDSCH may further be used to indicate a PDSCH mapping type. The PDSCH mapping type may be configured as a type A or a type B based on a resource position to which a demodulation reference signal (DMRS) for the PDSCH is mapped. The DMRS for the PDSCH is used to demodulate the PDSCH. For example, in the slot used to transmit the PDSCH, the base station maps the DMRS for the PDSCH to a corresponding resource and sends the DMRS to the UE. In the slot used to transmit the PDSCH, the UE receives the DMRS in the resource position to which the DMRS for the PDSCH is mapped, performs channel estimation based on the DMRS, and demodulates, based on a result of the channel estimation, the PDSCH received in the slot.

When the PDSCH mapping type is configured as the type A, in the slot used to transmit the PDSCH, a position of the DMRS for the PDSCH may be fixed or irrelevant to a position of the time domain resource for the PDSCH, and the symbol position of the DMRS may be indicated by using dmrs-TypeA-Position in signaling sent by the base station to the UE. The signaling may be a broadcast message or a master information block (MIB), or may be cell-level RRC signaling or other signaling. For example, a value of dmrs-TypeA-Position shown in Table 4(a) or Table 4(b) may be the symbol position that is of the DMRS and that is notified by the base station to the UE by using dmrs-TypeA-Position in the signaling, and is used to indicate the symbol position or a symbol index of the DMRS for the PDSCH. Optionally, for a same time domain resource allocation index, a plurality of symbol positions of the DMRS may be configured, and corresponding time domain resource allocations may be respectively configured for various symbol positions. For example, in Table 4(a), for an index 1, when the value of dmrs-TypeA-Position is 2, a corresponding start symbol position S=2 and L=12; and when the value of dmrs-TypeA-Position is 3, a corresponding start symbol position S=3, and L=11.

When the PDSCH mapping type is configured as the type B, in the slot used to transmit the PDSCH, a position of the DMRS may be on the first symbol of the time domain resource for the PDSCH, that is, the position of the DMRS may be on a symbol corresponding to the start symbol position S of the PDSCH.

For example, Table 4(a) shows an example of candidate time domain resource allocations for a PDSCH with a normal CP, and Table 4(b) shows an example of candidate time domain resource allocations for a PDSCH with an extended CP. Table 4(a) and Table 4(b) each show 16 candidate time domain resource allocations, and indexes of the time domain resource allocations are respectively 1 to 16. Optionally, the indexes of the time domain resource allocations may alternatively be 0 to 15 respectively. In the embodiments of this application, indexes may be numbered starting from 0 or 1. This is not limited in this application.

TABLE 4(a)

| Index | dmrs-TypeA-Position | PDSCH mapping type | $K_0$ | S | L |
|---|---|---|---|---|---|
| 1 | 2 | Type A | 0 | 2 | 12 |
|   | 3 | Type A | 0 | 3 | 11 |
| 2 | 2 | Type A | 0 | 2 | 10 |
|   | 3 | Type A | 0 | 3 | 9 |
| 3 | 2 | Type A | 0 | 2 | 9 |
|   | 3 | Type A | 0 | 3 | 8 |
| 4 | 2 | Type A | 0 | 2 | 7 |
|   | 3 | Type A | 0 | 3 | 6 |
| 5 | 2 | Type A | 0 | 2 | 5 |
|   | 3 | Type A | 0 | 3 | 4 |
| 6 | 2 | Type B | 0 | 9 | 4 |
|   | 3 | Type B | 0 | 10 | 4 |
| 7 | 2 | Type B | 0 | 4 | 4 |
|   | 3 | Type B | 0 | 6 | 4 |
| 8 | 2, 3 | Type B | 0 | 5 | 7 |
| 9 | 2, 3 | Type B | 0 | 5 | 2 |
| 10 | 2, 3 | Type B | 0 | 9 | 2 |
| 11 | 2, 3 | Type B | 0 | 12 | 2 |
| 12 | 2, 3 | Type A | 0 | 1 | 13 |
| 13 | 2, 3 | Type A | 0 | 1 | 6 |
| 14 | 2, 3 | Type A | 0 | 2 | 4 |
| 15 | 2, 3 | Type B | 0 | 4 | 7 |
| 16 | 2, 3 | Type B | 0 | 8 | 4 |

TABLE 4(b)

| Index | dmrs-TypeA-Position | PDSCH mapping type | $K_0$ | S | L |
|---|---|---|---|---|---|
| 1 | 2 | Type A | 0 | 2 | 6 |
|   | 3 | Type A | 0 | 3 | 5 |
| 2 | 2 | Type A | 0 | 2 | 10 |
|   | 3 | Type A | 0 | 3 | 9 |
| 3 | 2 | Type A | 0 | 2 | 9 |
|   | 3 | Type A | 0 | 3 | 8 |
| 4 | 2 | Type A | 0 | 2 | 7 |
|   | 3 | Type A | 0 | 3 | 6 |
| 5 | 2 | Type A | 0 | 2 | 5 |
|   | 3 | Type A | 0 | 3 | 4 |
| 6 | 2 | Type B | 0 | 6 | 4 |
|   | 3 | Type B | 0 | 8 | 2 |
| 7 | 2 | Type B | 0 | 4 | 4 |
|   | 3 | Type B | 0 | 6 | 4 |
| 8 | 2, 3 | Type B | 0 | 5 | 6 |

TABLE 4(b)-continued

| Index | dmrs-TypeA-Position | PDSCH mapping type | $K_0$ | S | L |
|---|---|---|---|---|---|
| 9 | 2, 3 | Type B | 0 | 5 | 2 |
| 10 | 2, 3 | Type B | 0 | 9 | 2 |
| 11 | 2, 3 | Type B | 0 | 10 | 2 |
| 12 | 2, 3 | Type A | 0 | 1 | 11 |
| 13 | 2, 3 | Type A | 0 | 1 | 6 |
| 14 | 2, 3 | Type A | 0 | 2 | 4 |
| 15 | 2, 3 | Type B | 0 | 4 | 6 |
| 16 | 2, 3 | Type B | 0 | 8 | 4 |

In the embodiments of this application, a time domain resource allocation for a PUSCH is used to indicate a time domain resource for the PUSCH, and may be used to indicate $K_2$ of the PUSCH and a start symbol position S of the PUSCH and a length L of consecutive symbols in a slot used to transmit the PUSCH. $K_2$ is used to determine the slot used to transmit the PUSCH, and L indicates that a total of L symbols starting from the symbol S in the slot are used to transmit the PUSCH. An index of the slot used to transmit the PUSCH may be $$\left\lfloor n \times \frac{2^{\mu_{PUSCH}}}{2^{\mu_{PDCCH}}} \right\rfloor + K_2.$$

n represents an index of a slot used to transmit a PDCCH, and the PDCCH carries scheduling information or DCI that is used to schedule the PUSCH. $\mu_{PUSCH}$ represents a subcarrier spacing index of the PUSCH, and $\mu_{PDCCH}$ represents a subcarrier spacing index of the PDCCH.

Optionally, the time domain resource allocation for the PUSCH may further be used to indicate a PUSCH mapping type. The PUSCH mapping type may be configured as a type A) or a type B based on a resource position to which a DMRS for the PUSCH is mapped. The DMRS for the PUSCH is used to demodulate the PUSCH. For example, in the slot used to transmit the PUSCH, the UE maps the DMRS for the PUSCH to a corresponding resource and sends the DMRS to the base station. In the slot used to transmit the PUSCH, the base station receives the DMRS in the resource position to which the DMRS for the PUSCH is mapped, performs channel estimation based on the DMRS, and demodulates, based on a result of the channel estimation, the PUSCH received in the slot.

When the PUSCH mapping type is configured as the type A, in the slot used to transmit the PUSCH, a position of the DMRS for the PUSCH may be fixed or irrelevant to a position of the time domain resource for the PUSCH, and for example, may be on the third or the fourth symbol in the slot. The symbol position of the DMRS may be indicated by using dmrs-TypeA-Position in signaling sent by the base station to the UE. The signaling may be a broadcast message or a master information block (MIB), or may be cell-level RRC signaling or other signaling.

When the PUSCH mapping type is configured as the type B, in the slot used to transmit the PUSCH, a position of the DMRS for the PUSCH may be on the first symbol of the time domain resource for the PUSCH, that is, the position of the DMRS is on a symbol corresponding to the start symbol position S of the PUSCH.

For example, Table 5(a) shows an example of candidate time domain resource allocations for a PUSCH with a normal CP, and Table 5(b) shows an example of candidate time domain resource allocations for a PUSCH with an extended CP. Table 5(a) and Table 5(b) each show 16 candidate time domain resource allocations, and indexes of the time domain resource allocations are respectively 1 to 16. Optionally, the indexes of the time domain resource allocations may alternatively be 0 to 15 respectively.

TABLE 5(a)

| Index | PUSCH mapping type | $K_2$ | S | L |
|---|---|---|---|---|
| 1 | Type A | j | 0 | 14 |
| 2 | Type A | j | 0 | 12 |
| 3 | Type A | j | 0 | 10 |
| 4 | Type B | j | 2 | 10 |
| 5 | Type B | j | 4 | 10 |
| 6 | Type B | j | 4 | 8 |
| 7 | Type B | j | 4 | 6 |
| 8 | Type A | j + 1 | 0 | 14 |
| 9 | Type A | j + 1 | 0 | 12 |
| 10 | Type A | j + 1 | 0 | 10 |
| 11 | Type A | j + 2 | 0 | 14 |
| 12 | Type A | j + 2 | 0 | 12 |
| 13 | Type A | j + 2 | 0 | 10 |
| 14 | Type B | j | 8 | 6 |
| 15 | Type A | j + 3 | 0 | 14 |
| 16 | Type A | j + 3 | 0 | 10 |

TABLE 5(b)

| Index | PUSCH mapping type | $K_2$ | S | L |
|---|---|---|---|---|
| 1 | Type A | j | 0 | 8 |
| 2 | Type A | j | 0 | 12 |
| 3 | Type A | j | 0 | 10 |
| 4 | Type B | j | 2 | 10 |
| 5 | Type B | j | 4 | 4 |
| 6 | Type B | j | 4 | 8 |
| 7 | Type B | j | 4 | 6 |
| 8 | Type A | j + 1 | 0 | 8 |
| 9 | Type A | j + 1 | 0 | 12 |
| 10 | Type A | j + 1 | 0 | 10 |
| 11 | Type A | j + 2 | 0 | 6 |
| 12 | Type A | j + 2 | 0 | 12 |
| 13 | Type A | j + 2 | 0 | 10 |
| 14 | Type B | j | 8 | 4 |
| 15 | Type A | j + 3 | 0 | 8 |
| 16 | Type A | j + 3 | 0 | 10 |

A value of j corresponding to $K_2$ in Table 5(a) and Table 5(b) may be shown in Table 6.

TABLE 6

| $\mu_{PUSCH}$ | j |
|---|---|
| 0 | 1 |
| 1 | 1 |
| 2 | 2 |
| 3 | 3 |

In the embodiments of this application, a quantity of candidate time domain resource allocations is not limited to 16 in Table 4(a), Table 4(b), Table 5(a), or Table 5(b), and may be any positive integer, for example, one, two, three, four, or more. This is not limited in this application.

Optionally, when the time domain resource allocation is used to indicate the start symbol position S of the data channel and the length L of the consecutive symbols in the slot used to transmit the data channel, S and L may be separately indicated, as shown in Table 4(a), Table 4(b), Table 5(a), or Table 5(b); or S and L may be jointly indicated by using a start and length indication value (SLIV). For example, when S and L are indicated by using the SLIV, if $(L-1) \le \frac{N_{symb}^{slot}}{2}$, $SLIV = N_{symb}^{slot} \times (L-1) + S$;

otherwise, $SLIV = N_{symb}^{slot} \times (N_{symb}^{slot} - L + 1) + (N_{symb}^{slot} - 1 - S)$.

$N_{symb}^{slot}$ indicates a quantity of symbols included in each slot. For example, when $N_{symb}^{slot}$ is equal to 14, Table 7 shows a correspondence among a SLIV, S, and L. S and L each may be uniquely determined based on the SLIV. For example, when the SLIV is respectively 0 to 13, S is 1, and L is respectively 0 to 13.

TABLE 7

| SLIV | S | L |
|---|---|---|
| 0 to 13 | 1 | 0 to 13 |
| 14 to 26 | 2 | 0 to 12 |
| 28 to 39 | 3 | 0 to 11 |
| 42 to 52 | 4 | 0 to 10 |
| 56 to 65 | 5 | 0 to 9 |
| 70 to 78 | 6 | 0 to 8 |
| 84 to 91 | 7 | 0 to 7 |
| 98 to 104 | 8 | 0 to 6 |
| 97 to 92 | 9 | 0 to 5 |
| 83 to 79 | 10 | 0 to 4 |
| 69 to 66 | 11 | 0 to 3 |
| 55 to 53 | 12 | 0 to 2 |
| 41 and 40 | 13 | 0 and 1 |
| 27 | 14 | 0 |

In the embodiments of this application, when a time domain resource is configured for the UE from one or more candidate time domain resources by using signaling such as dynamic signaling, namely, DCI, an index of a time domain resource allocation corresponding to the configured time domain resource may be indicated. In a possible implementation, a quantity of candidate time domain resource allocations is N, where N is a positive integer with a maximum value of $N_{max}$. For example, $N_{max}$ is 16. Indexes of the time domain resource allocations are respectively 0 to N−1 or 1 to N. In the embodiments of this application, descriptions may be provided by using an example in which the indexes are 0 to N−1. When the index of the time domain resource allocation configured for the UE is indicated by using the DCI, a $\log_2(N)$-bit time domain resource allocation field may be used for indication. Because the maximum value of N is $N_{max}$, a maximum size of the time domain resource allocation field is $\log_2(N_{max})$ bits. For example, as shown in Table 4(a), when there are 16 candidate time domain resource allocations, indexes of the 16 time domain resource allocations are respectively 0 to 15, and the base station may indicate, by using a $\log_2(16)=4$-bit time domain resource allocation field in the DCI, the index of the time domain resource allocation configured for the UE. For example, when a value indicated by information in the 4-bit time domain resource allocation field is 1, the time domain resource allocation configured for the UE is a time domain resource allocation corresponding to the index 1 in Table 4(a). Optionally, if the indexes of the 16 time domain resource allocations are respectively 1 to 16, and the base station may indicate, by using a $\log_2(16)=4$-bit time domain resource allocation field in the DCI, the index of the time domain resource allocation configured for the UE. For example, when a value indicated by information in the 4-bit time domain resource allocation field is m, the time domain resource allocation configured for the UE is a time domain resource allocation corresponding to an index m+1 in Table 4(a), where m is any integer ranging from 0 to 15.

In the foregoing possible implementation, for defined $N_{max}$, where for example, $N_{max}=16$, a more flexible time domain resource may need to be supported as a system design requirement such as a requirement for service diversity or scenario diversity increases. Therefore, a quantity of candidate time domain resources needs to be increased, and further, a quantity of candidate time domain resource allocations needs to be increased. In this case, if a conventional time domain resource configuration method is used, signaling overheads may be increased. For example, overheads of signaling used to indicate the candidate time domain resource allocations may be increased, and/or overheads of signaling used to indicate the time domain resource allocation configured for the UE may be increased.

Figure 3:
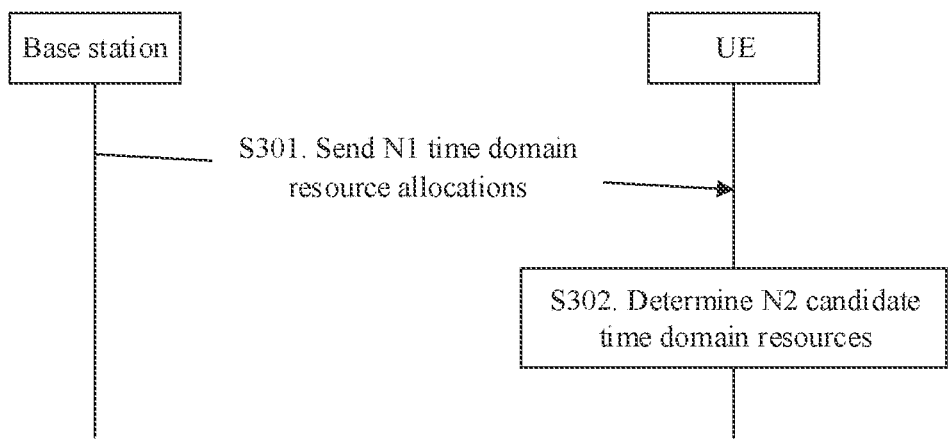
FIG. 3 and FIG. 4 are flowcharts of time domain resource configuration methods according to embodiments of this application.

FIG. 3 shows a first time domain resource configuration method for a data channel according to an embodiment of this application, to increase a quantity of candidate time domain resource allocations with low signaling overheads.

S301. A base station sends time domain resource allocation indication information to UE, where the time domain resource allocation indication information is used to indicate N1 time domain resource allocations, where N1 is an integer greater than or equal to 1. Correspondingly, the UE receives the time domain resource allocation indication information sent by the base station.

One of the N1 time domain resource allocations may be used to indicate one candidate time domain resource. In this case, S301 may also be described as follows: A base station sends time domain resource allocation indication information to UE, where the time domain resource allocation indication information is used to indicate N1 time domain resource allocations, and the N1 time domain resource allocations are respectively used to indicate N1 candidate time domain resources.

S302. The UE determines N2 candidate time domain resources based on the N1 time domain resource allocations, where N2 is an integer greater than N1.

Optionally, a value of N2 may be preconfigured or predefined, or may be indicated by the base station to the UE by using signaling.

In the method in FIG. 3, when needing to configure the N2 candidate time domain resources for the UE, the base station indicates the N1 time domain resource allocations to the UE, and the UE may determine the N2 candidate time domain resources by using the N1 time domain resource allocations. In a conventional resource configuration method, when needing to configure the N2 candidate time domain resources for the UE, the base station needs to indicate N2 time domain resource allocations to the UE. Therefore, compared with the conventional time domain resource configuration method, the method provided in this embodiment of this application reduces signaling overheads of N2-N1 time domain resource allocations.

In this embodiment of this application, when the N2 candidate time domain resources are determined based on the N1 time domain resource allocations, N3 candidate time domain resources in the N2 candidate time domain resources may be determined based on one of the N1 time domain resource allocations, where N3 is an integer greater than or equal to 1. N3 corresponding to different time domain resource allocations in the N1 time domain resource allocations may be the same or may be different. This is not limited in this application.

Optionally, a value of N3 may be preconfigured or predefined, and for example, may be predefined as 2 or 4; or may be indicated by the base station to the UE by using signaling.

For example, the base station sends the time domain resource allocation indication information to the UE, where the time domain resource allocation indication information is used to indicate three (namely, N1=3) time domain resource allocations. The UE receives the time domain resource allocation indication information, determines one candidate time domain resource based on the first time domain resource allocation indicated by the information, determines two candidate time domain resources based on the second time domain resource allocation indicated by the information, and determines four candidate time domain resources based on the third time domain resource allocation indicated by the information. In other words, the UE may determine a total of 1+2+4=7 (namely, N2=7) candidate time domain resources based on the three time domain resource allocations indicated by the time domain resource allocation indication information.

For another example, the base station sends the time domain resource allocation indication information to the UE, where the time domain resource allocation indication information is used to indicate two (namely, N1=2) time domain resource allocations. The UE receives the time domain resource allocation indication information, determines three candidate time domain resources based on the first time domain resource allocation indicated by the information, and determines three candidate time domain resources based on the second time domain resource allocation indicated by the information. In other words, the UE may determine a total of 3+3=6 (namely, N2=6) candidate time domain resources based on the two time domain resource allocations indicated by the time domain resource allocation indication information.

In this embodiment of this application, for one of the N1 time domain resource allocations, the N3 candidate time domain resources in the N2 candidate time domain resources may be determined based on the time domain resource allocation and according to a preconfigured rule.

In this embodiment of this application, for one of the N1 time domain resource allocations, the time domain resource allocation may be used to indicate one time domain resource for the data channel. This may alternatively be described as that the time domain resource allocation may be used to indicate one candidate time domain resource for the data channel. For example, the time domain resource allocation may be used to indicate a start symbol position S and a length L of the data channel in a slot used to transmit the data channel, where S is an integer greater than or equal to 0 and less than or equal to $N_{slot}^{symb}-1$, L is an integer greater than or equal to 1 and less than $N_{slot}^{symb}$, and $N_{slot}^{symb}$ is a quantity of symbols included in one slot. S and L may be separately indicated, as shown in Table 4(a), Table 4(b), Table 5(a), and Table 5(b); or may be jointly indicated by using a SLIV, as shown in Table 7. This is not limited in this application. If one time domain resource allocation is used to indicate a start symbol position S and a length L of one candidate time domain resource, when N3 candidate time domain resources are determined based on the time domain resource allocation, one of the N3 candidate time domain resources may be determined by using any one of the following method B1 to method B3:

Method B1: A length of the candidate time domain resource is L, and a start symbol position S' of the candidate time domain resource is determined based on S.

Method B2: A length L' of the candidate time domain resource is determined based on L, and a start symbol position of the candidate time domain resource is S.

Method B3: A start symbol position S' of the candidate time domain resource is determined based on S, and a length L' of the candidate time domain resource is determined based on L.

Optionally, further, for one of the N1 time domain resource allocations, when the time domain resource allocation is further used to indicate K, and N3 candidate time domain resources are determined based on the time domain resource allocation, one of the N3 candidate time domain resources may be determined by using any one of the following method C1 to method C7. K is used to determine the slot used to transmit the data channel, and K is an integer greater than or equal to 0. For example, if the data channel is a PDSCH, K may be K described in content in Table 4(a) and Table 4(b). If the data channel is a PUSCH, K may be $K_2$ described in content in Table 5(a) and Table 5(b). For the method C1 to the method C7:

Method C1: K' of the candidate time domain resource is determined based on K, a start symbol position of the candidate time domain resource is S, and a length of the candidate time domain resource is L. In this embodiment of this application, K' of the candidate time domain resource is used to determine the slot used to transmit the data channel. If the data channel is a PDSCH, a meaning of K' may be similar to that of $K_0$ described in the content in Table 4(a) and Table 4(b). If the data channel is a PUSCH, a meaning of K' is similar to that of $K_2$ described in the content in Table 5(a) and Table 5(b).

Method C2: K' of the candidate time domain resource is determined based on K, a length of the candidate time domain resource is determined based on L, and a start symbol position of the candidate time domain resource is S.

Method C3: K' of the candidate time domain resource is determined based on K, a start symbol position S' of the candidate time domain resource is determined based on S, and a length of the candidate time domain resource is L.

Method C4: K' of the candidate time domain resource is determined based on K, a start symbol position S' of the candidate time domain resource is determined based on S, and a length L' of the candidate time domain resource is determined based on L.

Method C5: K' of the candidate time domain resource is K, a length of the candidate time domain resource is L, and a start symbol position S' of the candidate time domain resource is determined based on S.

Method C6: K' of the candidate time domain resource is K, a length L' of the candidate time domain resource is determined based on L, and a start symbol position of the candidate time domain resource is S.

Method C7: K' of the candidate time domain resource is K, a start symbol position S' of the candidate time domain resource is determined based on S, and a length L' of the candidate time domain resource is determined based on L.

Optionally, any one of the method B1 to the method B3 and the method C1 to the method C7 may be preconfigured for the UE to determine the N3 candidate time domain resources. Alternatively, the base station may indicate, by using signaling, the UE to determine the N3 candidate time domain resources by using any one of the method B1 to the method B3 and the method C1 to the method C7. To-be-used methods may be independently configured for different UEs.

For example, different UEs may determine candidate time domain resources by using different methods or a same method in the method B1 to the method B3 and the method C1 to the method C7. This is not limited in this application. Further, for one UE, methods may be independently configured in different transmission time even for different time domain resource allocations in the N1 time domain resource allocations. For example, in different transmission time, candidate time domain resources may be determined even for different time domain resource allocations in the N1 time domain resource allocations by using different methods or a same method in the method B1 to the method B3 and the method C1 to the method C7. This is not limited in this application.

Optionally, when S' is determined based on S, S' is an element in a set {S, S−D1, S+D1, S×scale1, ⌊S/scale1⌋, S−step1×i1, S+step1×i1}, or S' is an element in a subset of the set, where S' is an integer greater than or equal to 0 and less than or equal to $N_{slot}^{symb}-1$, i1, step1, and scale1 are positive integers, and D1 is one or more positive integers. The subset of the set {S, S−D1, S+D1, S×scale1, ⌊S/scale1⌋, S−step1×i1, S+step1×i1} includes any one or more elements in the set. This is not limited in this application.

Optionally, a value of D1 may be one or more positive integers that are configured by the base station for the UE by using signaling or that are predefined. Alternatively, D1 may be described as a set including one or more positive integers.

Optionally, a value of scale1 may be a positive integer that is configured by the base station for the UE by using signaling or that is predefined.

Optionally, a value of step1 may be a positive integer that is configured by the base station for the UE by using signaling or that is predefined.

Optionally, a value of i1 may be one or more positive integers that are configured by the base station for the UE by using signaling or that are predefined. For example, i1 is a positive integer that makes S' be greater than or equal to 0 and less than or equal to $N_{slot}^{symb}-1$.

Optionally, when L' is determined based on L, L' is an element in a set {L, L−D2, L+D2, L×scale2, ⌊L/scale2⌋, L−step2×i2, L+step2×i2}, or L' is an element in a subset of the set, where L' is an integer greater than or equal to 1 and less than $N_{slot}^{symb}$, i2 step2, and scale2 are positive integers, and D2 is one or more positive integers. The subset of the set {L, L−D2, L+D2, L×scale2, ⌊L/scale2⌋, L-step2×i2, L+step2×i2} includes any one or more elements in the set. This is not limited in this application.

Optionally, a value of D2 may be one or more positive integers that are configured by the base station for the UE by using signaling or that are predefined. Alternatively, D2 may be described as a set including one or more positive integers.

Optionally, a value of scale2 may be a positive integer that is configured by the base station for the UE by using signaling or that is predefined.

Optionally, a value of step2 may be a positive integer that is configured by the base station for the UE by using signaling or that is predefined.

Optionally, a value of i2 may be one or more predefined or configured positive integers. For example, i2 is a positive integer that makes L' be greater than or equal to 1 and less than $N_{slot}^{symb}$.

Optionally, when K' is determined based on K, K' is an element in a set {K, K−D3, K+D3, K×scale3, ⌊K/scale3⌋, K−step3×i3, K+step3×i3}, or K' is an element in a subset of the set, where K' is an integer greater than or equal to 0, 3, step3, and scale3 are positive integers, and D3 is one or more positive integers. The subset of the set {K, K−D3, K+D3, K×scale3, ⌊K/scale3⌋, K−step3×i3, K+step3×i3} includes any one or more elements in the set. This is not limited in this application.

Optionally, a value of D3 may be one or more positive integers that are configured by the base station for the UE by using signaling or that are predefined. Alternatively, D3 may be described as a set including one or more positive integers.

Optionally, a value of scale3 may be a positive integer that is configured by the base station for the UE by using signaling or that is predefined.

Optionally, a value of step3 may be a positive integer that is configured by the base station for the UE by using signaling or that is predefined.

Optionally, a value of i3 may be one or more positive integers that are configured by the base station for the UE by using signaling or that are predefined. For example, i3 is a positive integer that makes K' be greater than or equal to 0.

For example, for one of the N1 time domain resource allocations, the time domain resource allocation indicates a start symbol position S and a length L of one candidate time domain resource. When N3 candidate time domain resources are determined based on the time domain resource allocation, for one of the N3 candidate time domain resources, a start symbol position S' of the candidate time domain resource is S, S−D1, or S+D, in other words, S' is an element in a subset {S, S−D1, S+D1}, and a length L' of the candidate time domain resource is L. D1 may be one or more predefined or configured positive integers.

For example, when S=0, L=2, $N_{slot}^{symb}=14$, and D1={1, 2,4,6}, five (namely, N3=5) candidate time domain resources may be determined in total, and (S', L') corresponding to the five candidate time domain resources is respectively (0, 2), (1, 2), (2, 2), (4, 2), and (6, 2). For another example, when S=4, L=4, $N_{slot}^{symb}=14$, and D1={1, 2,4,6}, eight (namely, N3=8) candidate time domain resources may be determined in total, and (S', L') corresponding to the eight candidate time domain resources is respectively (0, 4), (2, 4), (3, 4), (4, 4), (5, 4), (6, 4), (8, 4), and (10, 4).

For example, when S=0, L=2, $N_{slot}^{symb}=14$, and D1={1, 2,4,6}, assuming that N3=4, four candidate time domain resources may be determined in total, and (S', L') corresponding to the four candidate time domain resources is respectively (0, 2), (1, 2), (2, 2), and (4, 2). For another example, when S=4, L=4, $N_{slot}^{symb}=14$, and D1={1,2,4,6}, assuming that N3=4, four candidate time domain resources may be determined in total, and (S', L') corresponding to the four candidate time domain resources is respectively (0, 4), (2, 4), (3, 4), and (4, 4).

For example, for one of the N1 time domain resource allocations, the time domain resource allocation indicates a start symbol position S and a length L of one candidate time domain resource. When N3 candidate time domain resources are determined based on the time domain resource allocation, for one of the N3 candidate time domain resources, a start symbol position S' of the candidate time domain resource is S or S+D1, in other words, S' is an element in a subset {S, S+D1}, and a length L' of the candidate time domain resource is L. D1 may be one or more predefined or configured positive integers.

For example, when S=4, L=4, $N_{slot}^{symb}=14$, and D1={1, 2,4,6}, five (namely, N3=8) candidate time domain resources may be determined in total, and (S', L') corresponding to the five candidate time domain resources is respectively (4, 4), (5, 4), (6, 4), (8, 4), and (10, 4).

For example, for one of the N1 time domain resource allocations, the time domain resource allocation indicates a start symbol position S and a length L of one candidate time domain resource. When N3 candidate time domain resources are determined based on the time domain resource allocation, for one of the N3 candidate time domain resources, a start symbol position S' of the candidate time domain resource is S or S−D1, in other words, S' is an element in a subset {S, S−D1}, and a length L' of the candidate time domain resource is L. D1 may be one or more predefined or configured positive integers.

For example, for one of the N1 time domain resource allocations, the time domain resource allocation indicates a start symbol position S and a length L of one candidate time domain resource. When N3 candidate time domain resources are determined based on the time domain resource allocation, for one of the N3 candidate time domain resources, a start symbol position S' of the candidate time domain resource is S, S−step1×i1, or S+step1×i1, in other words, S' is an element in a subset {S, S−step1×i1, S+step1×i1}, and a length L' of the candidate time domain resource is L.

For example, when S=0, L=2, $N_{slot}^{symb}$=14, and step1=2, seven (namely, N3=7) candidate time domain resources may be determined in total, and (S', L') corresponding to the seven candidate time domain resources is respectively (0, 2), (2, 2), (4, 2), (6, 2), (8, 2), (10, 2), and (12, 2). For another example, when S=4, L=4, $N_{slot}^{symb}$=14, and step1=2, seven (namely, N3=7) candidate time domain resources may be determined in total, and (S', L') corresponding to the seven candidate time domain resources is respectively (0, 4), (2, 4), (4, 4), (6, 4), (8, 4), (10, 4), and (12, 4).

For example, for one of the N1 time domain resource allocations, the time domain resource allocation indicates a start symbol position S and a length L of one candidate time domain resource. When N3 candidate time domain resources are determined based on the time domain resource allocation, for one of the N3 candidate time domain resources, a start symbol position S' of the candidate time domain resource is S or S+step1×i1, in other words, S' is an element in a subset {S, S+step1×i1}, and a length L' of the candidate time domain resource is L.

For example, when S=4, L=4, $N_{slot}^{symb}$=14, and step1=2, five (namely, N3=5) candidate time domain resources may be determined in total, and (S', L') corresponding to the five candidate time domain resources is respectively (4, 4), (6, 4), (8, 4), (10, 4), and (12, 4).

For example, for one of the N1 time domain resource allocations, the time domain resource allocation indicates a start symbol position S and a length L of one candidate time domain resource. When N3 candidate time domain resources are determined based on the time domain resource allocation, for one of the N3 candidate time domain resources, a start symbol position S' of the candidate time domain resource is S or S−step1×i1, in other words, S' is an element in a subset {S, S−step1×i1}, and a length L' of the candidate time domain resource is L.

For example, for one of the N1 time domain resource allocations, the time domain resource allocation indicates a start symbol position S and a length L of one candidate time domain resource. When N3 candidate time domain resources are determined based on the time domain resource allocation, for one of the N3 candidate time domain resources, a start symbol position S' of the candidate time domain resource is S, S×scale1, or ⌊S/scale1⌋, in other words, S' is an element in a subset {S, S×scale1, ⌊S/scale1⌋}, and a length L' of the candidate time domain resource is L.

For example, for one of the N1 time domain resource allocations, the time domain resource allocation indicates a start symbol position S and a length L of one candidate time domain resource. When N3 candidate time domain resources are determined based on the time domain resource allocation, for one of the N3 candidate time domain resources, a start symbol position S' of the candidate time domain resource is S or S×scale1, in other words, S' is an element in a subset {S, S×scale1}, and a length L' of the candidate time domain resource is L.

For example, for one of the N1 time domain resource allocations, the time domain resource allocation indicates a start symbol position S and a length L of one candidate time domain resource. When N3 candidate time domain resources are determined based on the time domain resource allocation, for one of the N3 candidate time domain resources, a start symbol position S' of the candidate time domain resource is S or ⌊S/scale1⌋, in other words, S' is an element in a subset {S, ⌊S/scale1⌋}, and a length L' of the candidate time domain resource is L.

For example, for one of the N1 time domain resource allocations, the time domain resource allocation indicates a start symbol position S and a length L of one candidate time domain resource. When N3 candidate time domain resources are determined based on the time domain resource allocation, for one of the N3 candidate time domain resources, a start symbol position S' of the candidate time domain resource is S, and a length L' of the candidate time domain resource is L, L+D2, or L−D2, in other words, L' is an element in a subset {L, L+D2, L−D2}.

For example, for one of the N1 time domain resource allocations, the time domain resource allocation indicates a start symbol position S and a length L of one candidate time domain resource. When N3 candidate time domain resources are determined based on the time domain resource allocation, for one of the N3 candidate time domain resources, a start symbol position S' of the candidate time domain resource is S, and a length L' of the candidate time domain resource is L or L+D2, in other words, L' is an element in a subset {L, L+D2}.

For example, when S=0, L=2, $N_{slot}^{symb}$=14, and D2={1, 2,4,6}, five (namely, N3=5) candidate time domain resources may be determined in total, and (S', L') corresponding to the five candidate time domain resources is respectively (0, 2), (0, 3), (0, 4), (0, 6), and (0, 8). For another example, when S=4, L=4, $N_{slot}^{symb}$=14, and D2={1, 2,4,6}, five (namely, N3=5) candidate time domain resources may be determined in total, and (S', L') corresponding to the five candidate time domain resources is respectively (4, 4), (4, 5), (4, 6), (4, 8), and (4, 10).

For example, for one of the N1 time domain resource allocations, the time domain resource allocation indicates a start symbol position S and a length L of one candidate time domain resource. When N3 candidate time domain resources are determined based on the time domain resource allocation, for one of the N3 candidate time domain resources, a start symbol position S' of the candidate time domain resource is S, and a length L' of the candidate time domain resource is L or L−D2, in other words, L' is an element in a subset {L, L−D2}.

For example, for one of the N1 time domain resource allocations, the time domain resource allocation indicates a start symbol position S and a length L of one candidate time domain resource. When N3 candidate time domain resources are determined based on the time domain resource allocation, for one of the N3 candidate time domain resources, a start symbol position S' of the candidate time domain resource is S, and a length L' of the candidate time domain resource is L, L−step2×i2, or L+step2×i2, in other words, L' is an element in a subset{L, L−step2×i2, L+step2×i2}.

For example, for one of the N1 time domain resource allocations, the time domain resource allocation indicates a start symbol position S and a length L of one candidate time domain resource. When N3 candidate time domain resources are determined based on the time domain resource allocation, for one of the N3 candidate time domain resources, a start symbol position S' of the candidate time domain resource is S, and a length L' of the candidate time domain resource is L or L−step2×i2, in other words, L' is an element in a subset {L, L−step2×i2}.

For example, for one of the N1 time domain resource allocations, the time domain resource allocation indicates a start symbol position S and a length L of one candidate time domain resource. When N3 candidate time domain resources are determined based on the time domain resource allocation, for one of the N3 candidate time domain resources, a start symbol position S' of the candidate time domain resource is S, and a length L' of the candidate time domain resource is L or L+step2×i2, in other words, L' is an element in a subset {L, L+step2×i2}.

For example, for one of the N1 time domain resource allocations, the time domain resource allocation indicates a start symbol position S and a length L of one candidate time domain resource. When N3 candidate time domain resources are determined based on the time domain resource allocation, for one of the N3 candidate time domain resources, a start symbol position S' of the candidate time domain resource is S, and a length L' of the candidate time domain resource is L, L×scale2, or $\lfloor L/scale2 \rfloor$, in other words, L' is an element in a subset {L, L×scale2, $\lfloor L/scale2 \rfloor$}.

For example, for one of the N1 time domain resource allocations, the time domain resource allocation indicates a start symbol position S and a length L of one candidate time domain resource. When N3 candidate time domain resources are determined based on the time domain resource allocation, for one of the N3 candidate time domain resources, a start symbol position S' of the candidate time domain resource is S, and a length L' of the candidate time domain resource is L or $\lfloor L/scale2 \rfloor$, in other words, L' is an element in a subset {L, $\lfloor L/scale2 \rfloor$}.

For example, for one of the N1 time domain resource allocations, the time domain resource allocation indicates a start symbol position S and a length L of one candidate time domain resource. When N3 candidate time domain resources are determined based on the time domain resource allocation, for one of the N3 candidate time domain resources, a start symbol position S' of the candidate time domain resource is S, and a length L' of the candidate time domain resource is L or L×scale2, in other words, L' is an element in a subset {L, L×scale2}.

For example, for one of the N1 time domain resource allocations, the time domain resource allocation indicates a start symbol position S and a length L of one candidate time domain resource. When N3 candidate time domain resources are determined based on the time domain resource allocation, for one of the N3 candidate time domain resources, a start symbol position S' of the candidate time domain resource is S or S+D1, in other words, S' is an element in a subset {S, S+D1}, and a length L' of the candidate time domain resource is L or L+D2, in other words, L' is an element in a subset {L, L+D2}.

For example, for one of the N1 time domain resource allocations, the time domain resource allocation indicates a start symbol position S and a length L of one candidate time domain resource. When N3 candidate time domain resources are determined based on the time domain resource allocation, for one of the N3 candidate time domain resources, a start symbol position S' of the candidate time domain resource is S or S+step1×i1, in other words, S' is an element in a subset {S, S+step1×i1}, and a length L' of the candidate time domain resource is L or L+D2, in other words, L' is an element in a subset {L, L+D2}.

For example, for one of the N1 time domain resource allocations, the time domain resource allocation indicates a start symbol position S and a length L of one candidate time domain resource. When N3 candidate time domain resources are determined based on the time domain resource allocation, for one of the N3 candidate time domain resources, a start symbol position S' of the candidate time domain resource is S or S+D1, in other words, S' is an element in a subset {S, S+D1}, and a length L' of the candidate time domain resource is L or L+step2×i2, in other words, L' is an element in a subset {L, L+step2×i2}.

For example, for one of the N1 time domain resource allocations, the time domain resource allocation indicates a start symbol position S and a length L of one candidate time domain resource. When N3 candidate time domain resources are determined based on the time domain resource allocation, for one of the N3 candidate time domain resources, a start symbol position S' of the candidate time domain resource is S or S+step1×i1, in other words, S' is an element in a subset {S, S+step1×i1}, and a length L' of the candidate time domain resource is L or L+step2×i2, in other words, L' is an element in a subset {L, L+step2×i2}.

For example, for one of the N1 time domain resource allocations, the time domain resource allocation indicates a start symbol position S and a length L of one candidate time domain resource. When N3 candidate time domain resources are determined based on the time domain resource allocation, for one of the N3 candidate time domain resources, a start symbol position S' of the candidate time domain resource is S or S×scale1, in other words, S' is an element in a subset {S, S×scale1}, and a length L' of the candidate time domain resource is L or L+step2×i2, in other words, L' is an element in a subset {L, L+step2×i2}.

For example, when S=2, L=6, $N_{slot}^{symb}$=12, and scale1=6, step2=4, six (namely, N3=6) candidate time domain resources may be determined in total, and (0.5', L') corresponding to the six candidate time domain resources is respectively (2, 6), (12, 6), (2, 10), (12, 10), (2, 14), and (12, 14).

For example, for one of the N1 time domain resource allocations, the time domain resource allocation indicates a start symbol position S and a length L of one candidate time domain resource. When N3 candidate time domain resources are determined based on the time domain resource allocation, for one of the N3 candidate time domain resources, a start symbol position S' of the candidate time domain resource is S, S−step1×i1, or S+step1×i1, in other words, S' is an element in a subset {S, S−step1×i1, S+step1×i1}, and a length L' of the candidate time domain resource is L, L−step2×i2, or L+step2×i2, in other words, L' is an element in a subset {L, L−step2×i2, L+step2×i2}.

For example, when S=2, L=5, $N_{slot}^{symb}$=14, and step1=4, step2=4, nine (namely, N3=9) configured candidate time domain resources may be determined in total, and (S', L') corresponding to the four candidate time domain resources is respectively (2, 5), (6, 5), (10, 5), (2, 1), (6, 1), (10, 1), (2, 9), (6, 9), and (10, 9).

For example, for one of the N1 time domain resource allocations, the time domain resource allocation indicates K, a start symbol position S, and a length L of one candidate time domain resource. When N3 candidate time domain resources are determined based on the time domain resource allocation, for one of the N3 candidate time domain resources, K' of the candidate time domain resource is K, K−D3, or K+D3, in other words, K' is an element in a subset {K, K−D3, K+D3}, a start symbol position S' of the candidate time domain resource is S, and a length L' of the candidate time domain resource is L. D3 may be one or more predefined or configured positive integers.

For example, when K=0, S=0, L=2, $N_{slot}^{symb}$=14, and D3={1,2,3,4}, five (namely, N3=5) candidate time domain resources may be determined in total, and (K', S', L') corresponding to the five candidate time domain resources is respectively (0, 0, 2), (1, 0, 2), (2, 0, 2), (3, 0, 2), and (4, 0, 2). For another example, when K=4, S=4, L=4, $N_{slot}^{symb}$=14, and D1={1,2,4,6}, eight (namely, N3=8) candidate time domain resources may be determined in total, and (K', S', L') corresponding to the eight candidate time domain resources is respectively (4, 4, 4), (3, 4, 4), (2, 4, 4), (0, 4, 4), (5, 4, 4), (6, 4, 4), (8, 4, 4), and (10, 4, 4).

For example, for one of the N1 time domain resource allocations, the time domain resource allocation indicates K, a start symbol position S, and a length L of one candidate time domain resource. When N3 candidate time domain resources are determined based on the time domain resource allocation, for one of the N3 candidate time domain resources, K' of the candidate time domain resource is K, K−D3, or K+D3, in other words, K' is an element in a subset {K, K−D3, K+D3}, a start symbol position S' of the candidate time domain resource is S, S−step1×i1, or S+step1×i1, in other words, S' is an element in a subset {S, S−step1×i1, S+step1×i1}, and a length L' of the candidate time domain resource is L.

For example, for one of the N1 time domain resource allocations, the time domain resource allocation indicates K, a start symbol position S, and a length L of one candidate time domain resource. When N3 candidate time domain resources are determined based on the time domain resource allocation, for one of the N3 candidate time domain resources, K' of the candidate time domain resource is K, K−D3, or K+D3, in other words, K' is an element in a subset {K, K−D3, K+D3}, a start symbol position S' of the candidate time domain resource is S, and a length L' of the candidate time domain resource is L or L+step2×i2, in other words, L' is an element in a subset {L, L+step2×i2}.

For example, for one of the N1 time domain resource allocations, the time domain resource allocation indicates K, a start symbol position S, and a length L of one candidate time domain resource. When N3 candidate time domain resources are determined based on the time domain resource allocation, for one of the N3 candidate time domain resources, K' of the candidate time domain resource is K, K−D3, or K+D3, in other words, K' is an element in a subset {K, K−D3, K+D3}, a start symbol position S' of the candidate time domain resource is S, S−step1×i1, or S+stepxi1, in other words, S' is an element in a subset {S, S−step1×i1, S+step1×i1}, and a length L' of the candidate time domain resource is L or L+step2×i2, in other words, L' is an element in a subset {L, L+step2×i2}.

For example, for one of the N1 time domain resource allocations, the time domain resource allocation indicates K, a start symbol position S, and a length L of one candidate time domain resource. When N3 candidate time domain resources are determined based on the time domain resource allocation, for one of the N3 candidate time domain resources, K' of the candidate time domain resource is K, K−step3×i3, or K+step3×i3, in other words, K' is an element in a subset {K, K−step3×i3, K+step3×i3}, a start symbol position S' of the candidate time domain resource is S, S−step1×i1, or S+step1×i1, in other words, S' is an element in a subset {S, S−step1×i1, S+step1×i1}, and a length L' of the candidate time domain resource is L or L+step2×i2, in other words, L' is an element in a subset {L, L+step2×i2}.

Specifically, in the foregoing examples, a to-be-used solution in the examples may be predefined, or may be notified by the base station to the UE by using signaling. This is not specifically limited in this application. The foregoing merely lists some examples. Other examples that can be obtained based on the method B1 to the method B3 and the method C1 to the method C7 also fall within the protection scope of this application.

If a time domain resource is not a valid time domain resource, the time domain resource cannot be used to receive or send a signal. Table 8(a) shows an example of a valid time domain resource for a PDSCH. As shown in Table 8(a), valid time domain resources may be independently configured for different CP types and different PDSCH mapping types. As shown in Table 8 (b), there may be a similar design for a PUSCH, and details are not described herein again. In this embodiment of this application, a valid time domain resource may be preconfigured, or may be configured by the base station for the UE by using signaling. This is not limited in this application.

Optionally, for one of the N2 candidate time domain resources determined by the UE, if the candidate time domain resource is not a valid time domain resource, the UE considers that the candidate time domain resource cannot be used to send or receive a signal. Alternatively, if a time domain resource configured by the base station for the UE is not a valid time domain resource, the UE considers that the time domain resource cannot be used to send or receive a signal.

TABLE 8(a)

| PDSCH mapping type | Normal CP | | | Extended CP | | |
|---|---|---|---|---|---|---|
| | Start symbol position S' | Length L' | S' + L' | Start symbol position S' | Length L' | S' + L' |
| Type A | {0, 1, 2, 3} (Note 1) | {3, 4, 5, 6, 7, 8, 9, 10, 11, 12, 13, 14} | {3, 4, 5, 6, 7, 8, 9, 10, 11, 12, 13, 14} | {0, 1, 2, 3} (Note 1) | {3, 4, 5, 6, 7, 8, 9, 10, 11, 12} | {3, 4, 5, 6, 7, 8, 9, 10, 11, 12} |

TABLE 8(a)-continued

| PDSCH mapping type | Normal CP | | | Extended CP | | |
|---|---|---|---|---|---|---|
| | Start symbol position S' | Length L' | S' + L' | Start symbol position S' | Length L' | S' + L' |
| Type B | {0, 1, 2, 3, 4, 5, 6, 7, 8, 9, 10, 11, 12} | {2, 4, 7} | {2, 3, 4, 5, 6, 7, 8, 9, 10, 11, 12, 13, 14} | {0, 1, 2, 3, 4, 5, 6, 7, 8, 9, 10} | {2, 4, 6} | {2, 3, 4, 5, 6, 7, 8, 9, 10, 11, 12} |

Note 1:
S' = 3 is applicable only to dmrs-TypeA-Position = 3

TABLE 8(b)

| PUSCH mapping type | Normal CP | | | Extended CP | | |
|---|---|---|---|---|---|---|
| | Start symbol position S' | Length L' | S' + L' | Start symbol position S' | Length L' | S' + L' |
| Type A | 0 | {4, 5, 6, 7, 8, 9, 10, 11, 12, 13, 14} | {4, 5, 6, 7, 8, 9, 10, 11, 12, 13, 14} | 0 | {4, 5, 6, 7, 8, 9, 10, 11, 12} | {4, 5, 6, 7, 8, 9, 10, 11, 12} |
| Type B | {0, 1, 2, 3, 4, 5, 6, 7, 8, 9, 10, 11, 12, 13} | {1, 2, 3, 4, 5, 6, 7, 8, 9, 10, 11, 12, 13, 14} | {1, 2, 3, 4, 5, 6, 7, 8, 9, 10, 11, 12, 13, 14} | {0, 1, 2, 3, 4, 5, 6, 7, 8, 9, 10, 11, 12} | {1, 2, 3, 4, 5, 6, 7, 8, 9, 10, 11, 12} | {1, 2, 3, 4, 5, 6, 7, 8, 9, 10, 11, 12} |

Optionally, in the method provided in this embodiment of this application, a valid time domain resource may be determined based on uplink and downlink configurations of a slot. In this embodiment of this application, for a slot, uplink and downlink configurations of the slot are used to determine a transmission direction of a symbol in the slot. For example, for a symbol in the slot, a transmission direction of the symbol may be D, U, or X. When the transmission direction of the symbol is D, or the symbol is a D symbol, it indicates that the symbol is used for downlink transmission. When the transmission direction of the symbol is X, it indicates that the symbol is a flexible symbol or an uncertain symbol; or the symbol may be represented by F, and may further be configured to be used for downlink transmission or uplink transmission, or may be configured not to be used for transmission. When the transmission direction of the symbol is U, or the symbol is a U symbol, it indicates that the symbol is used for uplink transmission. When a transmission direction of a symbol is X, or the symbol is an X symbol, and the symbol is further configured to be used for downlink transmission, the transmission direction of the symbol may be understood as D. When a transmission direction of a symbol is X, or the symbol is an X symbol, and the symbol is further configured to be used for uplink transmission, the transmission direction of the symbol may be understood as U. If a time domain resource for a PDSCH includes a U symbol, it is considered that the time domain resource is not a valid time domain resource. If a time domain resource for a PUSCH includes a D symbol, it is considered that the time domain resource is not a valid time domain resource.

Optionally, in this embodiment of this application, the valid time domain resource may be determined based on the uplink and downlink configurations of the slot.

Optionally, in the method provided in this embodiment of this application, a candidate time domain resource may be determined based on the valid time domain resource. For example, the determined candidate time domain resource may be the valid time domain resource. For example, when a candidate time domain resource is determined based on a time domain resource allocation, if a determined time domain resource is not a valid time domain resource, the determined time domain resource is not a candidate time domain resource.

Further, the valid time domain resource is considered when the candidate time domain resource is determined, to ensure that all candidate time domain resources are valid, so that a quantity of candidate time domain resources can be decreased, thereby reducing signaling overheads for indicating the time domain resource.

Optionally, when the candidate time domain resource is determined by using, for example, the method B1 to the method B3 and the method C1 to the method C7, the candidate time domain resource may further be limited according to a rule. For example, the candidate time domain resource may be limited to a valid time domain resource (for example, as shown in Table 8(a) and Table 8(b)), or may be limited to that $S'+L'<N_{slot}^{symb}$. According to the method, the quantity of candidate time domain resources can be decreased, thereby reducing the signaling overheads for indicating the time domain resource.

For example, for one of the N1 time domain resource allocations, the time domain resource allocation indicates a start symbol position S and a length L of one candidate time domain resource. When N3 candidate time domain resources are determined based on the time domain resource allocation, for one of the N3 candidate time domain resources, a start symbol position S' of the candidate time domain resource is S or S×scale1, in other words, S' is an element in a subset {S, S×scale1}, and a length L' of the candidate time domain resource is L or L+step2×i2, in other words, L' is an element in a subset {L, L+step2×i2}. When S=2, L=6, $N_{slot}^{symb}$=12, scale1=6, step2=4, and a valid time domain resource allocation is not considered, six candidate time domain resources may be determined in total, and (S', L') corresponding to the six candidate time domain resources is respectively (2, 6), (12, 6), (2, 10), (12, 10), (2, 14), and (12, 14). It is assumed that a CP type is a normal CP, a PDSCH mapping type is a type A, and a valid time domain resource is considered based on Table 8(a), only two of the six candidate time domain resources are valid time domain resources. Therefore, there are two (namely, N3=2) determined candidate time domain resources. The two valid candidate time domain resources are (2, 6) and (2, 10). Alternatively, it is assumed that for the valid time domain resource allocation, $S'+L'<N_{slot}^{symb}$. Based on the valid time domain resource, only two of the six candidate time domain resources are valid time domain resources. Therefore, there are two (namely, N3=2) determined candidate time domain resources. The two valid candidate time domain resources are (2, 6) and (2, 10).

For example, for one of the N1 time domain resource allocations, the time domain resource allocation indicates a start symbol position S and a length L of one candidate time domain resource. When N3 candidate time domain resources are determined based on the time domain resource allocation, for one of the N3 candidate time domain resources, a start symbol position S' of the candidate time domain resource is S, S−step1×i1, or S+step1×i1, a length L' of the candidate time domain resource is L, L−step2×i2, or L+step2×i2, and the candidate time domain resource is a valid candidate time domain resource. For example, for a PDSCH, when S=2, L=6, $N_{slot}^{symb}$=12, step1=4, step2=4, a PDSCH mapping type is a type A, and a CP type is an extended CP, and a configuration of the valid candidate time domain resource is shown in Table 8, two (namely, N3=2) candidate time domain resources may be determined in total, and (S', L') corresponding to the two candidate time domain resources is respectively (2, 6) and (2, 10).

For example, for one of the N1 time domain resource allocations, the time domain resource allocation indicates a start symbol position S and a length L of one candidate time domain resource. When N3 candidate time domain resources are determined based on the time domain resource allocation, for one of the N3 configured candidate time domain resources, a start symbol position S' of the configured candidate time domain resource is S, S−step1×i1, or S+step1×i1, and a length L' of the configured candidate time domain resource is L, L−step2×i2, or L+step2×i2, where $S'+L'<N_{slot}^{symb}$. For example, when S=2, L=6, $N_{slot}^{symb}$=12, and step1=4, step2=4, five (namely, N3=5) configured candidate time domain resources may be determined in total, and (S', L') corresponding to the five configured candidate time domain resources is respectively (2, 6), (6, 6), (2, 2), (6, 2), and (2, 10).

Optionally, for one of the N1 time domain resource allocations, when N3 candidate time domain resources are determined based on the time domain resource allocation, if a value of N3 is preconfigured or predefined, or is indicated by the base station to the UE by using signaling, no other candidate time domain resources are determined when the N3 candidate time domain resources are determined in a priority sequence. Further, the method may be combined with the foregoing method for restricting a candidate time domain resource based on a valid time domain resource.

Optionally, the priority sequence may be that L' is preferentially determined, where in this case, S' is S (that is, the start symbol position remains unchanged); then S' is preferentially determined, where in this case, L' is L (that is, the length remains unchanged); and further, S' and L' are preferentially determined.

For example, for one of the N1 time domain resource allocations, the time domain resource allocation indicates a start symbol position S and a length L of one candidate time domain resource. When N3 candidate time domain resources are determined based on the time domain resource allocation, for one of the N3 configured candidate time domain resources, a start symbol position S' of the configured candidate time domain resource is S, S−step1×i1, or S+step1×i1, and a length L' of the configured candidate time domain resource is L, L−step2×i2, or L+step2×i2, where $S'+L'<N_{slot}^{symb}$. For example, when S=2, L=6, $N_{slot}^{symb}$=12, step1=4, step2=4, and $S'+L'<N_{slot}^{symb}$, assuming that N3=5, five candidate time domain resources may be determined in total, and (S', L') corresponding to the five candidate time domain resources is respectively (2, 6), (2, 2), (2, 10), (6, 6), and (8, 6).

Optionally, the priority sequence may be that S' is preferentially determined, where in this case, L' is L (that is, the length remains unchanged); then L' is preferentially determined, where in this case, S' is S (that is, the start symbol position remains unchanged); and further, S' and L' are preferentially determined.

For example, for one of the N1 time domain resource allocations, the time domain resource allocation indicates a start symbol position S and a length L of one candidate time domain resource. When N3 candidate time domain resources are determined based on the time domain resource allocation, for one of the N3 configured candidate time domain resources, a start symbol position S' of the configured candidate time domain resource is S, S−step1×i1, or S+step1×i1, and a length L' of the configured candidate time domain resource is L, L−step2×i2, or L+step2×i2, where $S'+L'<N_{slot}^{symb}$. For example, when S=2, L=6, $N_{slot}^{symb}$=12, step1=4, step2=4, and $S'+L'<N_{slot}^{symb}$, assuming that N3=4, four candidate time domain resources may be determined in total, and (S', L') corresponding to the four candidate time domain resources is respectively (2, 6), (6, 6), (2, 2), and (2, 10).

Optionally, the priority sequence may be that S' is preferentially determined, where in this case, L' is L (that is, the length remains unchanged), and K' is K; then L' is preferentially determined, where in this case, S' is S (that is, the start symbol position remains unchanged), and K' is K; further, S' and L' are preferentially determined, where K' is K; and then K' is determined.

Optionally, the priority sequence may be that K' is preferentially determined, where in this case, S' is S, and L' is L; then K' and S' are preferentially determined, where in this case, L' is L (that is, the length remains unchanged); then K' and L' are preferentially determined, where S' is S (that is, the start symbol position remains unchanged); and further, K', S', and L' are preferentially determined. Alternatively, there may be another priority sequence or another sequence. This is not limited in this application.

Optionally, the priority sequence may be preconfigured or predefined, or may be notified by the base station to the UE by using signaling. This is not limited in this application.

Optionally, when the candidate time domain resource is determined by using, for example, the method B to the method B3 and the method C1 to the method C7, a position of the candidate time domain resource may be determined based on the uplink and downlink configurations of the slot. For example, for a slot including 14 symbols, transmission directions of the first symbol (a symbol 0) to the fourteenth symbol (a symbol 13) in the slot may be respectively configured as DDDDDDXXUUUUUU. This may alternatively be described as that uplink and downlink configurations of the slot are DDDDDDXXUUUUUU.

For example, for the method B1 to the method B3 and the method C1 to the method C7, the position of the candidate time domain resource may further be determined based on the uplink and downlink configurations of the slot. If the candidate time domain resource is a candidate time domain resource for a downlink data channel, transmission directions of symbols in the candidate time domain resource are D, or D and X. If the candidate time domain resource is a candidate time domain resource for an uplink data channel, transmission directions of symbols in the candidate time domain resource are U, or U and X.

For example, for one of the N1 time domain resource allocations, the time domain resource allocation indicates a start symbol position S and a length L of one candidate time domain resource. When N3 candidate time domain resources are determined based on the time domain resource allocation, for one of the N3 candidate time domain resources, a start symbol position S' of the candidate time domain resource is S, S−step1×i1, or S+step1×i1, a length L' of the configured candidate time domain resource is L, L−step2×i2, or L+step2×i2, a transmission direction of a symbol in the candidate time domain resource is D, and the candidate time domain resource is used to transmit a downlink data channel. For example, for one slot, uplink and downlink configurations of the slot are DDDDDDDDDDXXUU. When S=2, L=6, $N_{slot}^{symb}$=14, and step1=4, step2=4, three (namely, N3=3) candidate time domain resources may be determined in total, and (S', L') corresponding to the three candidate time domain resources is respectively (2, 6), (2, 2), and (6, 2). The three candidate time domain resources are used to transmit a PDSCH.

For example, for one of the N1 time domain resource allocations, the time domain resource allocation indicates a start symbol position S and a length L of one candidate time domain resource. When N3 candidate time domain resources are determined based on the time domain resource allocation, for one of the N3 candidate time domain resources, a start symbol position S' of the candidate time domain resource is S, S−step1×i1, or S+step1×i1, a length L' of the candidate time domain resource is L, L−step2×i2, or L+step2×i2, a transmission direction of a symbol in the candidate time domain resource is U, and the candidate time domain resource is used to transmit an uplink data channel. For example, for one slot, uplink and downlink configurations of the slot are DDXXUUUUUUUUUU. When S=2, L=6, $N_{slot}^{symb}$=14, and step1=4, step2=4, three (namely, N3=3) candidate time domain resources may be determined in total, and (S', L') corresponding to the three candidate time domain resources is respectively (6, 6), (6, 2), and (10, 2). The three candidate time domain resources are used to transmit a PUSCH.

Further, when the position of the configured candidate time domain resource is determined based on the uplink and downlink configurations of the slot, the quantity of candidate time domain resources can be decreased, thereby reducing the signaling overheads for indicating the time domain resource.

Optionally, in the method provided in this embodiment of this application, the candidate time domain resource may be determined based on a configured valid time domain resource and the uplink and downlink configurations of the slot. For example, for the method B1 to the method B3 and the method C1 to the method C7, the position of the candidate time domain resource may be determined based on the uplink and downlink configurations of the slot and the valid time domain resource. If the candidate time domain resource is a candidate time domain resource for a downlink data channel, the transmission directions of the symbols in the candidate time domain resource are D, or D and X; and the candidate time domain resource is a valid time domain resource, for example, a valid time domain resource shown in Table 8(a). If the candidate time domain resource is a candidate time domain resource for an uplink data channel, the transmission directions of the symbols in the candidate time domain resource are U, or U and X; and the candidate time domain resource is a valid time domain resource, for example, a valid time domain resource shown in Table 8(b).

Optionally, in the method provided in this embodiment of this application, the valid time domain resource may be determined based on the configured valid time domain resource and the uplink and downlink configurations of the slot. The candidate time domain resource is determined based on the valid time domain resource and the time domain resource allocation.

Further, when the position of the configured candidate time domain resource is determined based on the configured valid time domain resource and the uplink and downlink configurations of the slot, the quantity of candidate time domain resources can be decreased, thereby reducing the signaling overheads for indicating the time domain resource.

In the method in FIG. 3, for a part or all of the N1 time domain resource allocations, the N2 candidate time domain resources may be determined in total by using the foregoing determining method. One of the N2 candidate time domain resources may be preconfigured for the UE to transmit the data channel. Alternatively, the base station may indicate, to the UE by using semi-static signaling or dynamic signaling, one of the N2 candidate time domain resources to transmit the data channel.

Figure 4:
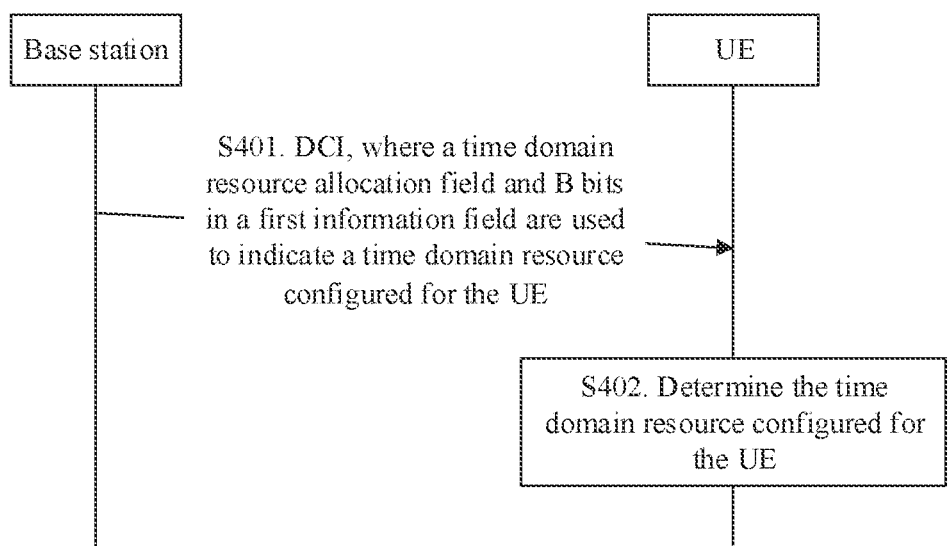

FIG. 4 shows a second time domain resource configuration method according to an embodiment of this application, to increase a quantity of candidate time domain resources with low signaling overheads. This may alternatively be described as that a time domain resource configured for UE may be indicated from more candidate time domain resources.

S401. A base station sends downlink control information DCI to the UE, where the DCI includes a time domain resource allocation field and a first field, and the time domain resource allocation field and B bits in the first field are jointly used to indicate the time domain resource configured for the UE from N4 candidate time domain resources, where B is an integer greater than or equal to 1. Correspondingly, the UE receives the DCI sent by the base station. The UE may determine, based on the time domain resource allocation field and the B bits in the first field, the time domain resource configured by the base station for the UE.

In this embodiment of this application, a field in the DCI may include a positive integer quantity of bits. The field in the DCI may include at least one of the following fields: a bandwidth part indicator field, a DCI format indicator field, a frequency domain resource allocation field, the time domain resource allocation field, a frequency hopping flag field, a modulation and coding scheme field, a new data indicator field, an RV version indicator field (or an RV field), a precoding and quantity-of-layers indicator field, a HARQ process number field, a power control command field, a padding bit field, and the like. The padding bit field may not be used to carry information such as a transmission parameter. When data transmission includes a plurality of transport blocks, for example, two transport blocks, at least one of the modulation and coding scheme field, the new data indicator field, the RV version indicator field (or the RV field), and the hybrid automatic repeat request (HARQ) process number field may be included for each transport block. For example, for descriptions of the field in the DCI, refer to section 7.3.1 in the 5G protocol 38.212. DCI in another form may alternatively be used in the method provided in this embodiment of this application.

The first field may be at least one field in the DCI other than the time domain resource allocation field. For example, the first field may be the padding bit field, the DCI format indicator field, the padding bit field and the bandwidth part indicator field, the bandwidth part indicator field, the new data indicator field and the padding bit field, or the new data indicator field. This is not limited in this application. The B bits in the first field may be apart or all of bits in the first field.

Optionally, in S401, a quantity of bits in the time domain resource allocation field is a maximum quantity of bits supported by the time domain resource allocation field, and the maximum quantity of bits supported by the time domain resource allocation field is less than a quantity of bits required for configuring the time domain resource for the UE from the N4 candidate time domain resources. In a possible implementation, when the time domain resource configured for the UE is indicated from the N4 candidate time domain resources, and indexes of the N4 candidate time domain resources are respectively 0 to N4-1, if the time domain resource is configured for the UE by indicating an index of the configured time domain resource, the quantity of bits required for configuring the time domain resource for the UE may be $\log_2(N4)$. For example, when N4=20, and indexes of the 20 candidate time domain resources are respectively 0 to 19, the quantity of bits required for configuring the time domain resource for the UE is 5. If the base station indicates the index 2 to the UE, in other words, the index of the time domain resource configured for the UE is 2, the time domain resource configured by the base station for the UE is the third time domain resource in the 20 candidate time domain resources. In the method, a sum of the quantity of bits in the time domain resource allocation field and B may be greater than or equal to the quantity of bits required for configuring the time domain resource for the UE from the N4 candidate time domain resources.

Optionally, the DCI in S401 may be DCI used to schedule uplink data. For example, the DCI includes a parameter used to transmit a PUSCH. Alternatively, the DCI in S401 may be DCI used to schedule downlink data. For example, the DCI includes a parameter used to transmit a PDSCH. This is not limited in this application.

Optionally, the downlink control information in S401 may alternatively be extended to RRC signaling. The RRC signaling is used to send scheduling information of a data channel, and the scheduling information of the data channel may be used to schedule uplink data or downlink data. Alternatively, the downlink control information in S401 may be extended to other signaling, and the other signaling is used to send scheduling information of data. This is not limited in this application.

Optionally, the method in FIG. 4 may be used in combination with the method in FIG. 3. In this case, the N4 candidate time domain resources in S401 may be the N2 candidate time domain resources in S302. Alternatively, the N4 candidate time domain resources in S401 may be preconfigured N4 candidate time domain resources.

The method may further include S402: The base station and the UE perform data transmission by using the time domain resource configured for the UE, or the base station and the UE perform data transmission on the time domain resource configured for the UE. For example, when the time domain resource is a time domain resource for a PDSCH, the base station may transmit the PDSCH to the UE on the time domain resource. When the time domain resource is a time domain resource for a PUSCH, the UE may transmit the PUSCH to the base station on the time domain resource.

In the method shown in FIG. 4, the quantity of candidate time domain resources may be increased, and the time domain resource configured for UE may be indicated from more candidate time domain resources by using the DCI without changing a size of the DCI. For example, if a conventional method is used, when the time domain resource needs to be configured for the UE from the N4 candidate time domain resources, and the maximum quantity of bits supported by the time domain resource allocation field in the DCI is less than the quantity of bits required for configuring the time domain resource for the UE from the N4 candidate time domain resources, a size of the time domain resource allocation field needs to be increased, and consequently, the size of the DCI may be increased.

Optionally, the first field in the method in FIG. 4 may include one or more information fields in the redundancy version (RV) indicator field, an RV sequence indicator field, and the precoding and quantity-of-layers indicator field. This is not limited in this application. For example, the first field may be in any one of the following forms: the RV version indicator field, the RV sequence indicator field, the RV version indicator field and the RV sequence indicator field, the precoding and quantity-of-layers indicator field, the RV version indicator field and the precoding and quantity-of-layers indicator field, and the RV sequence indicator field and the precoding and quantity-of-layers indicator field. The RV version indicator field may also be referred to as an RV version information field, an RV version indication information field, the RV indicator field, an RV information field, an RV information indicator field, or another name. The RV sequence indicator field may also be referred to as an RV sequence information field, an RV sequence indication information field, or another name. The precoding and quantity-of-layers indicator field may also be referred to as a precoding and quantity-of-layers information field, a precoding and quantity-of-layers indication information field, or another name. This is not limited in this application. A redundancy version may also be referred to as an RV version.

Figure 5:
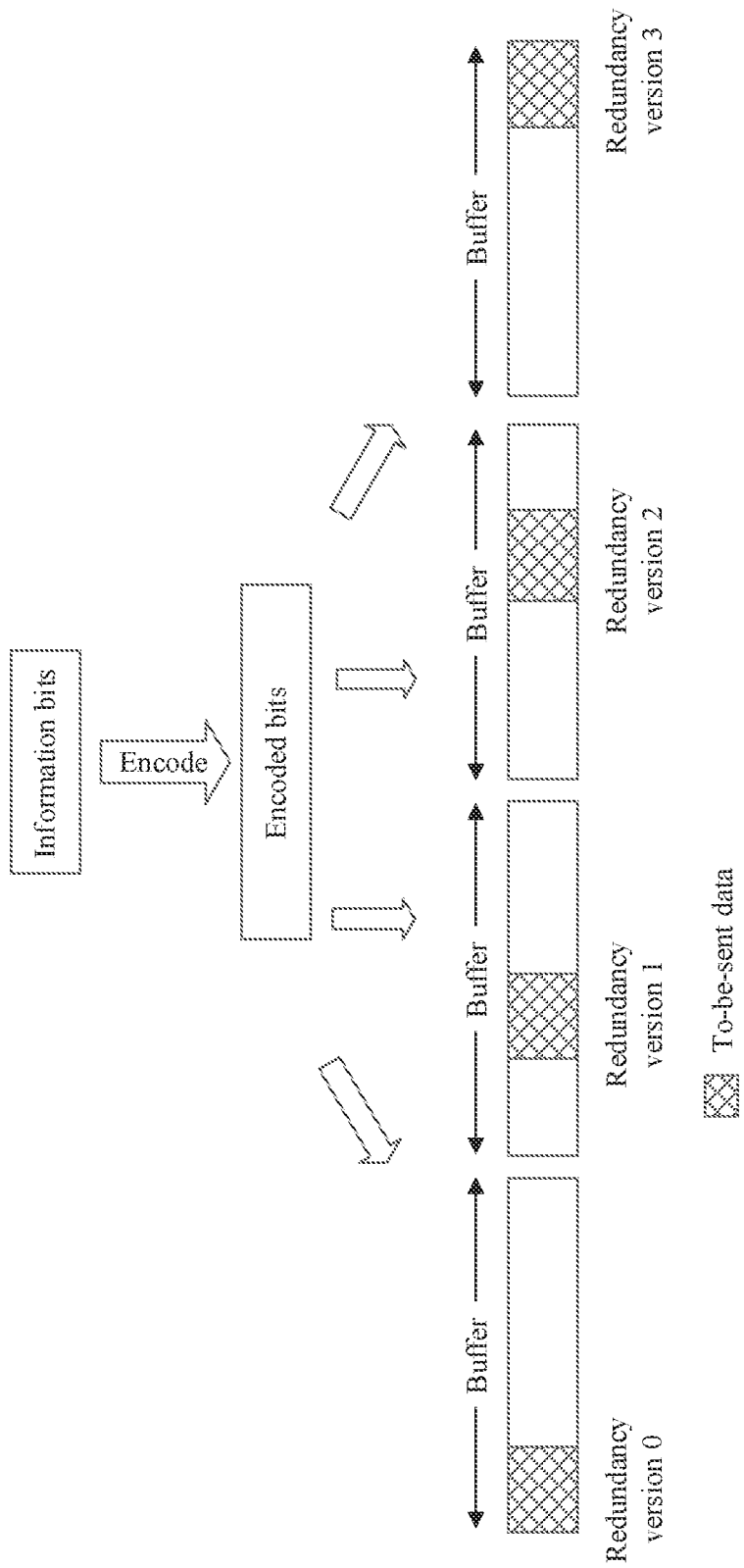
FIG. 5 is a diagram of an example of a redundancy version according to an embodiment of this application.

In this embodiment of this application, the RV version indicator field may be used to indicate an RV version corresponding to the data transmission, or may be used to indicate, from one or more candidate RV versions, an RV version corresponding to the data transmission. The RV version may be used to generate, when channel coding is performed on information bits of data, data of the corresponding redundancy version, and the data may be sequentially placed in a buffer. The RV version may alternatively be understood as being used to indicate a location, in a data buffer, from which data is read. The read data may be considered as to-be-sent data, and the to-be-sent data may be sent or may be sent after being processed. One data transmission may correspond to one RV version. When there are a plurality of transmissions, data of all RV versions may be combined, thereby improving data transmission performance. FIG. 5 shows an example of four redundancy versions, and shows data stored in buffers and to-be-sent data respectively corresponding to redundancy versions 0, 1, 2, and 3.

For example, for descriptions of the RV version, refer to section 5.1.4.1.2 in the LTE protocol 36.212, or refer to section 5.4.2.1 in the 5G (NR) protocol 38.212. It should be noted that the RV version in this embodiment of this application may alternatively be a specific implementation of another RV version. This is not limited herein. In a possible implementation, a candidate RV version may be the RV version 0, the RV version 1, the RV version 2, or the RV version 3. The RV version indicator field may indicate, by using a 2-bit information field, the RV version corresponding to the data transmission. Table 9 shows values of the RV version indicator field and RV versions indicated by the RV version indicator field.

TABLE 9

| Value of the RV version indicator field | RV version corresponding to the data transmission |
| --- | --- |
| 00 | Version 0 |
| 01 | Version 1 |
| 10 | Version 2 |
| 11 | Version 3 |

When the first field in the method in FIG. 4 includes the RV version indicator field, the B bits in S401 include a part or all of bits in the RV version indicator field, for example, one bit or two bits.

In a possible implementation, the RV version used for the data transmission may be predefined as, for example, the RV version 0. The method may be applicable to grant-free data transmission, or may be applicable to data transmission in a high-frequency scenario, or may be applicable to signal transmission in another scenario or type. This is not limited in this application. The high-frequency scenario may be a scenario in which signal transmission is performed in a frequency band greater than or equal to 6 GHz, for example, a scenario of signal transmission in a frequency band of 6 GHz, 26 GHz, 28 GHz, 30 GHz, 38 GHz, 39 GHz, 60 GHz, or 70 GHz.

In a possible implementation, when the B bits in S401 include a part of bits in the RV version indicator field, a part or all of bits in the RV version indicator field other than the part of bits may be used to indicate, from a subset of the candidate RV versions, the RV version used for the data transmission. For example, the candidate RV versions include four RV versions, and the RV version indicator field includes two bits. When the B bits in S401 include one bit in the RV version indicator field, a remaining bit in the RV version indicator field other than the bit may be used to indicate, from the subset of the candidate RV versions, the RV version used for the data transmission. Table 10(a) to Table 10(f) show examples of a value of the remaining 1-bit information in the RV version indicator field and an RV version indicated by the remaining 1-bit information.

TABLE 10(a)

| Value of the remaining bit in the RV version indicator field | RV version corresponding to the data transmission |
| --- | --- |
| 0 | Version 0 |
| 1 | Version 1 |

TABLE 10(b)

| Value of the remaining bit in the RV version indicator field | RV version corresponding to the data transmission |
| --- | --- |
| 0 | Version 1 |
| 1 | Version 2 |

TABLE 10(c)

| Value of the remaining bit in the RV version indicator field | RV version corresponding to the data transmission |
| --- | --- |
| 0 | Version 2 |
| 1 | Version 3 |

TABLE 10(d)

| Value of the remaining bit in the RV version indicator field | RV version corresponding to the data transmission |
| --- | --- |
| 0 | Version 0 |
| 1 | Version 2 |

TABLE 10(e)

| Value of the remaining bit in the RV version indicator field | RV version corresponding to the data transmission |
| --- | --- |
| 0 | Version 0 |
| 1 | Version 3 |

TABLE 10(f)

| Value of the remaining bit in the RV version indicator field | RV version corresponding to the data transmission |
| --- | --- |
| 0 | Version 1 |
| 1 | Version 3 |

Optionally, the correspondences between the value of the remaining bit in the RV version indicator field and the corresponding RV version in Table 10(a) to Table 10(f) are merely examples, and another value or another correspondence is also applicable to the method provided in this embodiment of this application. This is not limited in this application.

Optionally, the correspondence between the value of the remaining bit in the RV version indicator field and the corresponding RV version may be predefined in a protocol, or may be notified by a network device to a terminal device by using signaling. This is not specifically limited in this application.

In a possible implementation, for one UE, an RV version used for data transmission may alternatively be set as an RV version corresponding to previous data transmission of the UE. This solution may be used in a retransmission scenario. To be specific, data of a same RV version may be retransmitted, and data transmitted for a plurality of times may be combined, to improve signal transmission performance.

When the first field in the method in FIG. 4 includes the RV sequence indicator field, the B bits in S401 include a part or all of bits in the RV sequence indicator field, for example, one bit or two bits.

In this embodiment of this application, an RV sequence may be configured for the data transmission. For example, when the data transmission is semi-persistently scheduled or scheduled in a grant free manner, an RV sequence (rv1,rv2, rv3,rv4) may be configured for the data transmission, to indicate that data may be transmitted for four times, where an RV version used for the first transmission is rv1, an RV version used for the second transmission is rv2, an RV version used for the third transmission is rv3, and an RV version used for the fourth transmission is rv4. Optionally, the RV sequence may alternatively include another positive integer quantity of RV versions other than four RV versions. This is not limited in this application. The RV sequence indicator field is used to indicate, from one or more candidate RV sequences, an index of the RV sequence configured for the UE, and the configured RV sequence is used to perform data transmission between the base station and the UE. For example, there are N=4 candidate RV sequences: (a version 0, a version 2, a version 3, and a version 1), (the version 0, the version 0, the version 0, and the version 0), (the version 0, the version 3, the version 0, and the version 3), and (the version 0, the version 1, the version 2, and the version 3). Indexes of the four RV sequences are respectively 0 to 3 (namely, 0 to $N_{rs}-1$). In this case, the RV sequence indicator field may include $\log_2(N_{rs})=2$-bit information, to indicate, from the four candidate RV sequences, the index of the RV sequence configured for the UE. Table 11 shows a value of the RV sequence indicator field and an index of an RV sequence indicated by the RV sequence indicator field.

TABLE 11

| Value of the RV sequence indicator field | Index of the RV sequence configured for the UE |
| --- | --- |
| 00 | 0 |
| 01 | 1 |
| 10 | 2 |
| 11 | 3 |

In a possible implementation, the RV sequence used for the data transmission may be predefined as, for example, the RV sequence 0.

In a possible implementation, when the B bits in S401 include a part of bits in the RV sequence indicator field, a part or all of bits in the RV sequence indicator field other than the part of bits may be used to indicate, from a subset of the candidate RV sequences, the RV sequence used for the data transmission. For example, there are four candidate RV sequences, and the RV sequence indicator field includes two bits. When the B bits in S401 include one bit in the RV sequence indicator field, a remaining bit in the RV sequence indicator field other than the bit may be used to indicate, from the subset of the candidate RV sequences, the RV sequence used for the data transmission. Table 12(a) to Table 12(f) show examples of a value of the remaining 1-bit information in the RV sequence indicator field and an index of an RV sequence indicated by the remaining 1-bit information.

TABLE 12(a)

| Value of the remaining bit in the RV sequence indicator field | RV sequence corresponding to the data transmission |
| --- | --- |
| 0 | Sequence 0 |
| 1 | Sequence 1 |

TABLE 12(b)

| Value of the remaining bit in the RV sequence indicator field | RV sequence corresponding to the data transmission |
| --- | --- |
| 0 | Sequence 0 |
| 1 | Sequence 2 |

TABLE 12(c)

| Value of the remaining bit in the RV sequence indicator field | RV sequence corresponding to the data transmission |
| --- | --- |
| 0 | Sequence 0 |
| 1 | Sequence 3 |

TABLE 12(d)

| Value of the remaining bit in the RV sequence indicator field | RV sequence corresponding to the data transmission |
| --- | --- |
| 0 | Sequence 1 |
| 1 | Sequence 2 |

TABLE 12(e)

| Value of the remaining bit in the RV sequence indicator field | RV sequence corresponding to the data transmission |
| --- | --- |
| 0 | Sequence 1 |
| 1 | Sequence 3 |

TABLE 12(f)

| Value of the remaining bit in the RV sequence indicator field | RV sequence corresponding to the data transmission |
| --- | --- |
| 0 | Sequence 2 |
| 1 | Sequence 3 |

Optionally, the correspondences between the value of the remaining bit in the RV sequence indicator field and the corresponding RV sequence in the foregoing tables are merely examples, and another value or another correspondence is also applicable to the method provided in this embodiment of this application. This is not limited in this application.

Optionally, the correspondence between the value of the remaining bit and the corresponding RV sequence may be predefined, or may be notified by the base station to the UE by using signaling. This is not limited in this application.

In a possible implementation, for one UE, an RV sequence used for data transmission may alternatively be set as an RV sequence corresponding to previous data transmission of the UE. This solution may be used in a retransmission scenario. To be specific, data of a same RV sequence may be retransmitted, and data transmitted for a plurality of times may be combined, to improve signal transmission performance.

When the first field in the method in FIG. 4 includes the precoding and quantity-of-layers indicator field, the B bits in S401 include a part or all of bits in the precoding and quantity-of-layers indicator field, for example, one bit, two bits, four bits, five bits, or six bits.

In this embodiment of this application, the precoding and quantity-of-layers indicator field may be configured for the data transmission, to precode data at a transmit end of the data. For example, when the data transmission is uplink data transmission, the UE may precode the data. When the data transmission is downlink data transmission, the base station may precode the data. When the data is precoded, $X_{layers}$ layers of data may be precoded to $Y_{port}$ antenna ports based on a precoding matrix, and precoded data is sent on the $Y_{port}$ antenna ports. $X_{layers}$ and $Y_{port}$ are positive integers, the precoding and quantity-of-layers indicator field is used to indicate $X_{layers}$ and the precoding matrix, and the precoding matrix may also be referred to as a codebook. Sending the precoded data on the $Y_{port}$ antenna ports may further include another signal processing process. This is not limited in this application. For example, resource mapping may be performed on the precoded data, and the precoded data is sent on the $Y_{port}$ antenna ports after being converted from a baseband signal into a radio frequency signal.

For example, for descriptions of data precoding, refer to section 5.3.3A in the LTE protocol 36.211, or refer to section 6.3.1.5 in the 5G protocol 383.211. A person skilled in the art may understand that the method provided in this embodiment of this application may further be used in another specific example of data precoding.

The precoding and quantity-of-layers indicator field is used to indicate, from candidate precoding and quantity-of-layers information, an index of precoding and quantity-of-layers information configured for the UE, where the precoding and quantity-of-layers information configured for the UE may be used to determine or indicate a quantity $X_{layers}$ of layers and a precoding matrix that are configured for the UE. There are one or more pieces of candidate precoding and quantity-of-layers information, and one piece of precoding and quantity-of-layers information may correspond to one index. Table 13 shows an example of candidate precoding and quantity-of-layers information for four ($Y_{port}$=4) antenna ports and an index corresponding to the candidate precoding and quantity-of-layers information, where "TPMI" is an index of a precoding matrix or a codebook, and "layer" is used to indicate $X_{layers}$. In an actual application, $Y_{port}$ may alternatively be equal to a positive integer other than 4, for example, 2, 8, or 16. Correspondingly, candidate precoding and quantity-of-layers information for another quantity of antenna ports other than the four antenna ports and a corresponding precoding matrix may alternatively be configured. This is not limited in this application.

As shown in Table 13, in this embodiment of this application, candidate precoding and quantity-of-layers information may be separately configured for the following three scenarios:

Scenario 1: Non-coherent codebook subset

Scenario 2: Partial and non-coherent codebook subset

Scenario 3: Full, partial, and non-coherent codebook subset

For example, Table 13 and Table 14(a) to Table 14(d) correspondingly show examples of codebook sets when quantities of layers are respectively equal to 1, 2, 3, and 4.

TABLE 13

| Index | Full, partial, and non-coherent codebook subset | Index | Partial and non-coherent codebook subset | Index | Non-coherent codebook subset |
| --- | --- | --- | --- | --- | --- |
| 0 | One layer: TPMI = 0 | 0 | One layer: TPMI = 0 | 0 | One layer: TPMI = 0 |
| 1 | One layer: TPMI = 1 | 1 | One layer: TPMI = 1 | 1 | One layer: TPMI = 1 |
| 2 | One layer: TPMI = 2 | 2 | One layer: TPMI = 2 | 2 | One layer: TPMI = 2 |
| 3 | One layer: TPMI = 3 | 3 | One layer: TPMI = 3 | 3 | One layer: TPMI = 3 |
| 4 | Two layers: TPMI = 0 | 4 | Two layers: TPMI = 0 | 4 | Two layers: TPMI = 0 |
| 5 | Two layers: TPMI = 1 | 5 | Two layers: TPMI = 1 | 5 | Two layers: TPMI = 1 |
| 6 | Two layers: TPMI = 2 | 6 | Two layers: TPMI = 2 | 6 | Two layers: TPMI = 2 |
| 7 | Two layers: TPMI = 3 | 7 | Two layers: TPMI = 3 | 7 | Two layers: TPMI = 3 |
| 8 | Two layers: TPMI = 4 | 8 | Two layers: TPMI = 4 | 8 | Two layers: TPMI = 4 |
| 9 | Two layers: TPMI = 5 | 9 | Two layers: TPMI = 5 | 9 | Two layers: TPMI = 5 |
| 10 | Three layers: TPMI = 0 | 10 | Three layers: TPMI = 0 | 10 | Three layers: TPMI = 0 |
| 11 | Four layers: TPMI = 0 | 11 | Four layers: TPMI = 0 | 11 | Four layers: TPMI = 0 |
| 12 | One layer: TPMI = 4 | 12 | One layer: TPMI = 4 | 12-15 | Reserved |
| 13 | One layer: TPMI = 5 | 13 | One layer: TPMI = 5 | | |
| 14 | One layer: TPMI = 6 | 14 | One layer: TPMI = 6 | | |
| 15 | One layer: TPMI = 7 | 15 | One layer: TPMI = 7 | | |
| 16 | One layer: TPMI = 8 | 16 | One layer: TPMI = 8 | | |
| 17 | One layer: TPMI = 9 | 17 | One layer: TPMI = 9 | | |
| 18 | One layer: TPMI = 10 | 18 | One layer: TPMI = 10 | | |
| 19 | One layer: TPMI = 11 | 19 | One layer: TPMI = 11 | | |
| 20 | Two layers: TPMI = 6 | 20 | Two layers: TPMI = 6 | | |
| 21 | Two layers: TPMI = 7 | 21 | Two layers: TPMI = 7 | | |
| 22 | Two layers: TPMI = 8 | 22 | Two layers: TPMI = 8 | | |
| 23 | Two layers: TPMI = 9 | 23 | Two layers: TPMI = 9 | | |
| 24 | Two layers: TPMI = 10 | 24 | Two layers: TPMI = 10 | | |
| 25 | Two layers: TPMI = 11 | 25 | Two layers: TPMI = 11 | | |
| 26 | Two layers: TPMI = 12 | 26 | Two layers: TPMI = 12 | | |
| 27 | Two layers: TPMI = 13 | 27 | Two layers: TPMI = 13 | | |
| 28 | Three layers: TPMI = 1 | 28 | Three layers: TPMI = 1 | | |
| 29 | Three layers: TPMI = 2 | 29 | Three layers: TPMI = 2 | | |
| 30 | Four layers: TPMI = 1 | 30 | Four layers: TPMI = 1 | | |
| 31 | Four layers: TPMI = 2 | 31 | Four layers: TPMI = 2 | | |
| 32 | One layer: TPMI = 12 | | | | |
| 33 | One layer: TPMI = 13 | | | | |
| 34 | One layer: TPMI = 14 | | | | |
| 35 | One layer: TPMI = 15 | | | | |
| 36 | One layer: TPMI = 16 | | | | |
| 37 | One layer: TPMI = 17 | | | | |

TABLE 13-continued

| Index | Full, partial, and non-coherent codebook subset | Index | Partial and non-coherent codebook subset | Index | Non-coherent codebook subset |
|---|---|---|---|---|---|
| 38 | One layer: TPMI = 18 | | | | |
| 39 | One layer: TPMI = 19 | | | | |
| 40 | One layer: TPMI = 20 | | | | |
| 41 | One layer: TPMI = 21 | | | | |
| 42 | One layer: TPMI = 22 | | | | |
| 43 | One layer: TPMI = 23 | | | | |
| 44 | One layer: TPMI = 24 | | | | |
| 45 | One layer: TPMI = 25 | | | | |
| 46 | One layer: TPMI = 26 | | | | |
| 47 | One layer: TPMI = 27 | | | | |
| 48 | Two layers: TPMI = 14 | | | | |
| 49 | Two layers: TPMI = 15 | | | | |
| 50 | Two layers: TPMI = 16 | | | | |
| 51 | Two layers: TPMI = 17 | | | | |
| 52 | Two layers: TPMI = 18 | | | | |
| 53 | Two layers: TPMI = 19 | | | | |
| 54 | Two layers: TPMI = 20 | | | | |
| 55 | Two layers: TPMI = 21 | | | | |
| 56 | Three layers: TPMI = 3 | | | | |
| 57 | Three layers: TPMI = 4 | | | | |
| 58 | Three layers: TPMI = 5 | | | | |
| 59 | Three layers: TPMI = 6 | | | | |
| 60 | Four layers: TPMI = 3 | | | | |
| 61 | Four layers: TPMI = 4 | | | | |
| 62-63 | Reserved | | | | |

TABLE 14 (a)

Quantity of layers is equal to 1

| TPMI index | Codebook W (respectively corresponding to the TPMI indexes from left to right according to a TPMI index increase principle) |
|---|---|
| 0 to 7 | $\frac{1}{2}\begin{bmatrix}1\\0\\0\\0\end{bmatrix}$ $\frac{1}{2}\begin{bmatrix}0\\1\\0\\0\end{bmatrix}$ $\frac{1}{2}\begin{bmatrix}0\\0\\1\\0\end{bmatrix}$ $\frac{1}{2}\begin{bmatrix}0\\0\\0\\1\end{bmatrix}$ $\frac{1}{2}\begin{bmatrix}1\\0\\1\\0\end{bmatrix}$ $\frac{1}{2}\begin{bmatrix}1\\0\\-1\\0\end{bmatrix}$ $\frac{1}{2}\begin{bmatrix}1\\0\\j\\0\end{bmatrix}$ $\frac{1}{2}\begin{bmatrix}1\\0\\-j\\0\end{bmatrix}$ |
| 8 to 15 | $\frac{1}{2}\begin{bmatrix}0\\1\\0\\1\end{bmatrix}$ $\frac{1}{2}\begin{bmatrix}0\\1\\0\\-1\end{bmatrix}$ $\frac{1}{2}\begin{bmatrix}0\\1\\0\\j\end{bmatrix}$ $\frac{1}{2}\begin{bmatrix}0\\1\\0\\-j\end{bmatrix}$ $\frac{1}{2}\begin{bmatrix}1\\1\\1\\-1\end{bmatrix}$ $\frac{1}{2}\begin{bmatrix}1\\1\\j\\j\end{bmatrix}$ $\frac{1}{2}\begin{bmatrix}1\\1\\-1\\1\end{bmatrix}$ $\frac{1}{2}\begin{bmatrix}1\\1\\-j\\-j\end{bmatrix}$ |
| 16 to 23 | $\frac{1}{2}\begin{bmatrix}1\\j\\1\\j\end{bmatrix}$ $\frac{1}{2}\begin{bmatrix}1\\j\\j\\1\end{bmatrix}$ $\frac{1}{2}\begin{bmatrix}1\\j\\-1\\-j\end{bmatrix}$ $\frac{1}{2}\begin{bmatrix}1\\j\\-j\\-1\end{bmatrix}$ $\frac{1}{2}\begin{bmatrix}1\\-1\\1\\1\end{bmatrix}$ $\frac{1}{2}\begin{bmatrix}1\\-1\\j\\-j\end{bmatrix}$ $\frac{1}{2}\begin{bmatrix}1\\-1\\-1\\-1\end{bmatrix}$ $\frac{1}{2}\begin{bmatrix}1\\-1\\-j\\j\end{bmatrix}$ |
| 24 to 27 | $\frac{1}{2}\begin{bmatrix}1\\-j\\1\\-j\end{bmatrix}$ $\frac{1}{2}\begin{bmatrix}1\\-j\\j\\-1\end{bmatrix}$ $\frac{1}{2}\begin{bmatrix}1\\-j\\-1\\j\end{bmatrix}$ $\frac{1}{2}\begin{bmatrix}1\\-j\\-j\\1\end{bmatrix}$ — — — — |

TABLE 14 (b)

Quantity of layers is equal to 2

| TPMI index | Codebook W (respectively corresponding to the TPMI indexes from left to right according to a TPMI index increase principle) |
|---|---|
| 0 to 3 | $\frac{1}{2}\begin{bmatrix}1&0\\0&1\\0&0\\0&0\end{bmatrix}$ $\frac{1}{2}\begin{bmatrix}1&0\\0&0\\0&1\\0&0\end{bmatrix}$ $\frac{1}{2}\begin{bmatrix}1&0\\0&0\\0&0\\0&1\end{bmatrix}$ $\frac{1}{2}\begin{bmatrix}0&0\\1&0\\0&1\\0&0\end{bmatrix}$ |
| 4 to 7 | $\frac{1}{2}\begin{bmatrix}0&0\\1&0\\0&0\\0&1\end{bmatrix}$ $\frac{1}{2}\begin{bmatrix}0&0\\0&0\\1&0\\0&1\end{bmatrix}$ $\frac{1}{2}\begin{bmatrix}1&0\\0&1\\1&0\\0&-j\end{bmatrix}$ $\frac{1}{2}\begin{bmatrix}1&0\\0&1\\1&0\\0&j\end{bmatrix}$ |

TABLE 14 (b)-continued

Quantity of layers is equal to 2

| TPMI index | Codebook W (respectively corresponding to the TPMI indexes from left to right according to a TPMI index increase principle) | | | |
|---|---|---|---|---|
| 8 to 11 | $\frac{1}{2}\begin{bmatrix}1 & 0\\ 0 & 1\\ -j & 0\\ 0 & 1\end{bmatrix}$ | $\frac{1}{2}\begin{bmatrix}1 & 0\\ 0 & 1\\ -j & 0\\ 0 & -1\end{bmatrix}$ | $\frac{1}{2}\begin{bmatrix}1 & 0\\ 0 & 1\\ -1 & 0\\ 0 & -j\end{bmatrix}$ | $\frac{1}{2}\begin{bmatrix}1 & 0\\ 0 & 1\\ -1 & 0\\ 0 & j\end{bmatrix}$ |
| 12 to 15 | $\frac{1}{2}\begin{bmatrix}1 & 0\\ 0 & 1\\ j & 0\\ 0 & 1\end{bmatrix}$ | $\frac{1}{2}\begin{bmatrix}1 & 0\\ 0 & 1\\ j & 0\\ 0 & -1\end{bmatrix}$ | $\frac{1}{2\sqrt{2}}\begin{bmatrix}1 & 1\\ 1 & 1\\ 1 & -1\\ 1 & -1\end{bmatrix}$ | $\frac{1}{2\sqrt{2}}\begin{bmatrix}1 & 1\\ 1 & 1\\ j & -j\\ j & -j\end{bmatrix}$ |
| 16 to 19 | $\frac{1}{2\sqrt{2}}\begin{bmatrix}1 & 1\\ j & j\\ 1 & -1\\ j & -j\end{bmatrix}$ | $\frac{1}{2\sqrt{2}}\begin{bmatrix}1 & 1\\ j & j\\ j & -j\\ -1 & 1\end{bmatrix}$ | $\frac{1}{2\sqrt{2}}\begin{bmatrix}1 & 1\\ -1 & -1\\ 1 & -1\\ -1 & 1\end{bmatrix}$ | $\frac{1}{2\sqrt{2}}\begin{bmatrix}1 & 1\\ -1 & -1\\ j & -j\\ -j & j\end{bmatrix}$ |
| 20 and 21 | $\frac{1}{2\sqrt{2}}\begin{bmatrix}1 & 1\\ -j & -j\\ 1 & -1\\ -j & j\end{bmatrix}$ | $\frac{1}{2\sqrt{2}}\begin{bmatrix}1 & 1\\ -j & -j\\ j & -j\\ 1 & -1\end{bmatrix}$ | — | — |

TABLE 14 (c)

Quantity of layers is equal to 3

| TPMI index | Codebook W (respectively corresponding to the TPMI indexes from left to right according to a TPMI index increase principle) | | | |
|---|---|---|---|---|
| 0 to 3 | $\frac{1}{2}\begin{bmatrix}1 & 0 & 0\\ 0 & 1 & 0\\ 0 & 0 & 1\\ 0 & 0 & 0\end{bmatrix}$ | $\frac{1}{2}\begin{bmatrix}1 & 0 & 0\\ 0 & 1 & 0\\ 1 & 0 & 0\\ 0 & 0 & 1\end{bmatrix}$ | $\frac{1}{2}\begin{bmatrix}1 & 0 & 0\\ 0 & 1 & 0\\ -1 & 0 & 0\\ 0 & 0 & 1\end{bmatrix}$ | $\frac{1}{2\sqrt{3}}\begin{bmatrix}1 & 1 & 1\\ 1 & -1 & 1\\ 1 & 1 & -1\\ 1 & -1 & -1\end{bmatrix}$ |
| 4 to 6 | $\frac{1}{2\sqrt{3}}\begin{bmatrix}1 & 1 & 1\\ 1 & -1 & 1\\ j & j & -j\\ j & -j & -j\end{bmatrix}$ | $\frac{1}{2\sqrt{3}}\begin{bmatrix}1 & 1 & 1\\ -1 & 1 & -1\\ 1 & 1 & -1\\ -1 & 1 & 1\end{bmatrix}$ | $\frac{1}{2\sqrt{3}}\begin{bmatrix}1 & 1 & 1\\ -1 & 1 & -1\\ j & j & -j\\ -j & j & j\end{bmatrix}$ | — |

TABLE 14 (d)

Quantity of layers is equal to 4

| TPMI index | Codebook W (respectively corresponding to the TPMI indexes from left to right according to a TPMI index increase principle) | | | |
|---|---|---|---|---|
| 0 to 3 | $\frac{1}{2}\begin{bmatrix}1 & 0 & 0 & 0\\ 0 & 1 & 0 & 0\\ 0 & 0 & 1 & 0\\ 0 & 0 & 0 & 1\end{bmatrix}$ | $\frac{1}{2\sqrt{2}}\begin{bmatrix}1 & 1 & 0 & 0\\ 0 & 0 & 1 & 1\\ 1 & -1 & 0 & 0\\ 0 & 0 & 1 & -1\end{bmatrix}$ | $\frac{1}{2\sqrt{2}}\begin{bmatrix}1 & 0 & 0 & 0\\ 0 & 0 & 1 & 1\\ j & -j & 1 & 0\\ 0 & 0 & j & -j\end{bmatrix}$ | $\frac{1}{4}\begin{bmatrix}1 & 1 & 1 & 1\\ 1 & -1 & 1 & -1\\ 1 & 1 & -1 & -1\\ 1 & -1 & -1 & 1\end{bmatrix}$ |
| 4 | $\frac{1}{4}\begin{bmatrix}1 & 1 & 1 & 1\\ 1 & -1 & 1 & -1\\ j & j & -j & -j\\ j & -j & -j & j\end{bmatrix}$ | — | — | — |

A design in which the B bits in S401 include apart or all of bits in the precoding and quantity-of-layers indicator field includes any one of the following design D1 to design D3:

Design D1: The precoding and quantity-of-layers information is preconfigured for the UE or is configured by the base station for the UE by using semi-static signaling.

When the B bits in S401 include a part or all of bits in the precoding and quantity-of-layers indicator field, the precoding and quantity-of-layers information is preconfigured for the UE or is configured for the UE by using the semi-static signaling. When the data transmission of the UE is uplink data transmission, the UE may precode data based on the preconfigured precoding and quantity-of-layers information. When the data transmission of the UE is downlink data transmission, the base station may precode, based on the preconfigured precoding and quantity-of-layers information, data to be sent to the UE.

Design D2: An index of a precoding matrix or quantity-of-layers information is preconfigured for the UE or is configured by the base station for the UE by using semi-static signaling.

In a possible design, when the B bits in S401 include a part of bits, for example, B1 bits, in the precoding and quantity-of-layers indicator field, an index of a codebook is preconfigured for the UE or is configured for the UE by using the semi-static signaling, and a part or all of bits in the precoding and quantity-of-layers indicator field other than the B1 bits are used to indicate the quantity-of-layers information configured for the UE. When the data transmission of the UE is uplink data transmission, the UE determines the codebook based on a preconfiguration, and determines, based on the part or all of the bits in the precoding and quantity-of-layers indicator field other than the B1 bits, a quantity of layers that is configured for the UE. The UE may precode data based on the determined codebook and quantity of layers. When the data transmission of the UE is downlink data transmission, the UE determines the codebook based on a preconfiguration, determines, based on the part or all of the bits in the precoding and quantity-of-layers indicator field other than the B1 bits, a quantity of layers that is configured for the UE, and considers that data sent by the base station to the UE is precoded based on the determined quantity of layers and codebook. In the method, the preconfigured index of the codebook may be a codebook index. In this embodiment of this application, a codebook index may be, for example, the TPMI=0, the TPMI=1, the TPMI=2, or the TPMI=3.

For example, in Table 13, a total of 16 pieces of candidate precoding and quantity-of-layers information whose indexes are 0 to 15 are configured for the non-coherent codebook subset. In this case, in a conventional method, the precoding and quantity-of-layers indicator field may include $\log_2(16)=4$-bit information to indicate a quantity of layers and a codebook that are configured for the UE. When the configuration in Table 13 is used in the method provided in this embodiment of this application, the index of the codebook may be preconfigured for the UE as 0 (namely, the TPMI=0), and there are a total of four pieces of candidate precoding and quantity-of-layers information corresponding to the TPMI=0: one layer: TPMI=0; two layers: TPMI=0; three layers: TPMI=0; and four layers: TPMI=0. When one of the four pieces of precoding and quantity-of-layers information is configured for the UE, $\log_2(4)=2$-bit information is required in total. Therefore, the B bits in S401 may include the B bits in the precoding and quantity-of-layers indicator field, where B1 is less than or equal to 4−2=2, and the quantity-of-layers information configured for the UE is indicated by using a bit in the precoding and quantity-of-layers indicator field other than the B1 bits. For example, when B1 is equal to 2, Table 15(a) shows quantity-of-layers information, configured for the UE, indicated by values of bits in the precoding and quantity-of-layers indicator field other than the B1 bits. When B1 is equal to 1, Table 15(b) or Table 15(c) shows quantity-of-layers information, configured for the UE, indicated by values of bits in the precoding and quantity-of-layers indicator field other than the B1 bits.

TABLE 15(a)

| Values of bits in the precoding and quantity-of-layers indicator field other than the B1 bits | 00 | 01 | 10 | 11 |
|---|---|---|---|---|
| Indicated quantity-of-layers information configured for the UE | One layer (corresponding to one layer: TPMI = 0 in Table 10) | Two layers (corresponding to two layers: TPMI = 0 in Table 10) | Three layers (corresponding to three layers: TPMI = 0 in Table 10) | Four layers (corresponding to four layers: TPMI = 0 in Table 10) |

TABLE 15(b)

| Values of a part of bits in the precoding and quantity-of-layers indicator field other than the B1 bits | 00 | 01 | 10 | 11 |
|---|---|---|---|---|
| Indicated quantity-of-layers information configured for the UE | One layer (corresponding to one layer: TPMI = 0 in Table 10) | Two layers (corresponding to two layers: TPMI = 0 in Table 10) | Three layers (corresponding to three layers: TPMI = 0 in Table 10) | Four layers (corresponding to four layers: TPMI = 0 in Table 10) |

TABLE 15(c)

| Values of all bits in the precoding and quantity-of-layers indicator field other than the B1 bits | 000 | 001 | 010 | 011 |
|---|---|---|---|---|
| Indicated quantity-of-layers information configured for the UE | One layer (corresponding to one layer: TPMI = 0 in Table 10) | Two layers (corresponding to two layers: TPMI = 0 in Table 10) | Three layers (corresponding to three layers: TPMI = 0 in Table 10) | Four layers (corresponding to four layers: TPMI = 0 in Table 10) |
| Values of all bits in the precoding and quantity-of-layers indicator field other than the B1 bits | 100 | 101 | 110 | 111 |
| Indicated quantity-of-layers information configured for the UE | Reserved | Reserved | Reserved | Reserved |

Optionally, the values of the quantity of layers, the values of the bits in the precoding and quantity-of-layers indicator field other than the B1 bits, and/or the correspondences between the value of the quantity of layers and the values of the bits in the precoding and quantity-of-layers indicator field other than the B1 bits in Table 15(a) to Table 15(c) are merely examples, and another value or another correspondence is also applicable to the method provided in this embodiment of this application. This is not limited in this application.

Optionally, the correspondence between the values of the bits in the precoding and quantity-of-layers indicator field other than the B1 bits and the value of the quantity of layers that is configured for the UE may be predefined, or may be notified by the base station to the UE by using signaling. This is not limited in this application.

In a possible design, when the B bits in S401 include a part of bits, for example, B1 bits, in the precoding and quantity-of-layers indicator field, a quantity of layers is preconfigured for the UE or is configured for the UE by using the semi-static signaling, and a part or all of bits in the precoding and quantity-of-layers indicator field other than the B bits are used to indicate a codebook configured for the UE. When the data transmission of the UE is uplink data transmission, the UE determines the quantity of layers based on a preconfiguration, and determines, based on the part or all of the bits in the precoding and quantity-of-layers indicator field other than the B1 bits, the codebook configured for the UE. The UE may precode data based on the determined codebook and quantity of layers. When the data transmission of the UE is downlink data transmission, the UE determines the quantity of layers based on a preconfiguration, determines, based on the part or all of the bits in the precoding and quantity-of-layers indicator field other than the B1 bits, the codebook configured for the UE, and considers that data sent by the base station to the UE is precoded based on the determined quantity of layers and codebook. In the method, the preconfigured quantity of layers may be a quantity of layers. In this embodiment of this application, a quantity of layers may be, for example, 1, 2, 3, or 4.

For example, in Table 13, a total of 16 pieces of candidate precoding and quantity-of-layers information whose indexes are 0 to 15 are configured for the non-coherent codebook subset. In this case, in a conventional method, the precoding and quantity-of-layers indicator field may include $\log_2(16)=4$-bit information to indicate a quantity of layers and a codebook that are configured for the UE. When the configuration in Table 13 is used in the method provided in this embodiment of this application, the quantity of layers may be preconfigured for the UE as 1 (namely, one layer), and there are a total of four pieces of candidate precoding and quantity-of-layers information corresponding to one layer: one layer: TPMI=0; one layer: TPMI=1; one layer: TPMI=2; and one layer: TPMI=3. When one of the four pieces of precoding and quantity-of-layers information is configured for the UE, $\log_2(4)=2$-bit information is required in total. Therefore, the B bits in S401 may include the B1 bits in the precoding and quantity-of-layers indicator field, where B1 is less than or equal to 4−2=2, and the codebook configured for the UE is indicated by using a bit in the precoding and quantity-of-layers indicator field other than the B1 bits. For example, when B1 is equal to 2, Table 16(a) shows an index, of a codebook configured for the UE, indicated by values of bits in the precoding and quantity-of-layers indicator field other than the B1 bits. When B1 is equal to 1, Table 16(b) or Table 16(c) shows an index, of a codebook configured for the UE, indicated by values of bits in the precoding and quantity-of-layers indicator field other than the B1 bits.

TABLE 16(a)

| Values of bits in the precoding and quantity-of-layers indicator field other than the B1 bits | 00 | 01 | 10 | 11 |
|---|---|---|---|---|
| Indicated index of the codebook configured for the UE | TPMI = 0 (corresponding to one layer: | TPMI = 1 (corresponding to one layer: | TPMI = 2 (corresponding to one layer: | TPMI = 3 (corresponding to one layer: |

TABLE 16(a)-continued

| Values of bits in the precoding and quantity-of-layers indicator field other than the B1 bits | 00 | 01 | 10 | 11 |
|---|---|---|---|---|
| | TPMI = 0 in Table 10) | TPMI = 1 in Table 10) | TPMI = 2 in Table 10) | TPMI = 3 in Table 10) |

TABLE 16(b)

| Values of a part of bits in the precoding and quantity-of-layers indicator field other than the B1 bits | 00 | 01 | 10 | 11 |
|---|---|---|---|---|
| Indicated index of the codebook configured for the UE | TPMI = 0 (corresponding to one layer: TPMI = 0 in Table 10) | TPMI = 1 (corresponding to one layer: TPMI = 1 in Table 10) | TPMI = 2 (corresponding to one layer: TPMI = 2 in Table 10) | TPMI = 3 (corresponding to one layer: TPMI = 3 in Table 10) |

TABLE 16(c)

| Values of bits in the precoding and quantity-of-layers indicator field other than the B1 bits | 000 | 001 | 010 | 011 |
|---|---|---|---|---|
| Indicated index of the codebook configured for the UE | TPMI = 0 (corresponding to one layer: TPMI = 0 in Table 10) | TPMI = 1 (corresponding to one layer: TPMI = 1 in Table 10) | TPMI = 2 (corresponding to one layer: TPM1 = 2 in Table 10) | TPMI = 3 (corresponding to one layer: TPMI = 3 in Table 10) |
| Values of bits in the precoding and quantity-of-layers indicator field other than the B1 bits | 100 | 101 | 110 | 111 |
| Indicated index of the codebook configured for the UE | Reserved | Reserved | Reserved | Reserved |

Optionally, the indexes of the codebooks, the values of the bits in the precoding and quantity-of-layers indicator field other than the B1 bits, and/or the correspondences between the index of the codebook and the values of the bits in the precoding and quantity-of-layers indicator field other than the B1 bits in Table 16(a) to Table 16(c) are merely examples, and another index, another value, or another correspondence is also applicable to the method provided in this embodiment of this application. This is not limited in this application.

Optionally, the correspondence between the index of the codebook and the values of the bits in the precoding and quantity-of-layers indicator field other than the B1 bits may be predefined, or may be notified by the base station to the UE by using signaling. This is not limited in this application.

In a possible design, when the B bits in S401 include a part of bits, for example, B1 bits, in the precoding and quantity-of-layers indicator field, an index of a codebook is preconfigured for the UE or is configured for the UE by using the semi-static signaling, and a part or all of bits in the precoding and quantity-of-layers indicator field other than the B bits are used to indicate a quantity of layers and the codebook that are configured for the UE. When the data transmission of the UE is uplink data transmission, the UE determines, based on a bit in the precoding and quantity-of-layers indicator field other than the B1 bits, the quantity of layers and the codebook that are configured for the UE. The UE may precode data based on the determined codebook and quantity of layers. When the data transmission of the UE is downlink data transmission, the UE determines, based on a bit in the precoding and quantity-of-layers indicator field other than the B1 bits, the quantity of layers and the codebook that are configured for the UE, and considers that data sent by the base station to the UE is precoded based on the determined quantity of layers and codebook. In the method, the preconfigured index of the codebook may include at least two codebook indexes, for example, the TPMI=0 and the TPMI=1, the TPMI=1 and the TPMI=2, or the TPMI=0 and the TPMI=3. In the embodiments of this application, "at least two" may be two, three, four, or more. This is not limited in this application.

For example, in Table 13, a total of 32 pieces of candidate precoding and quantity-of-layers information whose indexes are 0 to 31 are configured for the partial and non-coherent codebook subset. In this case, in a conventional method, the precoding and quantity-of-layers indicator field may include $\log_2(32)=5$-bit information to indicate a quantity of layers and a codebook that are configured for the UE. When the configuration in Table 13 is used in the method provided in this embodiment of this application, the index of the codebook may be preconfigured for the UE as 0 or 1 (namely, the TPMI=0 or the TPMI=1), and there are a total of eight pieces of candidate precoding and quantity-of-layers information corresponding to the TPMI=0 and the TPMI=1: one layer: TPMI=0; one layer: TPMI=1; two layers: TPMI=0; two layers: TPMI=1; three layers: TPMI=0; three layers: TPMI=1; four layers: TPMI=0; and four layers: TPMI=1. When one of the eight pieces of precoding and quantity-of-layers information is configured for the UE, $\log_2(8)=3$-bit information is required in total. Therefore, the B bits in S401 may include the B1 bits in the precoding and quantity-of-layers indicator field, where B1 is less than or equal to 5−3=2, and the quantity of layers and the codebook that are configured for the UE are indicated by using the bit in the precoding and quantity-of-layers indicator field other than the B1 bits. For example, when B1 is equal to 2, Table 17 shows a quantity of layers and a codebook that are configured for the UE and that is indicated by values of bits in the precoding and quantity-of-layers indicator field other than the B1 bits.

TABLE 17

| Values of bits in the precoding and quantity-of-layers indicator field other than the B1 bits | Indicated codebook and quantity-of-layers information that are configured for the UE |
|---|---|
| 000 | One layer: TPMI = 0 |
| 001 | One layer: TPMI = 1 |
| 010 | Two layers: TPMI = 0 |
| 011 | Two layers: TPMI = 1 |
| 100 | Three layers: TPMI = 0 |
| 101 | Three layers: TPMI = 1 |
| 110 | Four layers: TPMI = 0 |
| 111 | Four layers: TPMI = 1 |

Optionally, the indexes of the codebooks, the quantity-of-layers information, the values of the bits in the precoding and quantity-of-layers indicator field other than the B1 bits, and/or the correspondences between the values of the bits in the precoding and quantity-of-layers indicator field other than the B1 bits and both the codebook and the quantity-of-layers information in Table 17 are merely examples, and another codebook index, another value, or another correspondence may also be applicable to the method provided in this embodiment of this application. This is not limited in this application.

Optionally, the correspondence between the values of the bits in the precoding and quantity-of-layers indicator field other than the B1 bits and both the codebook and the quantity-of-layers information may be predefined, or may be notified by the base station to the UE by using signaling. This is not limited in this application.

In a possible design, when the B bits in S401 include a part of bits, for example, B bits, in the precoding and quantity-of-layers indicator field, a quantity of layers is preconfigured for the UE or is configured by the base station for the UE by using the semi-static signaling, and a bit in the precoding and quantity-of-layers indicator field other than the B1 bits is used to indicate the quantity of layers and a codebook that are configured for the UE. When the data transmission of the UE is uplink data transmission, the UE determines, based on the bit in the precoding and quantity-of-layers indicator field other than the B1 bits, the quantity of layers and the codebook that are configured for the UE. The UE may precode data based on the determined codebook and quantity of layers. When the data transmission of the UE is downlink data transmission, the UE determines, based on the bit in the precoding and quantity-of-layers indicator field other than the B1 bits, the quantity of layers and the codebook that are configured for the UE, and considers that data sent by the base station to the UE is precoded based on the determined quantity of layers and codebook. In the method, the quantity of layers that is preconfigured or that is configured by the base station for the UE by using the semi-static signaling may include at least two quantities of layers. In this embodiment of this application, the at least two quantities of layers may be, for example, 1 and 2, 1 and 3, or 2 and 3.

For example, in Table 13, a total of 32 pieces of candidate precoding and quantity-of-layers information whose indexes are 0 to 31 are configured for the partial and non-coherent codebook subset. In this case, in a conventional method, the precoding and quantity-of-layers indicator field may include $\log_2(32)=5$-bit information to indicate a quantity of layers and a codebook that are configured for the UE. When the configuration in Table 13 is used in the method provided in this embodiment of this application, the quantity of layers may be preconfigured for the UE as 3 or 4 (namely, the three layers or the four layers), and there are a total of six pieces of candidate precoding and quantity-of-layers information corresponding to the three layers or the four layers: three layers: TPMI=0; four layers: TPMI=0; three layers: TPMI=1; three layers: TPMI=2; four layers: TPMI=1; and four layers: TPMI=2. When one of the six pieces of precoding and quantity-of-layers information is configured for the UE, $\log_2(6)=3$-bit information is required in total. Therefore, the B bits in S401 may include the B1 bits in the precoding and quantity-of-layers indicator field, where B1 is less than or equal to 5−3=2, and the quantity of layers and the codebook that are configured for the UE are indicated by using the bit in the precoding and quantity-of-layers indicator field other than the B1 bits. For example, when B1 is equal to 2, Table 18 shows a quantity of layers and a codebook that are configured for the UE and that are indicated by values of bits in the precoding and quantity-of-layers indicator field other than the B1 bits.

TABLE 18

| Values of bits in the precoding and quantity-of-layers indicator field other than the B1 bits | Indicated codebook and quantity-of-layers information that are configured for the UE |
|---|---|
| 000 | Three layers: TPMI = 0 |
| 001 | Four layers: TPMI = 0 |
| 010 | Three layers: TPMI = 1 |
| 011 | Three layers: TPMI = 2 |
| 100 | Four layers: TPMI = 1 |
| 101 | Four layers: TPMI = 2 |
| 110 | Reserved |
| 111 | Reserved |

Optionally, the indexes of the codebooks, the quantity-of-layers information, the values of the bits in the precoding and quantity-of-layers indicator field other than the B1 bits, and/or the correspondences between the values of the bits in the precoding and quantity-of-layers indicator field other than the B1 bits and both the codebook and the quantityof-layers information in Table 18 are merely examples, and another codebook index, another value, or another correspondence may also be applicable to the method provided in this embodiment of this application. This is not limited in this application.

Optionally, the correspondence between the values of the bits in the precoding and quantity-of-layers indicator field other than the B1 bits and both the codebook and the quantity-of-layers information may be predefined, or may be notified by the base station to the UE by using signaling. This is not limited in this application.

In a possible design, when the B bits in S401 include a part of bits, for example, B bits, in the precoding and quantity-of-layers indicator field, a quantity of layers and an index of a codebook are preconfigured for the UE or are configured by the base station for the UE by using the semi-static signaling, and a bit in the precoding and quantity-of-layers indicator field other than the B1 bits is used to indicate the quantity of layers and the codebook that are configured for the UE. When the data transmission of the UE is uplink data transmission, the UE determines, based on the bit in the precoding and quantity-of-layers indicator field other than the B1 bits, the quantity of layers and the codebook that are configured for the UE. The UE may precode data based on the determined codebook and quantity of layers. When the data transmission of the UE is downlink data transmission, the UE determines, based on the bit in the precoding and quantity-of-layers indicator field other than the B1 bits, the quantity of layers and the codebook that are configured for the UE, and considers that data sent by the base station to the UE is precoded based on the determined quantity of layers and codebook. In the method, the preconfigured quantity of layers may include at least two quantities of layers, for example, one layer and two layers, one layer and three layers, or two layers and three layers; and/or the index, of the codebook, preconfigured for the UE or configured by the base station for the UE by using the semi-static signaling may include at least two codebook indexes. In this embodiment of this application, the at least two codebook indexes may be, for example, the TPMI=0 and the TPMI=1, the TPMI=1 and the TPMI=2, or the TPMI=0 and the TPMI=3.

For example, in Table 13, a total of 32 pieces of candidate precoding and quantity-of-layers information whose indexes are 0 to 31 are configured for the partial and non-coherent codebook subset. In this case, in a conventional method, the precoding and quantity-of-layers indicator field may include $\log_2(32)=5$-bit information to indicate a quantity of layers and a codebook that are configured for the UE. When the configuration in Table 13 is used in the method provided in this embodiment of this application, the quantity of layers may be preconfigured for the UE as 1, 2, 3, or 4 (namely, the one layer, the two layers, the three layers, or the four layers) and the codebook index may be preconfigured for the UE as 0 or 1, and there are a total of eight pieces of candidate precoding and quantity-of-layers information corresponding to the one layer, the two layers, the three layers, and the four layers and also corresponding to the TPMI=1 and the TPMI=2: one layer: TPMI=0; one layer: TPMI=1; two layers: TPMI=0; two layers: TPMI=1; three layers: TPMI=0; four layers: TPMI=0; three layers: TPMI=1; and four layers: TPMI=1. When one of the eight pieces of precoding and quantity-of-layers information is configured for the UE, $\log_2(8)=3$-bit information is required in total. Therefore, the B bits in S401 may include the B1 bits in the precoding and quantity-of-layers indicator field, where B1 is less than or equal to 5−3=2, and the quantity of layers and the codebook that are configured for the UE are indicated by using the bit in the precoding and quantity-of-layers indicator field other than the B1 bits. For example, when B1 is equal to 2, Table 19 shows a quantity of layers and a codebook that are configured for the UE and that are indicated by values of bits in the precoding and quantity-of-layers indicator field other than the B bits.

TABLE 19

| Values of bits in the precoding and quantity-of-layers indicator field other than the B1 bits | Indicated codebook and quantity-of-layers information that are configured for the UE |
| --- | --- |
| 000 | One layer: TPMI = 0 |
| 001 | One layer: TPMI = 1 |
| 010 | Two layers: TPMI = 0 |
| 011 | Two layers: TPMI = 1 |
| 100 | Three layers: TPMI = 0 |
| 101 | Four layers: TPMI = 0 |
| 110 | Three layers: TPMI = 1 |
| 111 | Four layers: TPMI = 1 |

Optionally, the indexes of the codebooks, the quantity-of-layers information, the values of the bits in the precoding and quantity-of-layers indicator field other than the B1 bits, and/or the correspondences between the values of the bits in the precoding and quantity-of-layers indicator field other than the B1 bits and both the codebook and the quantity-of-layers information in Table 19 are merely examples, and another codebook index, another value, or another correspondence may also be applicable to the method provided in this embodiment of this application. This is not limited in this application.

Optionally, the correspondence between the values of the bits in the precoding and quantity-of-layers indicator field other than the B1 bits and both the codebook and the quantity-of-layers information may be predefined, or may be notified by the base station to the UE by using signaling. This is not limited in this application.

Design D3: A codebook and quantity-of-layers information are configured for the UE from a subset of the candidate precoding and quantity-of-layers information.

In a possible design, when the B bits in S401 include a part of bits, for example, B1 bits, in the precoding and quantity-of-layers indicator field, the subset of the candidate precoding and quantity-of-layers information is preconfigured for the UE or is configured by the base station for the UE by using semi-static signaling, and a part or all of bits in the precoding and quantity-of-layers indicator field other than the B1 bits are used to indicate, from the subset, the quantity-of-layers information configured for the UE.

Optionally, when the data transmission of the UE is uplink data transmission, the UE determines the subset of the candidate precoding and quantity-of-layers information based on the semi-static signaling received from the base station or a preconfiguration, where the subset corresponds to a quantity of layers. The UE determines, in the subset based on the part or all of the bits in the precoding and quantity-of-layers indicator field other than the B1 bits, the codebook configured for the UE. The UE may precode data based on the determined codebook and the quantity of layers. When the data transmission of the UE is downlink data transmission, the UE determines the subset of the candidate precoding and quantity-of-layers information based on the semi-static signaling received from the base station or a preconfiguration, where the subset corresponds to a quantity of layers. The UE determines, in the subset based on the part or all of the bits in the precoding and quantity-of-layers indicator field other than the B1 bits, the codebook configured for the UE, and considers that data sent by the base station to the UE is precoded based on the quantity of layers and the determined codebook.

Optionally, when the data transmission of the UE is uplink data transmission, the UE determines the subset of the candidate precoding and quantity-of-layers information based on the semi-static signaling received from the base station or a preconfiguration, where the subset corresponds to a codebook index. The UE determines, in the subset based on the part or all of the bits in the precoding and quantity-of-layers indicator field other than the B1 bits, a quantity of layers that is configured for the UE. The UE may precode data based on the determined codebook and a codebook corresponding to the codebook index. When the data transmission of the UE is downlink data transmission, the UE determines the subset of the candidate precoding and quantity-of-layers information based on the semi-static signaling received from the base station or a preconfiguration, where the subset corresponds to a codebook index. The UE determines, in the subset based on the part or all of the bits in the precoding and quantity-of-layers indicator field other than the B1 bits, a quantity of layers that is configured for the UE, and considers that data sent by the base station to the UE is precoded based on the determined codebook and a codebook corresponding to the codebook index.

Optionally, when the data transmission of the UE is uplink data transmission, the UE determines the subset of the candidate precoding and quantity-of-layers information based on the semi-static signaling received from the base station or a preconfiguration, where the subset corresponds to at least two quantities of layers and/or at least two codebook indexes. The UE determines, in the subset based on the part or all of the bits in the precoding and quantity-of-layers indicator field other than the B1 bits, a quantity of layers and a codebook that are configured for the UE. The UE may precode data based on the determined codebook and quantity of layers. When the data transmission of the UE is downlink data transmission, the UE determines the subset of the candidate precoding and quantity-of-layers information based on the semi-static signaling received from the base station or a preconfiguration, where the subset corresponds to at least two quantities of layers and at least two codebook indexes. The UE determines, in the subset based on the part or all of the bits in the precoding and quantity-of-layers indicator field other than the B bits, a codebook and an index that are configured for the UE, and considers that data sent by the base station to the UE is precoded based on the determined quantity of layers and codebook.

Optionally, in this embodiment of this application, the method in FIG. 3 and/or FIG. 4 may be referred to as an indication extension method, and may be used in various possible scenarios, and especially in a high-frequency scenario, a multi-antenna scenario, and the like.

In this embodiment of this application, the indication extension method may include any one of the following three methods:

The base station configures the candidate time domain resources for the UE by using the method in FIG. 3, and indicates, by using the time domain resource allocation field included in the DCI, the time domain resource configured for the UE (the conventional method).

N1 time domain resources corresponding to the N1 time domain resource allocations indicated by the time domain resource allocation indication information are used as candidate time domain resources configured for the UE (the conventional method), and the base station indicates, by using the method in FIG. 4, the time domain resource configured for the UE.

The base station configures the candidate time domain resources for the UE by using the method in FIG. 3, and indicates, by using the method in FIG. 4, the time domain resource configured for the UE.

In this embodiment of this application, the conventional time domain resource indication method includes: using N1 time domain resources corresponding to N1 time domain resource allocations indicated by time domain resource allocation indication information as candidate time domain resources configured for UE; and/or indicating, by a base station by using a time domain resource allocation field included in DCI, a time domain resource configured for UE. A maximum quantity (a maximum value of N) of time domain resource allocations may be preconfigured, or may be configured by the base station for the UE by using signaling. This is not limited in this application.

In this embodiment of this application, the conventional time domain resource indication method may be used to use the N1 time domain resources corresponding to the N1 time domain resource allocations indicated by the time domain resource allocation indication information as the candidate time domain resources configured for the UE, or the candidate time domain resources may be configured by using another time domain resource indication method. The conventional time domain resource indication method may be used to enable the base station to indicate, by using the time domain resource allocation field included in the DCI, the time domain resource configured for the UE, or another time domain resource indication method may be used to configure the time domain resource for the UE.

Optionally, when the N1 time domain resource allocations are indicated by using the time domain resource allocation indication information, in a scenario in which N1 is equal to the maximum quantity (for example, 16) of time domain resource allocations supported by the time domain resource allocation indication information, the method in FIG. 3 and/or the method in FIG. 4 may be used. According to the method, when the indication extension method or the conventional method can be selectively used, signaling is not required to indicate a selected method, thereby reducing signaling overheads. In a scenario in which N1 is less than the maximum quantity of time domain resource allocations supported by the time domain resource allocation indication information, the method in FIG. 3 and/or the method in FIG. 4 may be used, or the conventional time domain resource indication method may be used, or another time domain resource indication method may be used. This is not limited in this application. The method provided in this embodiment of this application is used in both the two scenarios, so that more candidate time domain resources can be supported, and a system design can be simplified.

Optionally, in a scenario in which a frequency of a frequency band in which the data transmission is performed is greater than or equal to a first threshold, for example, 6 GHz, the method in FIG. 3 and/or the method in FIG. 4 may be used. A requirement on flexibility of time domain resource allocation may be relatively high at a high frequency. For example, when more candidate time domain resource allocations need to be supported to support more beams, data transmission in a high-frequency scenario can be better supported by using the method. In a scenario in which a frequency of a frequency band in which the data transmission is performed is less than a first threshold, the method in FIG. 3 and/or the method in FIG. 4 may be used, or the conventional time domain resource indication method may be used, or another time domain resource indication method may be used. This is not limited in this application. A requirement on flexibility of time domain resource allocation may be relatively high at a low frequency in a multi-antenna scenario. For example, when more candidate time domain resource allocations need to be supported to support more beams, data transmission in a multi-beam scenario can be better supported by using the method. The first threshold may be preconfigured, or may be configured by the base station for the UE by using signaling. This is not limited in this application.

Optionally, when a plurality of time domain resource configuration methods may be supported, for example, when the indication extension method and the conventional time domain resource indication method are supported, a time domain resource configuration method to be used or whether to enable the indication extension method may be determined or configured in the following several manners.

In a possible implementation, when the N1 time domain resource allocations are indicated by using the time domain resource allocation indication information, and N1 is equal to the maximum quantity of time domain resource allocations supported by the time domain resource allocation indication information, the method in FIG. 3 and/or the method in FIG. 4 may be used. When the N1 time domain resource allocations are indicated by the time domain resource allocation indication information, and N1 is less than the maximum quantity of time domain resource allocations supported by the time domain resource allocation indication information, the conventional time domain resource indication method may be used. In the method, N1 may be equal to the maximum quantity of time domain resource allocations supported by the time domain resource allocation indication information, to indicate that more candidate time domain resources need to be configured, thereby reducing the signaling overheads.

In a possible implementation, in the scenario in which the frequency of the frequency band in which the data transmission is performed is greater than or equal to the first threshold, for example, 6 GHz, the method in FIG. 3 and/or the method in FIG. 4 may be used. In the scenario in which the frequency of the frequency band in which the data transmission is performed is less than the first threshold, the conventional time domain resource indication method may be used. According to the method, the signaling overheads can be reduced.

In a possible implementation, the base station may send an extension indication to the UE, to indicate whether to enable the indication extension method. For example, when a value of the extension indication is t1, the indication extension method is enabled, and for example, the method in FIG. 3 and/or the method in FIG. 4 are/is enabled. For another example, when a value of the extension indication is not t1 but is t2, the indication extension method is disabled, and for example, the method in FIG. 3 and/or the method in FIG. 4 are/is disabled. t1 may be true or 1, and t2 may be false or 0. According to the method, the indication extension method can be more flexibly used in various scenarios with requirements.

In a possible implementation, in the method in FIG. 4, after DCI scrambled by using a first radio network temporary identifier (RNTI) is received, if a cyclic redundancy check (CRC) of the DCI is scrambled by using the first RNTI, the method in FIG. 4 may be used. It may be considered that a function of the first RNTI is used to enable the method in FIG. 4. According to the method, the signaling overheads can be reduced.

In a possible implementation, a received synchronization signal and PBCH block (SSB) may be used to indicate whether to enable the indication extension method. The SSB is information sent by the base station to the UE, and may carry a Primary Synchronization Signal (PSS), a Secondary Synchronization Signal (SSS), and a Physical Broadcast Channel (PBCH). The PSS and the SSS are used for downlink synchronization between the base station and the UE, and may further be used to determine an identifier of a cell in which the UE is located. The PBCH is used by the base station to notify the UE of a broadcast message. For example, after an SSB whose subcarrier spacing is greater than or equal to a second threshold is received, if the second threshold is, for example, 60 kHz, the method in FIG. 3 and/or the method in FIG. 4 may be used. For another example, after an SSB whose subcarrier spacing is less than a second threshold is received, if the second threshold is, for example, 60 kHz, the conventional time domain resource indication method may be used. The second threshold may be preconfigured, or may be configured by the base station for the UE by using signaling. This is not limited in this application. The method may be used in a scenario in which a subcarrier spacing of an SSB is related to a plurality of beams or a frequency band. For example, a larger subcarrier spacing of the SSB indicates a larger quantity of supported beams or a higher frequency band in which the data transmission is performed. According to the method, the signaling overheads can be reduced.

Optionally, when the N2 candidate time domain resources are determined based on the N1 time domain resource allocations, the N2 candidate time domain resources may be numbered, to obtain indexes of the candidate time domain resources. For example, the indexes are respectively 0 to N2−1 or 1 to N2. A rule of numbering the N2 candidate time domain resources may be sequentially numbering the candidate time domain resources corresponding to each time domain resource allocation based on indexes of the time domain resource allocations in the priority sequence of determining the candidate time domain resources in this application, or may be sequentially numbering the candidate time domain resources in another sequence. This is not limited in this application. The time domain resource allocation field and the B bits in the RV version indicator field in the DCI jointly indicate an index of the time domain resource configured for the UE from the N2 candidate time domain resources.

For example, the base station sends the time domain resource allocation indication information to the UE, where the time domain resource allocation indication information is used to indicate 16 time domain resource allocations. For one of the 16 time domain resource allocations, the time domain resource allocation may indicate a start symbol position S and a length L of one candidate time domain resource, and may further indicate K of the candidate time domain resource. Correspondingly, the UE receives the time domain resource allocation indication information sent by the base station. It is assumed that a total of 64 candidate time domain resources may be determined based on the 16 time domain resource allocations, and indexes of the 64 candidate time domain resources may be respectively 0 to 63. A method for determining the 64 candidate time domain resources may be any method in FIG. 3. This is not limited herein. If a maximum size of the time domain resource allocation field in the DCI is 4, the base station may configure the time domain resource for the UE from the 64 candidate time domain resources by using the time domain resource allocation field and two bits in the RV version indicator field in the DCI, in other words, the index of the time domain resource configured for the UE from the 64 candidate time domain resources is indicated by using a total of 6-bit information: four bits in the time domain resource allocation field and two bits in the RV version indicator field, and a used method may be any method in FIG. 4. This is not limited herein. In this case, the base station may indicate, to the UE by using signaling, that the indication extension method is enabled, or may indicate, to the UE by using signaling, that the RV version indicator field is used to indicate the time domain resource configured for the UE.

In this embodiment of this application, optionally, for a method obtained by combining FIG. 3 and FIG. 4:

A base station sends time domain resource allocation indication information to UE, where the time domain resource allocation indication information is used to indicate N1 time domain resource allocations, and the N1 time domain resource allocations are used to determine N2 candidate time domain resources. N3 candidate time domain resources may be determined based on one of the N1 time domain resource allocations, where N3 is an integer greater than or equal to 1.

The base station sends downlink control information DCI to the UE, where the DCI includes a time domain resource allocation field and a first field, and the time domain resource allocation field and B bits in the first field are jointly used to indicate, from the N2 candidate time domain resources, a time domain resource configured for the UE.

Optionally, the N3 candidate time domain resources may be determined based on one of the N1 time domain resource allocations. The N3 candidate time domain resources may be described as a group of candidate time domain resources, and it may be considered that the group of candidate time domain resources corresponds to the time domain resource allocation, or it may be described as that a time domain resource in the group of candidate time domain resources corresponds to the time domain resource allocation. Therefore, N1 groups of candidate time domain resources may be determined based on the N1 time domain resource allocations. Therefore, it may also be considered that the determined N2 candidate time domain resources may be represented as the N1 groups of candidate time domain resources.

In a possible implementation, optionally, the time domain resource allocation field in the DCI is used to indicate a group of candidate time domain resources in which the time domain resource configured for the UE is located, or it may be considered that the time domain resource allocation field in the DCI is used to indicate a time domain resource allocation corresponding to the time domain resource configured for the UE. The B bits in the first field are used to indicate, from the group of candidate time domain resources, the time domain resource configured for the UE, or it may be considered that the B bits in the first field are used to indicate, from the candidate time domain resources determined based on the time domain resource allocation, the time domain resource configured for the UE.

Optionally, the N1 time domain resource allocations indicated by the time domain resource allocation indication information may be numbered, to obtain indexes of the time domain resource allocations. For example, the indexes are respectively 0 to N1−1 or 1 to N1. When the time domain resource allocation field in the DCI is used to indicate the time domain resource allocation corresponding to the time domain resource configured for the UE, the time domain resource allocation field may indicate an index of the time domain resource allocation corresponding to the time domain resource configured for the UE. The UE may determine, based on the time domain resource allocation field in the DCI, the time domain resource allocation corresponding to the time domain resource configured for the UE.

Optionally, a rule of numbering the time domain resource allocations may be sequentially numbering the time domain resource allocations in a sequence of the time domain resource allocations configured by the base station, or the time domain resource allocations may be numbered according to another rule. This is not limited in this application.

Optionally, N3 candidate time domain resources determined based on one time domain resource allocation may be numbered, to obtain indexes of the candidate time domain resources. For example, the indexes of the N3 candidate time domain resources are respectively 0 to N3−1 or 1 to N3. The B bits in the first field are used to indicate an index of the time domain resource configured for the UE from the N3 candidate time domain resources, and the N3 candidate time domain resources are determined based on the time domain resource allocation corresponding to the time domain resource configured for the UE. One of the N3 candidate time domain resources may be determined based on the B bits in the first field.

Optionally, a rule of numbering the N3 candidate time domain resources may be sequentially numbering the candidate time domain resources in the priority sequence of determining the candidate time domain resources in this embodiment of this application, or the candidate time domain resources may be numbered according to another rule. This is not limited in this application.

Optionally, the N1 groups of candidate time domain resources may be numbered, to obtain indexes of the groups of candidate time domain resources. For example, the indexes are respectively 0 to N1−1 or 1 to N1. When the time domain resource allocation field in the DCI is used to indicate a group of candidate time domain resources in which the time domain resource configured for the UE is located, the time domain resource allocation field may indicate an index of the group of candidate time domain resources in which the time domain resource configured for the UE is located. The UE may determine, based on the time domain resource allocation field in the DCI, the group of candidate time domain resources in which the time domain resource configured for the UE is located.

Optionally, a rule of numbering the groups of candidate time domain resources may be sequentially numbering the groups of candidate time domain resources in a sequence of the time domain resource allocations, corresponding to the groups of candidate time domain resources, configured by the base station, or the groups of candidate time domain resources may be numbered according to another rule. This is not limited in this application.

Optionally, N3 candidate time domain resources in one group of candidate time domain resources that is determined based on one time domain resource allocation may be numbered, to obtain indexes of the candidate time domain resources. For example, the indexes of the N3 candidate time domain resources are respectively 0 to N3−1 or 1 to N3. The B bits in the first field are used to indicate an index of the time domain resource configured for the UE from the group of candidate time domain resources, and the group of candidate time domain resources is a group of candidate time domain resources in which the time domain resource configured for the UE is located. One candidate time domain resource in the group of candidate time domain resources may be determined based on the B bits in the first field.

Optionally, a rule of numbering N3 candidate time domain resources in one group of candidate time domain resources may be sequentially numbering the candidate time domain resources in the priority sequence of determining the candidate time domain resources in this application, or the candidate time domain resources may be numbered according to another rule. This is not limited in this application.

Optionally, a size of the B bits may be determined based on a value N3' of maximum N3 corresponding to each of the N1 time domain resource allocations. For example, the size of the B bits is greater than or equal to $\log_2(N3')$ bits. For example, if a maximum of four candidate time domain resources may be determined for each of the N1 time domain resource allocations, the size of the B bits may be two bits.

For example, when the time domain resource is configured for the UE by using the methods in FIG. 3 and FIG. 4, the base station sends the time domain resource allocation indication information to the UE, where the time domain resource allocation indication information is used to indicate 16 time domain resource allocations, and a maximum of four candidate time domain resources may be determined based on one of the 16 time domain resource allocations. In this case, four bits in the time domain resource allocation field in the DCI are used to indicate one of the 16 time domain resource allocations, and two bits in the first field are used to indicate one of the four candidate time domain resources determined based on the time domain resource allocation.

For example, the base station sends the time domain resource allocation indication information to the UE, where the time domain resource allocation indication information is used to indicate 16 time domain resource allocations in Table 20.

TABLE 20

| Index | PDSCH mapping type | $K_0$ | S | L |
| --- | --- | --- | --- | --- |
| 1 | Type A | 0 | 0 | 4 |
| 2 | Type A | 0 | 0 | 6 |
| 3 | Type A | 0 | 0 | 7 |
| 4 | Type A | 0 | 0 | 8 |
| 5 | Type A | 0 | 0 | 10 |
| 6 | Type A | 0 | 1 | 4 |
| 7 | Type A | 0 | 1 | 6 |
| 8 | Type A | 0 | 1 | 8 |
| 9 | Type A | 0 | 1 | 10 |
| 10 | Type A | 0 | 2 | 4 |
| 11 | Type A | 0 | 2 | 6 |
| 12 | Type A | 0 | 2 | 8 |
| 13 | Type A | 0 | 2 | 10 |
| 14 | Type B | 0 | 4 | 2 |
| 15 | Type B | 0 | 4 | 4 |
| 16 | Type B | 0 | 4 | 7 |

For example, when the four bits in the time domain resource allocation field in the DCI are used to indicate one of the 16 time domain resource allocations, the four bits may indicate an index of the time domain resource allocation. Values of the bits in the time domain resource allocation field in the DCI and an index indicated by the bits may be shown in Table 21.

TABLE 21

| Values of bits in the time domain resource allocation field | Index of the time domain resource allocation |
| --- | --- |
| 0000 | 1 |
| 0001 | 2 |

TABLE 21-continued

| Values of bits in the time domain resource allocation field | Index of the time domain resource allocation |
| --- | --- |
| 0010 | 3 |
| 0011 | 4 |
| 0100 | 5 |
| 0101 | 6 |
| 0110 | 7 |
| 0111 | 8 |
| 1000 | 9 |
| 1001 | 10 |
| 1010 | 11 |
| 1011 | 12 |
| 1100 | 13 |
| 1101 | 14 |
| 1110 | 15 |
| 1111 | 16 |

Optionally, the values of the bits in the time domain resource allocation field, the indexes of the time domain resource allocations, and/or the correspondences between the values of the bits in the time domain resource allocation field and the index of the time domain resource allocation in Table 21 are merely examples, and other values of the bits in the time domain resource allocation field, another index of a time domain resource allocation, or another correspondence may also be applicable to the method provided in this embodiment of this application. This is not limited in this application.

Optionally, the correspondence between the values of the bits in the time domain resource allocation field and the index of the time domain resource allocation may be predefined, or may be notified by the base station to the UE by using signaling. This is not limited in this application.

The UE may determine one of the 16 time domain resource allocations based on the four bits in the time domain resource allocation field.

For example, when the index of the time domain resource allocation determined by the UE is 1 and N3 candidate time domain resources are determined based on the time domain resource allocation, for one of the N3 candidate time domain resources, a start symbol position S' of the candidate time domain resource is S or S+D1, in other words, S' is an element in a subset {S, S+D1}, and a length L' of the candidate time domain resource is L. D1 may be one or more predefined or configured positive integers. To be specific, when S=0, L=4, $N_{slot}^{symb}$=14, and D1={5,6,8}, four (namely, N3=4) candidate time domain resources may be determined in total, and (S', L') corresponding to the four candidate time domain resources is respectively (0, 4), (5, 4), (6, 4), and (8, 4). It is assumed that indexes corresponding to the four candidate time domain resources are respectively 1 to 4. For example, as shown in Table 22:

TABLE 22

| Indexes of N3 candidate time domain resources | $K_0$ | S' | L' |
| --- | --- | --- | --- |
| 1 | 0 | 0 | 4 |
| 2 | 0 | 5 | 4 |
| 3 | 0 | 6 | 4 |
| 4 | 0 | 8 | 4 |

In this case, the two bits in the first field may be used to indicate, from the four candidate time domain resources shown in Table 22, the time domain resource configured for the UE. Assuming that the first field is the RV version information field, values of the two bits in the first field and an index, of a time domain resource, indicated by the bits may be shown in Table 23:

TABLE 23

| Values of the two bits in the RV version information field | Index of the time domain resource |
|---|---|
| 00 | 1 |
| 01 | 2 |
| 10 | 3 |
| 11 | 4 |

Optionally, the values of the two bits in the RV version information field, the indexes of the time domain resources, and/or the correspondences between the values of the two bits in the RV version information field and the index of the time domain resource in Table 23 are merely examples, other values of the two bits in the RV version information field, another index of a time domain resource, or another correspondence may also be applicable to the method provided in this embodiment of this application. This is not limited in this application.

Optionally, the correspondence between the values of the two bits in the RV version information field and the index of the time domain resource may be predefined, or may be notified by the base station to the UE by using signaling. This is not limited in this application.

Therefore, if the index, of the time domain resource allocation, indicated by the time domain resource allocation field is 1, and the index, of the time domain resource, indicated by the B bits in the first field is 2, the UE may determine that (S', L') corresponding to the time domain resource configured for the UE is (5, 4). In this case, the UE and the base station perform data transmission on the time domain resource.

For example, when the index of the time domain resource allocation determined by the UE is 10 and N3 candidate time domain resources are determined based on the time domain resource allocation, for one of the N3 candidate time domain resources, K' of the candidate time domain resource is K or K+step3×i3, in other words, K' is an element in a subset {K, K+step3×i3}, a start symbol position S' of the candidate time domain resource is S, and a length L' of the candidate time domain resource is L. In other words, when K=0, S=0, L=4, $N_{slot}^{symb}$=14, and step3=1, assuming that N3=4, a total of four candidate time domain resources may be determined, and (K', S', L') corresponding to the four candidate time domain resources is respectively (0, 0, 4), (1, 0, 4), (2, 0, 4), and (3, 0, 4). It is assumed that indexes corresponding to the four candidate time domain resources are respectively 1 to 4. For example, as shown in Table 24:

TABLE 24

| Indexes of N3 candidate time domain resources | K' | S' | L' |
|---|---|---|---|
| 1 | 0 | 0 | 4 |
| 2 | 1 | 0 | 4 |
| 3 | 2 | 0 | 4 |
| 4 | 3 | 0 | 4 |

In this case, the two bits in the first field may be used to indicate, from the four candidate time domain resources shown in Table 24, the time domain resource configured for the UE. Assuming that the first field is the RV version information field, values of the two bits in the first field and an index, of a time domain resource, indicated by the bits may be shown in Table 25:

TABLE 25

| Values of the two bits in the RV version information field | Index of the time domain resource |
|---|---|
| 00 | 1 |
| 01 | 2 |
| 10 | 3 |
| 11 | 4 |

Optionally, the values of the two bits in the RV version information field, the indexes of the time domain resources, and/or the correspondences between the values of the two bits in the RV version information field and the index of the time domain resource in Table 25 are merely examples, other values of the two bits in the RV version information field, another index of a time domain resource, or another correspondence may also be applicable to the method provided in this embodiment of this application. This is not limited in this application.

Optionally, the correspondence between the values of the two bits in the RV version information field and the index of the time domain resource may be predefined, or may be notified by the base station to the UE by using signaling. This is not limited in this application.

Therefore, if the index, of the time domain resource allocation, indicated by the time domain resource allocation field is 10, and the index, of the time domain resource, indicated by the B bits in the first field is 3, the UE may determine that (K', S', L') corresponding to the time domain resource configured for the UE is (2, 0, 4). In this case, the UE and the base station perform data transmission on the time domain resource.

In the foregoing embodiments of this application, the method provided in the embodiments of this application is described from a perspective of interaction between the base station and the UE. To implement functions in the method provided in the embodiments of this application, the base station and the UE each may include a hardware structure and/or a software module, to implement the foregoing functions by using the hardware structure, the software module, or a combination of the hardware structure and the software module. Whether a function of the foregoing functions is performed by using the hardware structure, the software module, or the combination of the hardware structure and the software module depends on a specific application and a design constraint of the technical solution.

Figure 6:
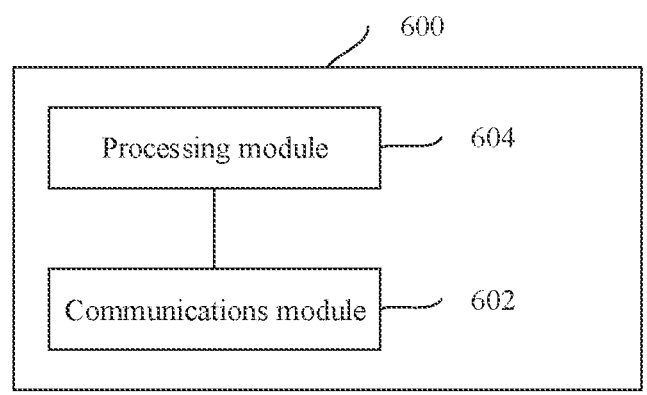
FIG. 6 to FIG. 9 are structural diagrams of apparatuses according to embodiments of this application.

FIG. 6 is a schematic structural diagram of an apparatus 600 according to an embodiment of this application. The apparatus 600 may be UE, and can implement functions of the UE in the method provided in the embodiments of this application. The apparatus 600 may alternatively be an apparatus that can support UE in implementing functions of the UE in the method provided in the embodiments of this application. The apparatus 600 may be a hardware structure, a software module, or a combination of a hardware structure and a software module. The apparatus 600 may be implemented by a chip system.

The apparatus 600 includes a communications module 602 and a processing module 604. The communications module 602 is configured to receive and/or send data, the processing module 604 may be configured to process the received data, and the processing module may further be configured to generate to-be-sent data.

For example, when the apparatus 600 is configured to implement the method provided in the embodiments of this application, the communications module 602 may be configured to receive time domain resource allocation indication information, where the time domain resource allocation indication information is used to indicate N1 time domain resource allocations, where N1 is an integer greater than or equal to 1; and the processing module 604 is configured to determine N2 candidate time domain resources based on the N1 time domain resource allocations, where N2 is an integer greater than N1.

Optionally, the communications module 602 may include a circuit, a bus, an interface, a transceiver, or any other apparatus that can implement a communication function.

Optionally, the processing module 604 may include one or more processors. In this embodiment of this application, the processor may be a central processing unit (CPU), a general purpose processor, a network processor (NP), a digital signal processor (DSP), a microprocessor, a microcontroller, a programmable logic device (PLD), or any combination thereof. The processor may alternatively be any other apparatus, for example, a circuit, a component, or a software module, having a processing function.

Figure 7:
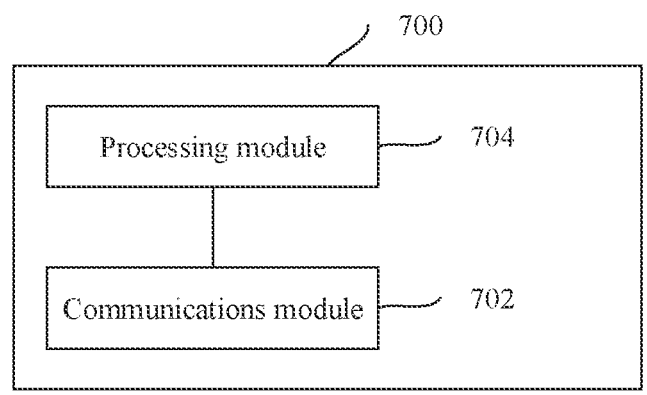

FIG. 7 is a schematic structural diagram of an apparatus 700 according to an embodiment of this application. The apparatus 700 may be a base station, and can implement functions of the base station in the method provided in the embodiments of this application. The apparatus 700 may alternatively be an apparatus that can support a base station in implementing functions of the base station in the method provided in the embodiments of this application. The apparatus 700 may be a hardware structure, a software module, or a combination of a hardware structure and a software module. The apparatus 700 may be implemented by a chip system.

The apparatus 700 includes a communications module 702 and a processing module 704. The communications module 702 is configured to receive and/or send data, the processing module 704 may be configured to process the received data, and the processing module may further be configured to generate to-be-sent data.

For example, when the apparatus 700 is configured to implement the method provided in the embodiments of this application, the processing module 704 is configured to generate time domain resource allocation indication information; and the communications module 702 may be configured to send the time domain resource allocation indication information, where the time domain resource allocation indication information is used to indicate N1 time domain resource allocations, where N1 is an integer greater than or equal to 1, and the N1 time domain resource allocations are used to configure N2 candidate time domain resources for UE, where N2 is an integer greater than N1.

Optionally, the communications module 702 may include a circuit, a bus, an interface, a transceiver, or any other apparatus that can implement a communication function.

Optionally, the processing module 704 may include one or more processors.

Figure 8:
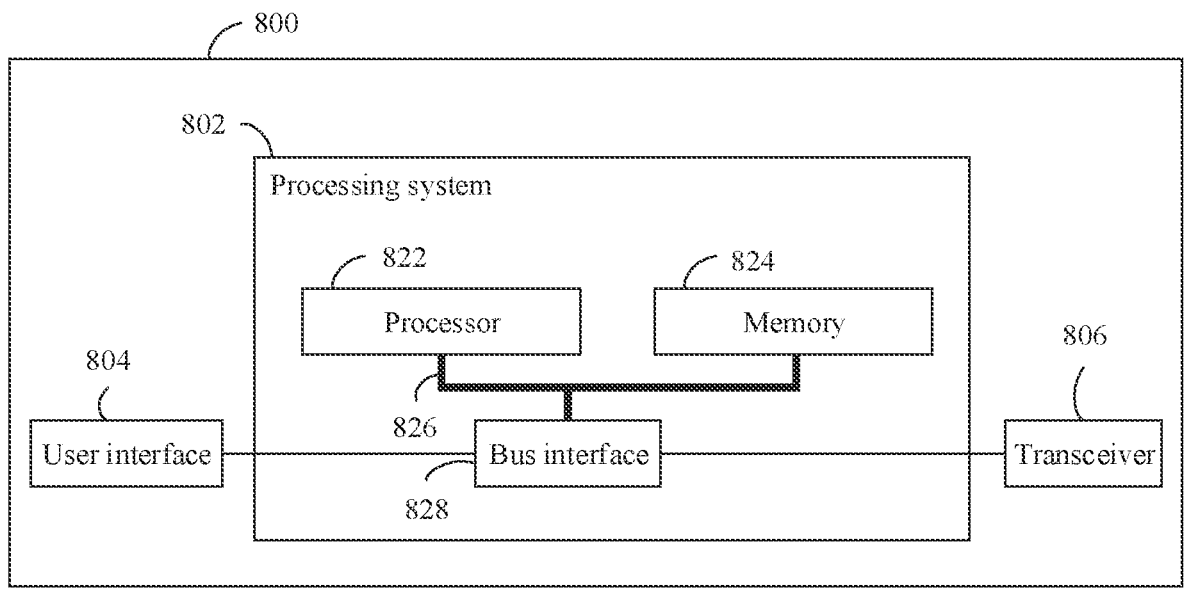

FIG. 8 is a schematic structural diagram of an apparatus 800 according to an embodiment of this application. The apparatus 800 may be UE, and can implement functions of the UE in the method provided in the embodiments of this application. The apparatus 800 may alternatively be an apparatus that can support UE in implementing functions of the UE in the method provided in the embodiments of this application.

As shown in FIG. 8, the apparatus 800 includes a processing system 802, configured to implement or support the UE in implementing the functions of the UE in the method provided in the embodiments of this application. The processing system 802 may be a circuit, and the circuit may be implemented by a chip system. The processing system 802 includes one or more processors 822 that may be configured to implement or support the UE in implementing the functions of the UE in the method provided in the embodiments of this application. When the processing system 802 includes another apparatus in addition to the processor 822, the processor 822 may further be configured to manage the another apparatus included in the processing system 802. For example, the another apparatus may be one or more of the following memory 824, bus 826, and bus interface 828.

The processing system 802 may further include one or more memories 824, configured to store an instruction and/or data. Further, the memory 824 may further be included in the processor 822. If the processing system 802 includes the memory 824, the processor 822 may be coupled to the memory 824. The processor 822 may cooperate with the memory 824 in performing an operation. The processor 822 may execute the instruction stored in the memory 824. When executing the instruction stored in the memory 824, the processor 822 can implement or support the UE in implementing the functions of the UE in the method provided in the embodiments of this application. The processor 822 may further read the data stored in the memory 824. The memory 824 may further store data that is obtained when the processor 822 executes the instruction.

In this embodiment of this application, the memory includes a volatile memory, for example, a random access memory (RAM). The memory may alternatively include a non-volatile memory, for example, a flash memory, a hard disk drive (HDD), or a solid-state drive (SSD). The memory may alternatively include a combination of the foregoing types of memories. The memory may alternatively include any other apparatus, for example, a circuit, a component, or a software module, having a storage function.

The processing system 802 may further include the bus interface 828, configured to provide an interface between the bus 826 and another apparatus. The bus interface may also be referred to as a communications interface.

The apparatus 800 may further include a transceiver 806, configured to communicate with another communications device through a transmission medium, so that another apparatus in the apparatus 800 can communicate with the another communications device. The another apparatus may be the processing system 802. For example, the another apparatus in the apparatus 800 may communicate with the another communications device by using the transceiver 806, to receive and/or send corresponding information. This may also be described as that the another apparatus in the apparatus 800 may receive corresponding information, where the corresponding information is received by the transceiver 806 through the transmission medium, and the corresponding information may be exchanged between the transceiver 806 and the another apparatus in the apparatus 800 through the bus interface 828 or through the bus interface 828 and the bus 826; and/or the another apparatus in the apparatus 800 may send corresponding information, where the corresponding information is sent by the transceiver 806 through the transmission medium, and the corresponding information may be exchanged between the transceiver 806 and the another apparatus in the apparatus 800 through the bus interface 828 or through the bus interface 828 and the bus 826.

The apparatus 800 may further include a user interface 804. The user interface 804 is an interface between a user and the apparatus 800, and may be used for information exchange between the user and the apparatus 800. For example, the user interface 804 may be at least one of a keyboard, a mouse, a display, a speaker, a microphone, and a joystick.

The foregoing mainly describes, from a perspective of the apparatus 800, an apparatus structure provided in the embodiments of this application. In the apparatus, the processing system 802 includes the processor 822, and may further include one or more of the memory 824, the bus 826, and the bus interface 828, to implement the method provided in the embodiments of this application. The processing system 802 also falls within the protection scope of this application.

Figure 9:
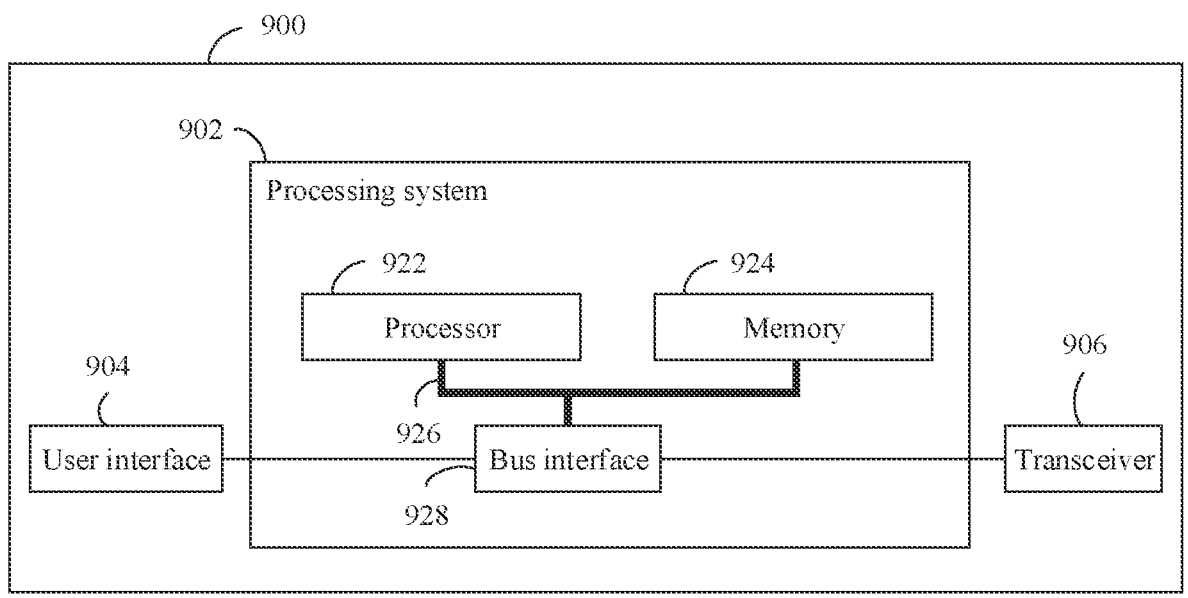

FIG. 9 is a schematic structural diagram of an apparatus 900 according to an embodiment of this application. The apparatus 900 may be a base station, and can implement functions of the base station in the method provided in the embodiments of this application. The apparatus 900 may alternatively be an apparatus that can support a base station in implementing functions of the base station in the method provided in the embodiments of this application.

As shown in FIG. 9, the apparatus 900 includes a processing system 902, configured to implement or support the base station in implementing the functions of the base station in the method provided in the embodiments of this application. The processing system 902 may be a circuit, and the circuit may be implemented by a chip system. The processing system 902 includes one or more processors 922 that may be configured to implement or support the base station in implementing the functions of the base station in the method provided in the embodiments of this application. When the processing system 902 includes another apparatus in addition to the processor 922, the processor 922 may further be configured to manage the another apparatus included in the processing system 902. For example, the another apparatus may be one or more of the following memory 924, bus 926, and bus interface 928.

The processing system 902 may further include one or more memories 924, configured to store an instruction and/or data. Further, the memory 924 may further be included in the processor 922. If the processing system 902 includes the memory 924, the processor 922 may be coupled to the memory 924. The processor 922 may cooperate with the memory 924 in performing an operation. The processor 922 may execute the instruction stored in the memory 924. When executing the instruction stored in the memory 924, the processor 922 can implement or support the base station in implementing the functions of the base station in the method provided in the embodiments of this application. The processor 922 may further read the data stored in the memory 924. The memory 924 may further store data that is obtained when the processor 922 executes the instruction.

The processing system 902 may further include the bus interface 928, configured to provide an interface between the bus 926 and another apparatus. The bus interface may also be referred to as a communications interface.

The apparatus 900 may further include a transceiver 906, configured to communicate with another communications device through a transmission medium, so that another apparatus in the apparatus 900 can communicate with the another communications device. The another apparatus may be the processing system 902. For example, the another apparatus in the apparatus 900 may communicate with the another communications device by using the transceiver 906, to receive and/or send corresponding information. This may also be described as that the another apparatus in the apparatus 900 may receive corresponding information, where the corresponding information is received by the transceiver 906 through the transmission medium, and the corresponding information may be exchanged between the transceiver 906 and the another apparatus in the apparatus 900 through the bus interface 928 or through the bus interface 928 and the bus 926; and/or the another apparatus in the apparatus 900 may send corresponding information, where the corresponding information is sent by the transceiver 906 through the transmission medium, and the corresponding information may be exchanged between the transceiver 906 and the another apparatus in the apparatus 900 through the bus interface 928 or through the bus interface 928 and the bus 926.

The apparatus 900 may further include a user interface 904. The user interface 904 is an interface between a user and the apparatus 900, and may be used for information exchange between the user and the apparatus 900. For example, the user interface 904 may be at least one of a keyboard, a mouse, a display, a speaker, a microphone, and a joystick.

The foregoing mainly describes, from a perspective of the apparatus 900, an apparatus structure provided in the embodiments of this application. In the apparatus, the processing system 902 includes the processor 922, and may further include one or more of the memory 924, the bus 926, and the bus interface 928, to implement the method provided in the embodiments of this application. The processing system 902 also falls within the protection scope of this application.

In the apparatus embodiments of this application, division of an apparatus into modules is division into logical functions and may be other division in an actual implementation. For example, all the function modules of the apparatus may be integrated into one module, or may be separated from each other, or two or more function modules may be integrated into one module.

An embodiment of this application provides a communications system. The communications system includes an apparatus configured to implement the method, performed by the base station, provided in the embodiments of this application, and includes an apparatus configured to implement the method, performed by the UE, provided in the embodiments of this application.

All or some of the methods in the embodiments of this application may be implemented through software, hardware, firmware, or any combination thereof. When software is used to implement the methods, all or some of the methods may be implemented in a form of a computer program product. The computer program product includes one or more computer instructions. When the computer program instructions are loaded and executed on a computer, the procedures or functions according to the embodiments of the present invention are all or partially generated. The computer may be a general-purpose computer, a special-purpose computer, a computer network, a network device, a terminal, or another programmable apparatus. The computer instructions may be stored in a computer-readable storage medium or may be transmitted from one computer-readable storage medium to another computer-readable storage medium. For example, the computer instructions may be transmitted from one website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by the computer, or a data storage device, such as a server or a data center, integrating one or more usable media. The usable medium may be a magnetic medium (for example, a floppy disk, a hard disk, or a magnetic tape), an optical medium (for example, a digital video disc (DVD)), a semiconductor medium (for example, an SSD), or the like.

The foregoing embodiments are merely intended to describe the technical solutions of this application, but not to limit the protection scope of this application. Any modifications, equivalent replacements, improvements, and the like made on the basis of the technical solutions of this application shall fall within the protection scope of this application.

What is claimed is:

1. An apparatus, comprising at least one processor, a communications interface, and one or more memories coupled to the at least one processor and storing programming instructions for execution by the at least one processor to:
receive time domain resource allocation indication information by using the communications interface, wherein the time domain resource allocation indication information is used to indicate N1 time domain resource allocations, wherein N1 is an integer greater than or equal to 1;
determine N2 candidate time domain resources based on the N1 time domain resource allocations, wherein N2 is an integer greater than N1;
receive downlink control information (DCI) by using the communications interface, wherein the DCI comprises a time domain resource allocation field and a first field, the time domain resource allocation field and B bits in the first field are jointly used to indicate, from the N2 candidate time domain resources, a time domain resource configured for a terminal device, B is an integer greater than or equal to 1, a quantity of bits in the time domain resource allocation field is a maximum quantity of bits that is supported by the time domain resource allocation field, and the maximum quantity of bits that is supported by the time domain resource allocation field is less than a quantity of bits required for configuring the time domain resource from the N2 candidate time domain resources for the terminal device; and
perform data transmission on the configured time domain resource by using the communications interface.

2. The apparatus according to claim 1, comprising:
for one of the N1 time domain resource allocations, determine N3 candidate time domain resources in the N2 candidate time domain resources based on the time domain resource allocation, wherein N3 is an integer greater than or equal to 1.

3. The apparatus according to claim 2, comprising:
determine the N3 candidate time domain resources according to a preconfigured rule and based on the time domain resource allocation.

4. The apparatus according to claim 2, wherein
the time domain resource allocation is used to indicate a start symbol position S and a length L of one candidate time domain resource, wherein S is an integer greater than or equal to 0 and less than or equal to $N_{slot}^{symb}-1$, L is an integer greater than or equal to 1 and less than $N_{slot}^{symb}$, and $N_{slot}^{symb}$ is a quantity of symbols comprised in one slot; and for one of the N3 candidate time domain resources:
a length of the candidate time domain resource is L, and a start symbol position S' of the candidate time domain resource is determined based on S;
a length L' of the candidate time domain resource is determined based on L, and a start symbol position of the candidate time domain resource is S; or
a start symbol position S' of the candidate time domain resource is determined based on S, and a length L' of the candidate time domain resource is determined based on L.

5. The apparatus according to claim 4, wherein
S' is an element in a first set {S, S−D1, S+D1, S×scale1, ⌊S/scale1⌋, S−step1× i1, or S+step1×i1} or S' is an element in a subset of the first set, wherein S' is an integer greater than or equal to 0 and less than or equal to $N_{slot}^{symb}-1$, i1, scale1, and step1 are positive integers, and D1 is one or more positive integers.

6. The apparatus according to claim 4, wherein
L' is an element in a second set {L, L−D2, L+D2, L×scale2, ⌊L/scale2⌋, L−step2×i2, or L+step2×i2} or L' is an element in a subset of the second set, wherein L' is an integer greater than or equal to 1 and less than $N_{slot}^{symb}$, i2, scale2, and step2 are positive integers, and D2 is one or more positive integers.

7. The apparatus according to claim 1, wherein the first field comprises one or more of the following fields: a redundancy version (RV) indicator field, an RV sequence indicator field, and a precoding and quantity-of-layers indicator field.

8. The apparatus according to claim 7, wherein at least one of the following:
when the first field comprises the RV version indicator field, an RV version corresponding to the data transmission is a predefined RV version;
when the first field comprises the RV sequence indicator field, an RV sequence corresponding to the data transmission is a predefined RV sequence; and
when the first field comprises the precoding and quantity-of-layers indicator field, a quantity of layers and a codebook that are used for the data transmission are determined in any one of the following manners:
a bit other than B1 bits in the precoding and quantity-of-layers indicator field is used to indicate a codebook configured for the terminal device, and the quantity of layers is preconfigured, and the configured codebook and the preconfigured quantity of layers are used for the data transmission;
a bit other than B1 bits in the precoding and quantity-of-layers indicator field is used to indicate a quantity of layers that is configured for the terminal device, the codebook is preconfigured, and the preconfigured codebook and the configured quantity of layers are used for the data transmission; or
a bit other than B1 bits in the precoding and quantity-of-layers indicator field is used to indicate a quantity of layers and a codebook that are configured for the terminal device, and the configured codebook and the configured quantity of layers are used for the data transmission, wherein the B bits comprise the B1 bits.

9. A method, comprising:
sending time domain resource allocation indication information, wherein the time domain resource allocation indication information is used to indicate N1 time domain resource allocations, wherein N1 is an integer greater than or equal to 1, wherein the N1 time domain resource allocations are used to configure N2 candidate time domain resources for a terminal device, and wherein N2 is an integer greater than N1;

sending downlink control information (DCI), wherein the DCI comprises a time domain resource allocation field and a first field, the time domain resource allocation field and B bits in the first field are jointly used to indicate, from the N2 candidate time domain resources, a time domain resource configured for the terminal device, B is an integer greater than or equal to 1, a quantity of bits in the time domain resource allocation field is a maximum quantity of bits that is supported by the time domain resource allocation field, and the maximum quantity of bits that is supported by the time domain resource allocation field is less than a quantity of bits required for configuring the time domain resource from the N2 candidate time domain resources for the terminal device; and performing data transmission on the configured time domain resource.

10. The method according to claim 9, wherein that the N1 time domain resource allocations are used to configure N2 candidate time domain resources for a terminal device comprises:

for one of the N1 time domain resource allocations, the time domain resource allocation is used to configure N3 candidate time domain resources in the N2 candidate time domain resources for the terminal device, wherein N3 is an integer greater than or equal to 1.

11. The method according to claim 10, wherein that the time domain resource allocation is used to configure N3 candidate time domain resources in the N2 candidate time domain resources for the terminal device comprises:

the time domain resource allocation is used to configure the N3 candidate time domain resources for the terminal device according to a preconfigured rule.

12. The method according to claim 10, wherein the time domain resource allocation is used to indicate a start symbol position S and a length L of one candidate time domain resource, wherein S is an integer greater than or equal to 0 and less than or equal to $N_{slot}^{symb}-1$, L is an integer greater than or equal to 1 and less than $N_{slot}^{symb}$, and $N_{slot}^{symb}$ is a quantity of symbols comprised in one slot; and when the time domain resource allocation is used to configure the N3 candidate time domain resources for the terminal device, for one of the N3 candidate time domain resources:

a length of the candidate time domain resource is L, and a start symbol position S' of the candidate time domain resource is determined based on S;

a length L' of the candidate time domain resource is determined based on L, and a start symbol position of the candidate time domain resource is S; or a start symbol position S' of the candidate time domain resource is determined based on S, and a length L' of the candidate time domain resource is determined based on L.

13. The method according to claim 12, wherein that a start symbol position S' of the candidate time domain resource is determined based on S comprises:

S' is an element in a first set {S, S−D1, S+D1, S×scale1, ⌊S/scale1⌋, S−step1× i1, or S+step1× i1} or S' is an element in a subset of the first set, wherein S' is an integer greater than or equal to 0 and less than or equal to $N_{slot}^{symb}-1$, i1, scale1, and step1 are positive integers, and D1 is one or more positive integers.

14. The method according to claim 12, wherein that a length L' of the candidate time domain resource is determined based on L comprises:

L' is an element in a second set {L, L−D2, L+D2, L×scale2, ⌊L/scale2⌋, L−step2×i2, or L+step2×i2} or L' is an element in a subset of the second set, wherein L' is an integer greater than or equal to 1 and less than $N_{slot}^{symb}$, i2, scale2, and step2 are positive integers, and D2 is one or more positive integers.

15. The method according to claim 9, wherein the first field comprises one or more of the following fields: a redundancy version (RV) indicator field, an RV sequence indicator field, and a precoding and quantity-of-layers indicator field.

16. The method according to claim 15, wherein at least one of the following:

when the first field comprises the RV version indicator field, an RV version corresponding to the data transmission is a predefined RV version;

when the first field comprises the RV sequence indicator field, an RV sequence corresponding to the data transmission is a predefined RV sequence; and when the first field comprises the precoding and quantity-of-layers indicator field, a quantity of layers and a codebook that are used for the data transmission are any one of the following:

a bit other than B1 bits in the precoding and quantity-of-layers indicator field is used to indicate a codebook configured for the terminal device, the quantity of layers is preconfigured, and the configured codebook and the preconfigured quantity of layers are used for the data transmission;

a bit other than B1 bits in the precoding and quantity-of-layers indicator field is used to indicate a quantity of layers that is configured for the terminal device, the codebook is preconfigured, and the preconfigured codebook and the configured quantity of layers are used for the data transmission; or a bit other than B1 bits in the precoding and quantity-of-layers indicator field is used to indicate a quantity of layers and a codebook that are configured for the terminal device, and the configured codebook and the configured quantity of layers are used for the data transmission, wherein the B bits comprise the B1 bits.

17. An apparatus, comprising at least one processor, a communications interface, and one or more memories coupled to the at least one processor and storing programming instructions for execution by the at least one processor to:

send time domain resource allocation indication information by using the communications interface, wherein the time domain resource allocation indication information is used to indicate N1 time domain resource allocations, wherein N1 is an integer greater than or equal to 1, wherein the N1 time domain resource allocations are used to configure N2 candidate time domain resources, and wherein N2 is an integer greater than N1;

send downlink control information (DCI), wherein the DCI comprises a time domain resource allocation field and a first field, the time domain resource allocation field and B bits in the first field are jointly used to indicate, from the N2 candidate time domain resources, a time domain resource configured for a terminal device, B is an integer greater than or equal to 1, a quantity of bits in the time domain resource allocation field is a maximum quantity of bits that is supported by the time domain resource allocation field, and the maximum quantity of bits that is supported by the time domain resource allocation field is less than a quantity of bits required for configuring the time domain resource from the N2 candidate time domain resources for the terminal device; and perform data transmission on the configured time domain resource.

18. The apparatus according to claim 17, wherein for one of the N1 time domain resource allocations, the time domain resource allocation is used to configure N3 candidate time domain resources in the N2 candidate time domain resources for the terminal device, wherein N3 is an integer greater than or equal to 1.

* * * * *